(12) United States Patent
Juan et al.

(10) Patent No.: US 8,602,758 B2
(45) Date of Patent: Dec. 10, 2013

(54) INDEXED POSITIVE DISPLACEMENT ROTARY MOTION DEVICE

(75) Inventors: Alejandro Juan, Calgary (CA); Curtis Patterson, Calgary (CA); Kristjan Gottfried, Calgary (CA); Soheil Farshchian, Calgary (CA)

(73) Assignee: Exponential Technologies, Inc. (CA)

( * ) Notice: Subject to any disclaimer, the term of this patent is extended or adjusted under 35 U.S.C. 154(b) by 1120 days.

(21) Appl. No.: 12/560,674

(22) Filed: Sep. 16, 2009

(65) Prior Publication Data

US 2010/0074786 A1 Mar. 25, 2010

Related U.S. Application Data

(60) Provisional application No. 61/097,744, filed on Sep. 17, 2008, provisional application No. 61/110,770, filed on Nov. 3, 2008, provisional application No. 61/142,035, filed on Dec. 31, 2008, provisional application No. 61/181,236, filed on May 26, 2009, provisional application No. 61/226,199, filed on Jul. 16, 2009, provisional application No. 61/183,873, filed on Jun. 3, 2009.

(51) Int. Cl.
*F03C 4/00* (2006.01)
*F04C 2/00* (2006.01)
*F04C 18/00* (2006.01)

(52) U.S. Cl.
USPC ............................... 418/195; 418/150

(58) Field of Classification Search
USPC ................... 418/150, 195, 198, 199; 60/39.6; 73/35.01
See application file for complete search history.

(56) References Cited

U.S. PATENT DOCUMENTS

| | | | |
|---|---|---|---|
| 32,372 A | 5/1861 | Jones | |
| 351,129 A | 10/1886 | Salomo | |
| 914,155 A | 3/1909 | Mills et al. | |
| 991,576 A | 5/1911 | White | |
| 1,379,653 A | 5/1921 | Shoemaker | |
| 2,101,051 A | 12/1937 | Cuny | |
| 2,101,428 A | 12/1937 | Cuny | |
| 2,242,058 A | 5/1941 | Cuny | |
| 2,431,817 A | 12/1947 | Mann | |
| 2,582,413 A * | 1/1952 | Clark | 418/195 |
| 3,101,700 A | 8/1963 | Bowdish | |
| 3,106,912 A | 8/1963 | Kahlert | |
| 3,156,222 A | 11/1964 | Miller, Jr. | |
| 3,236,186 A | 2/1966 | Wildhaber | |
| 3,272,130 A | 11/1966 | Mosbacher | |

(Continued)

FOREIGN PATENT DOCUMENTS

| | | |
|---|---|---|
| CA | 2069607 | 11/1993 |
| DE | 1551081 | 4/1970 |

(Continued)

OTHER PUBLICATIONS

Wankel, Felix, Rotary Piston Machines, Jan. 1, 1965.

(Continued)

*Primary Examiner* — Theresa Trieu
(74) *Attorney, Agent, or Firm* — Dwayne E. Rogge; Schacht Law Office, Inc.

(57) ABSTRACT

An indexing system for a rotor assembly where the indexing system can regulate the rotational location of drive rotors that are configured to rotate about a shaft in one form.

37 Claims, 65 Drawing Sheets

(56) References Cited

U.S. PATENT DOCUMENTS

| | | | |
|---|---|---|---|
| 3,816,038 A | 6/1974 | Berry | |
| 3,816,039 A | 6/1974 | Berry | |
| 3,856,440 A | 12/1974 | Wildhaber | |
| 4,252,511 A | 2/1981 | Bowdish | |
| D263,970 S | 4/1982 | Wilholm | |
| 4,702,206 A | 10/1987 | Harries | |
| 5,056,314 A | 10/1991 | Paul et al. | |
| 5,513,969 A | 5/1996 | Arnold | |
| 5,755,196 A | 5/1998 | Klassen | |
| 6,036,463 A | 3/2000 | Klassen | |
| 6,494,698 B2 | 12/2002 | Arnold | |
| 6,497,564 B2 * | 12/2002 | Klassen | 418/195 |
| 6,705,161 B1 * | 3/2004 | Klassen | 73/261 |
| 6,739,852 B1 * | 5/2004 | Klassen | 418/195 |

FOREIGN PATENT DOCUMENTS

| | | |
|---|---|---|
| DE | 3221994 | 12/1983 |
| FR | 916277 | 8/1946 |
| GB | 5686 | 0/1902 |
| GB | 805370 | 12/1958 |
| GB | 1099085 | 1/1968 |
| IT | 268459 | 1/1933 |
| JP | 4329764 | 12/1943 |
| JP | 5572683 | 5/1980 |
| WO | 9961753 | 12/1999 |

OTHER PUBLICATIONS

George, Michael, Granco Positive Displacement Pump, Plant Engineering Magazine, Dec. 10, 1981.

* cited by examiner

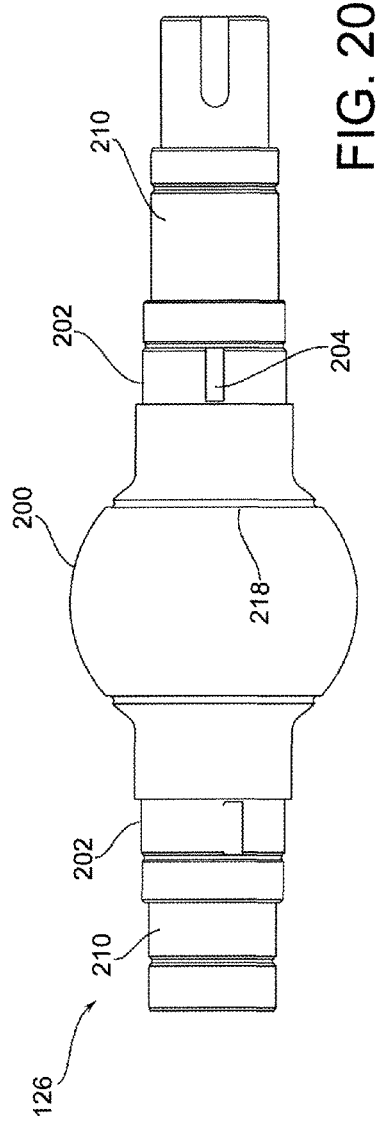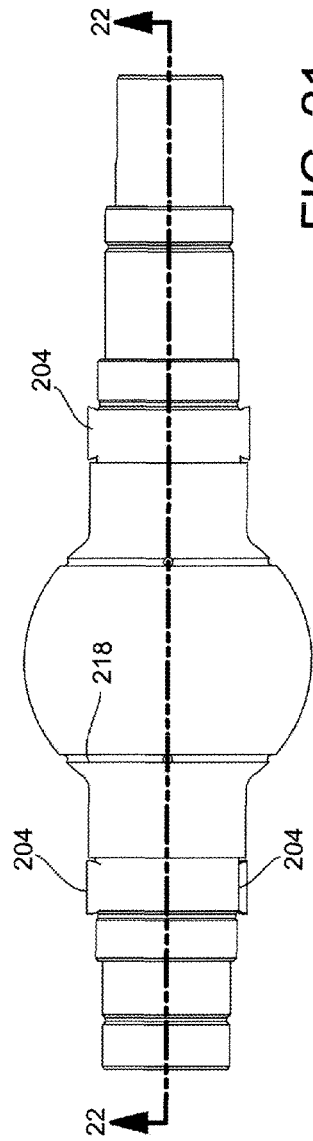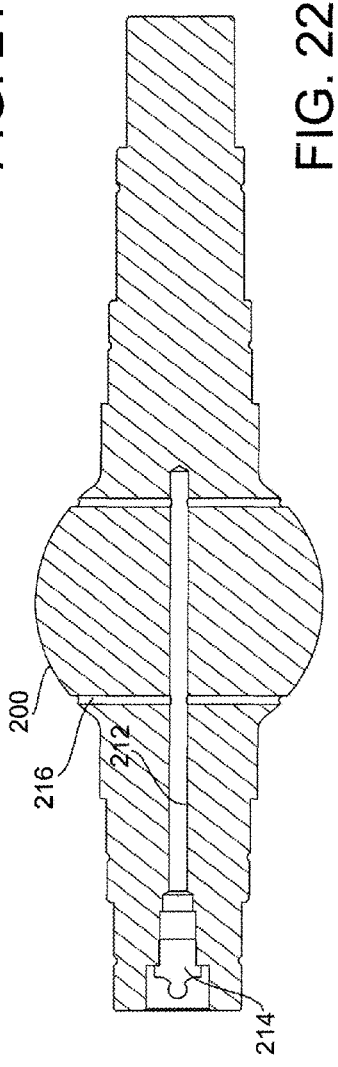

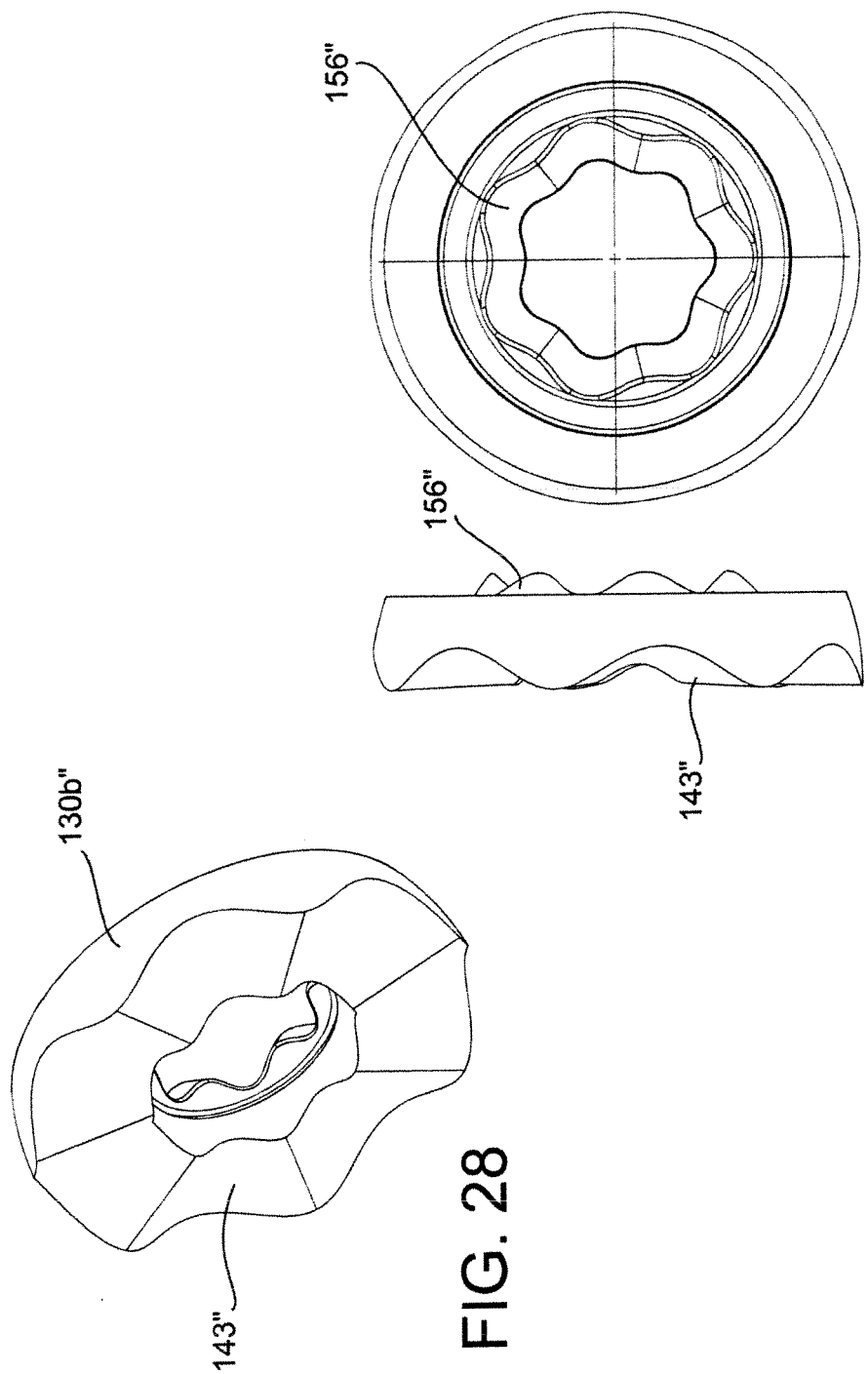

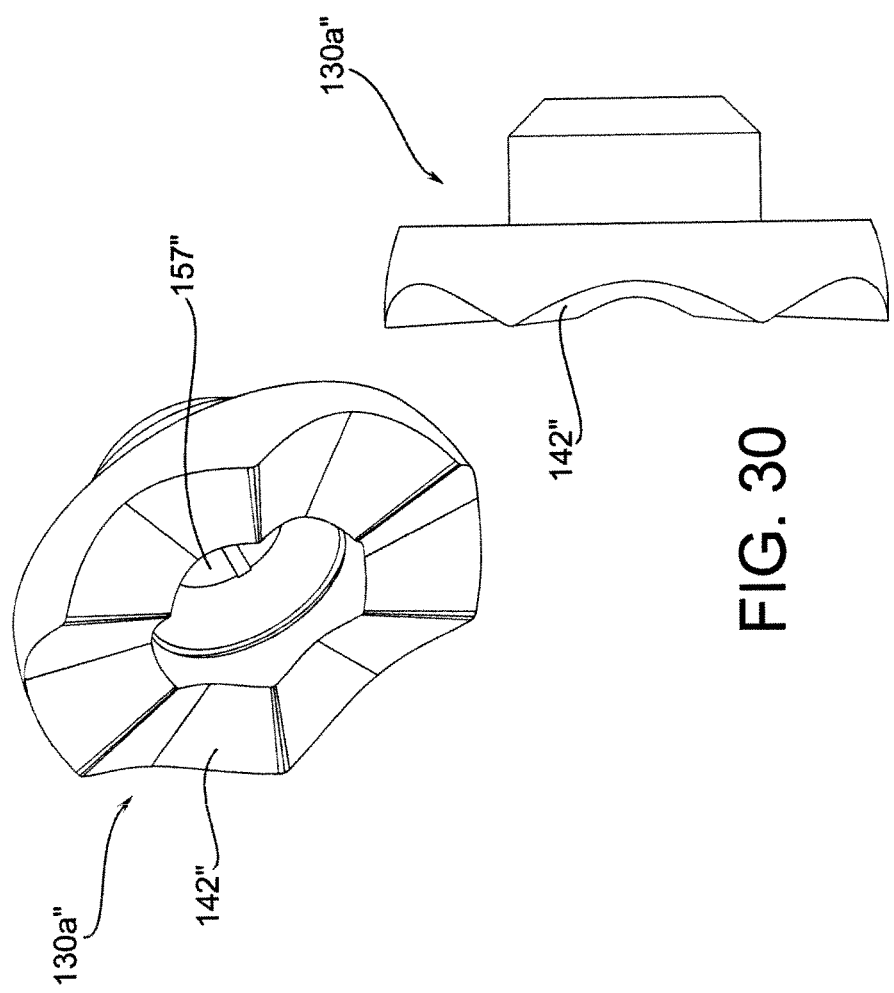

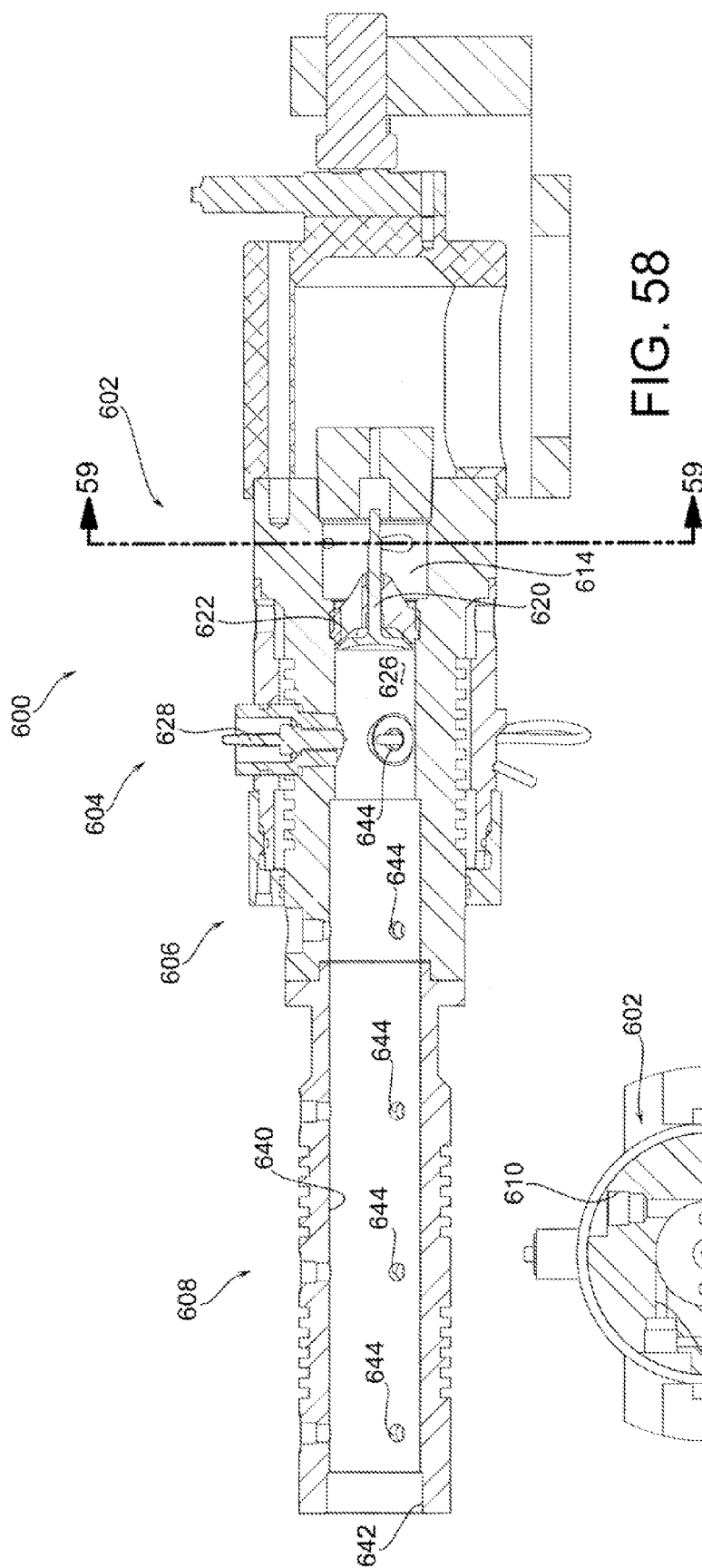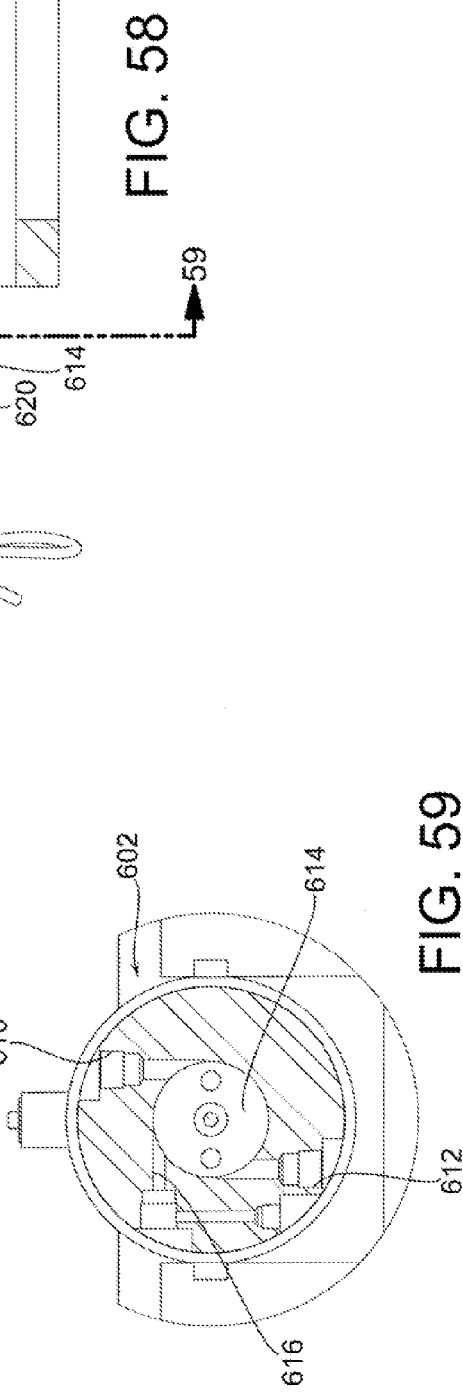

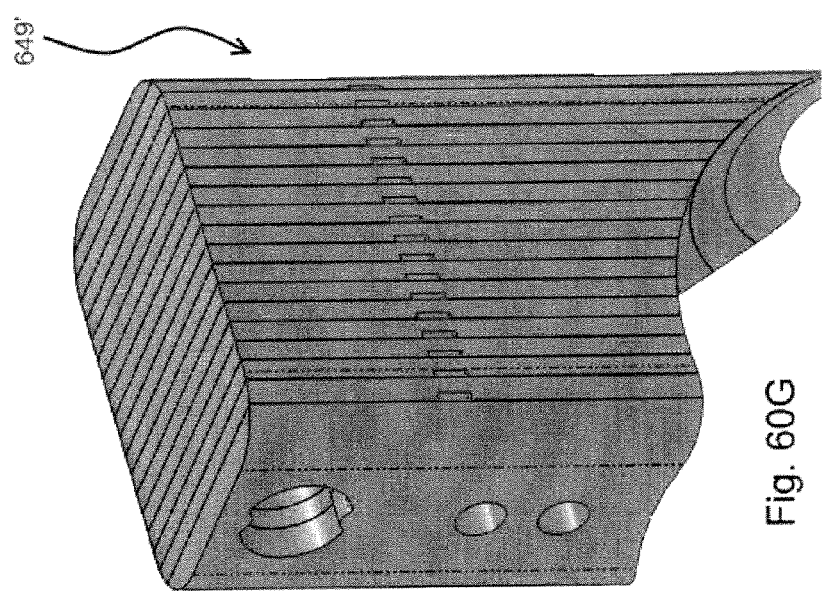
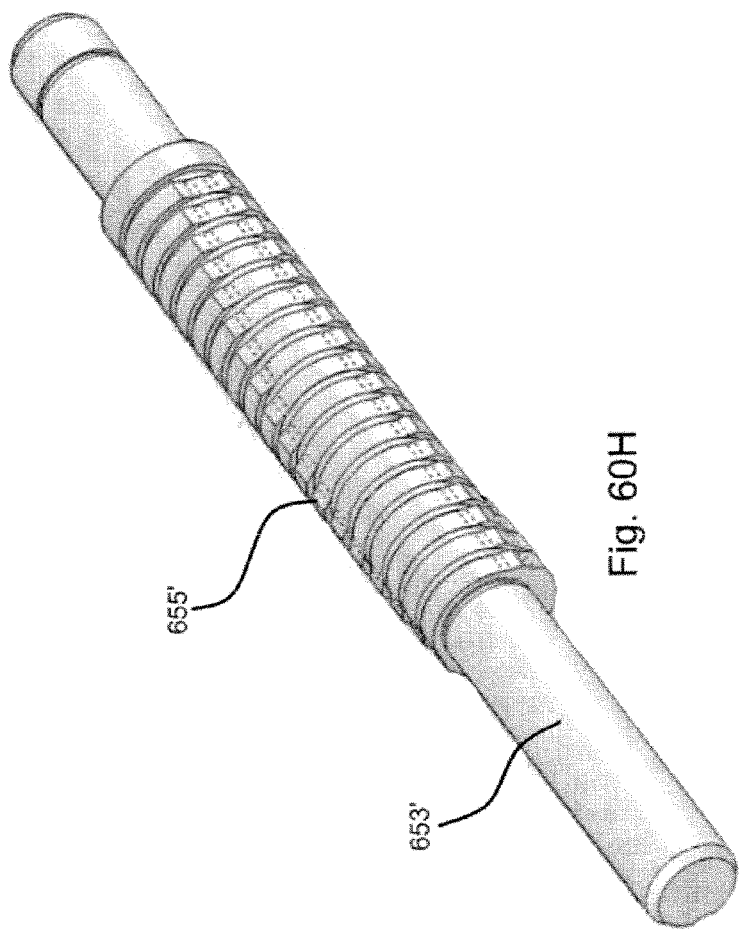

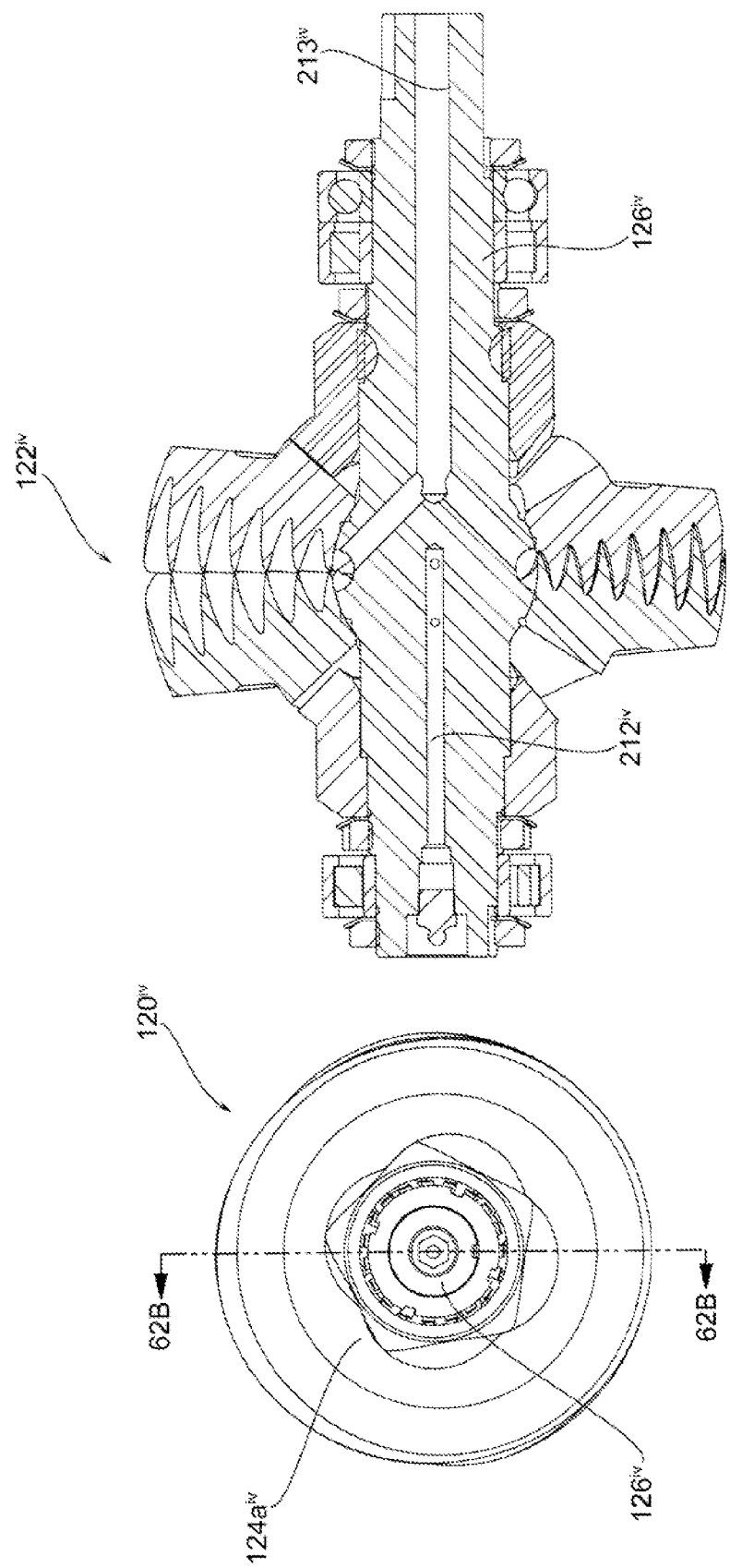

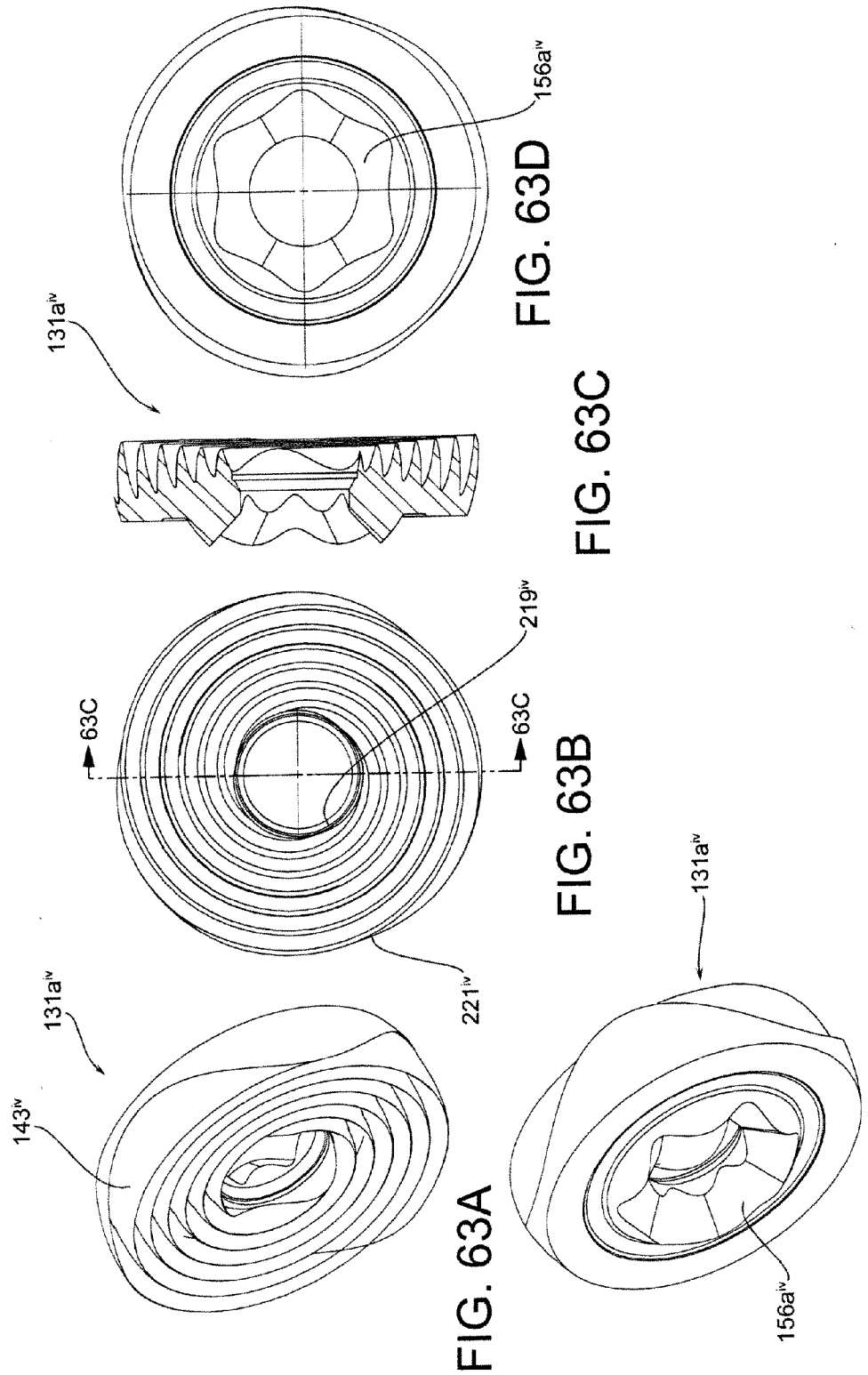

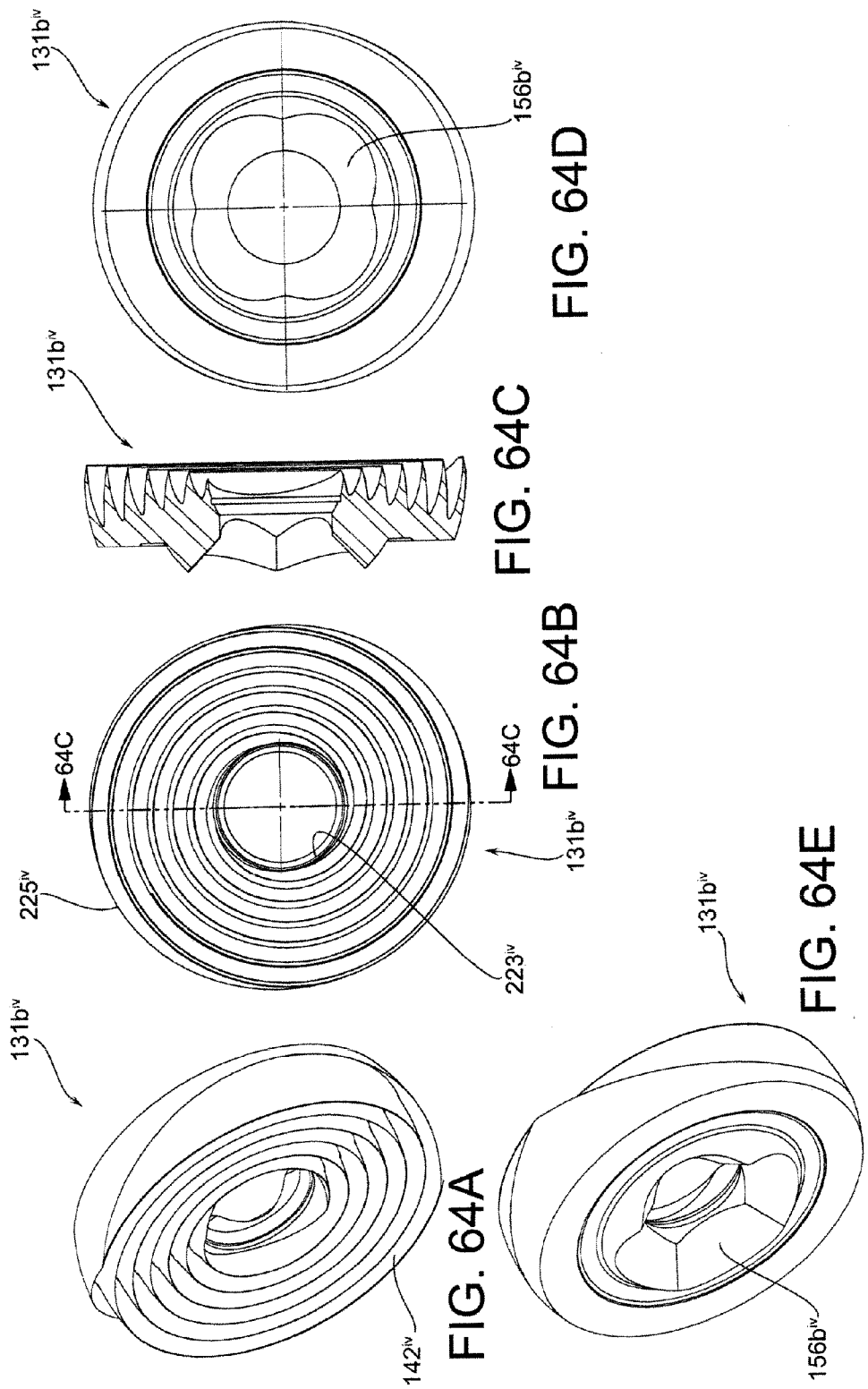

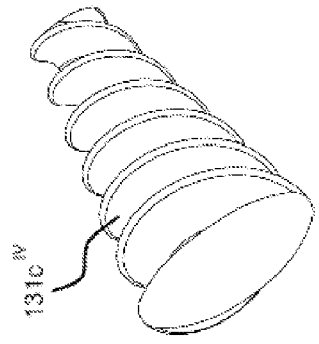
Fig. 64H
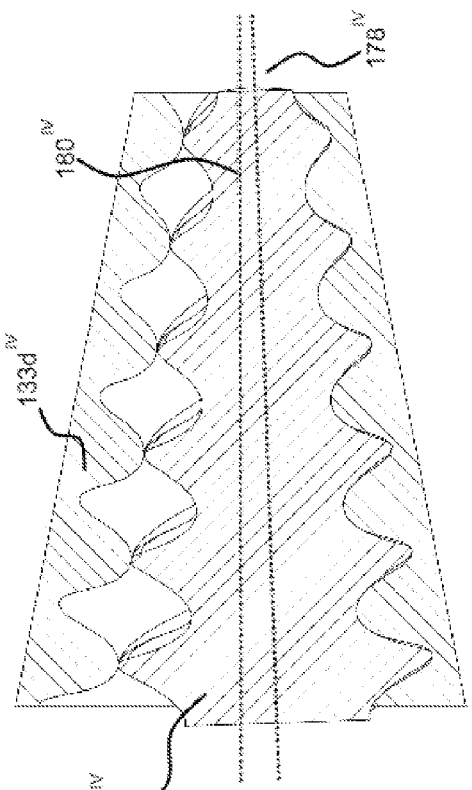
Fig. 64J
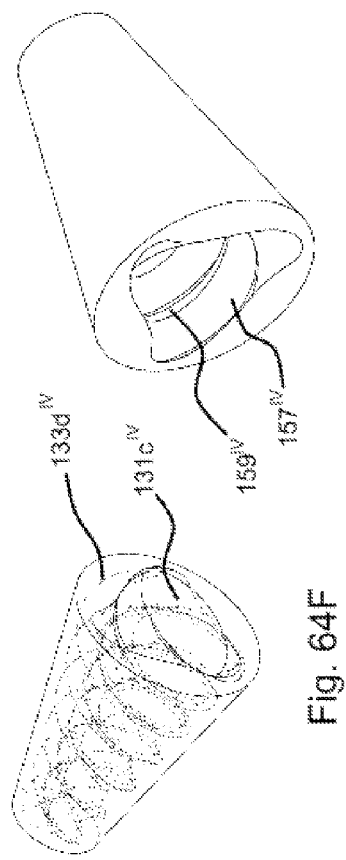
Fig. 64G
Fig. 64F
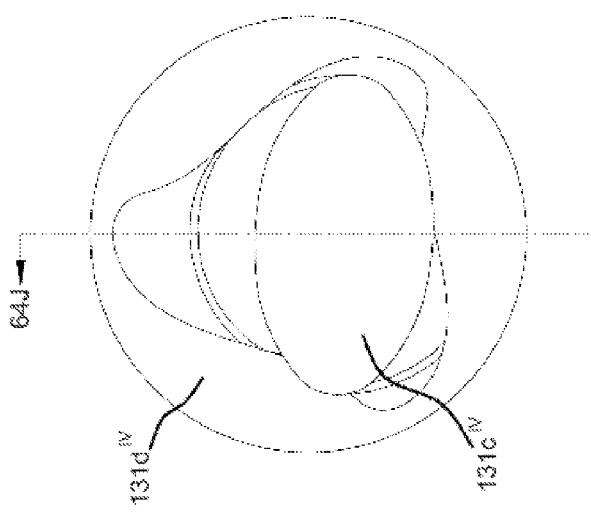
Fig. 64I

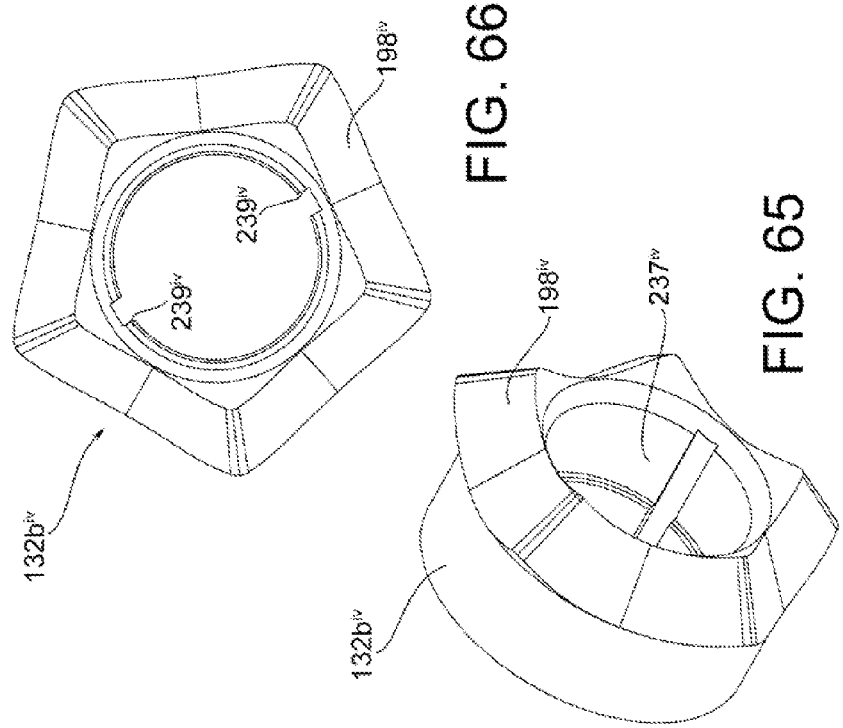

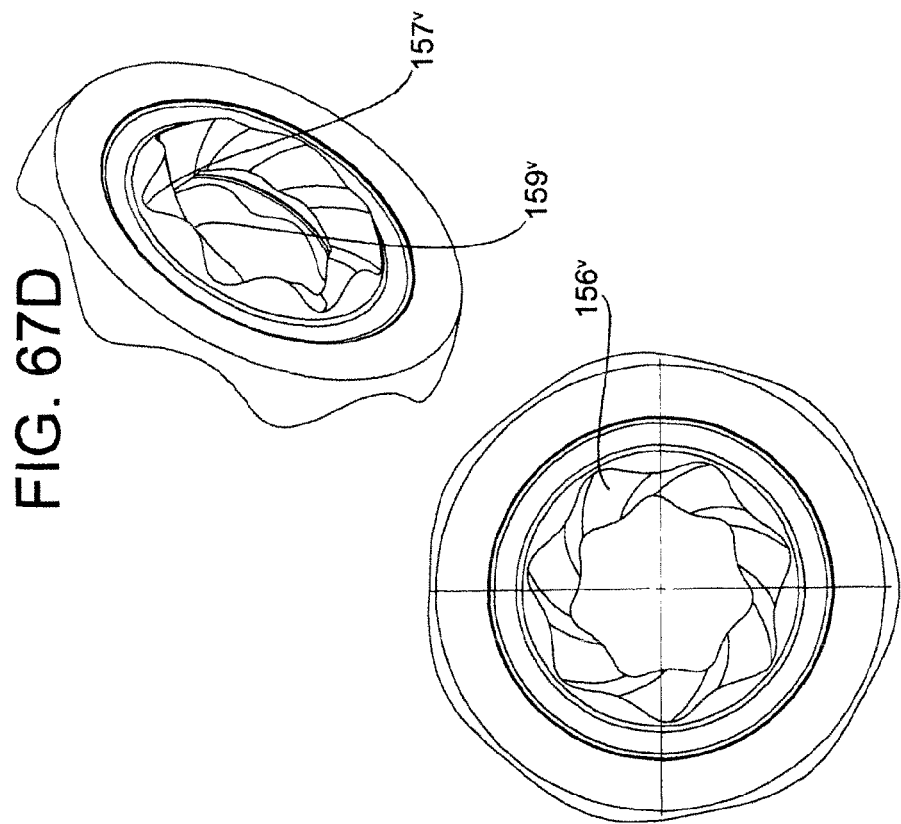
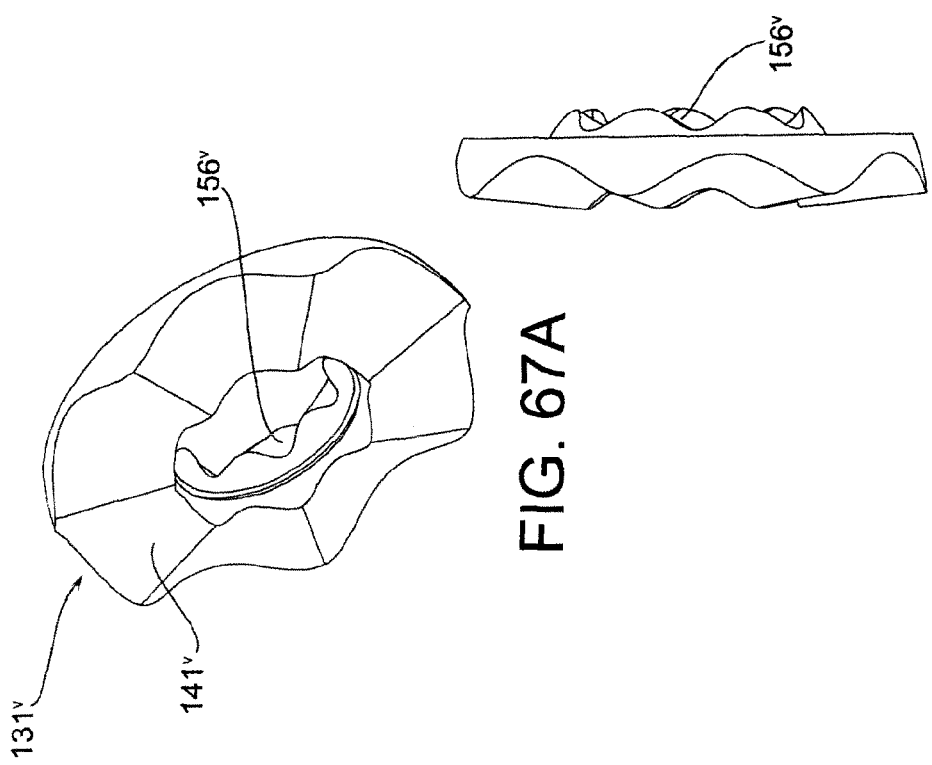

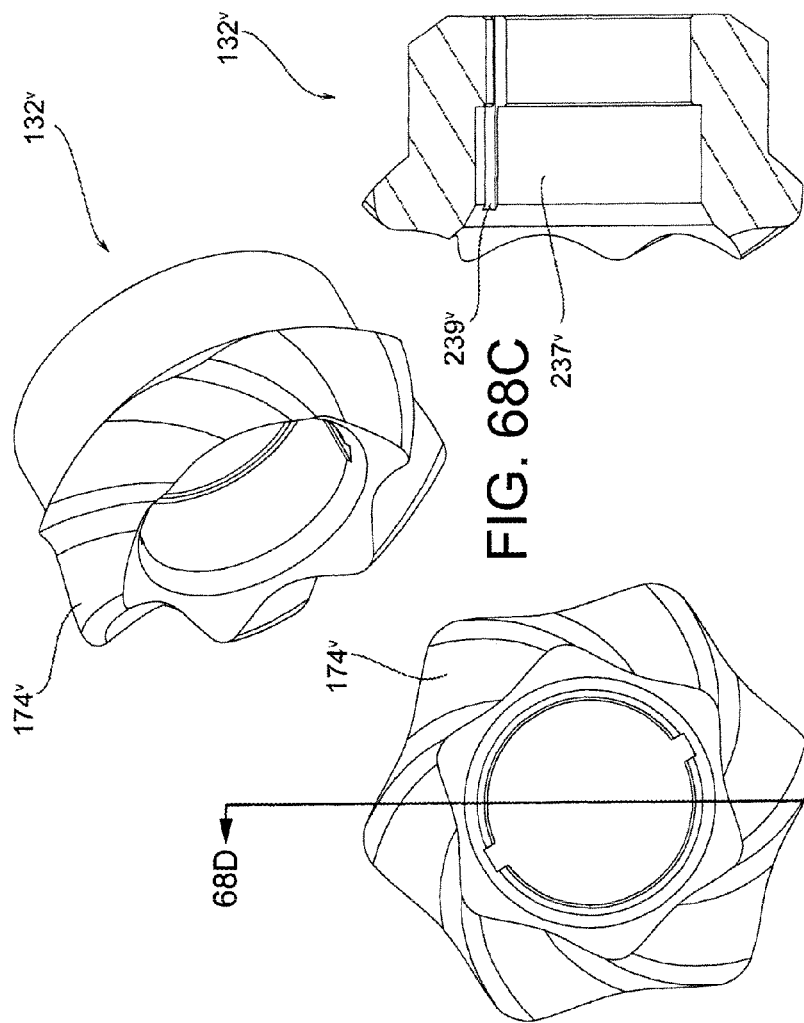
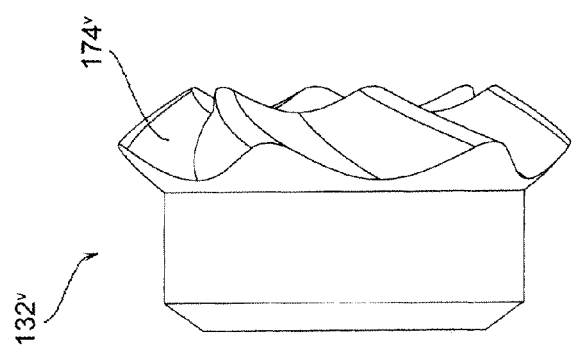

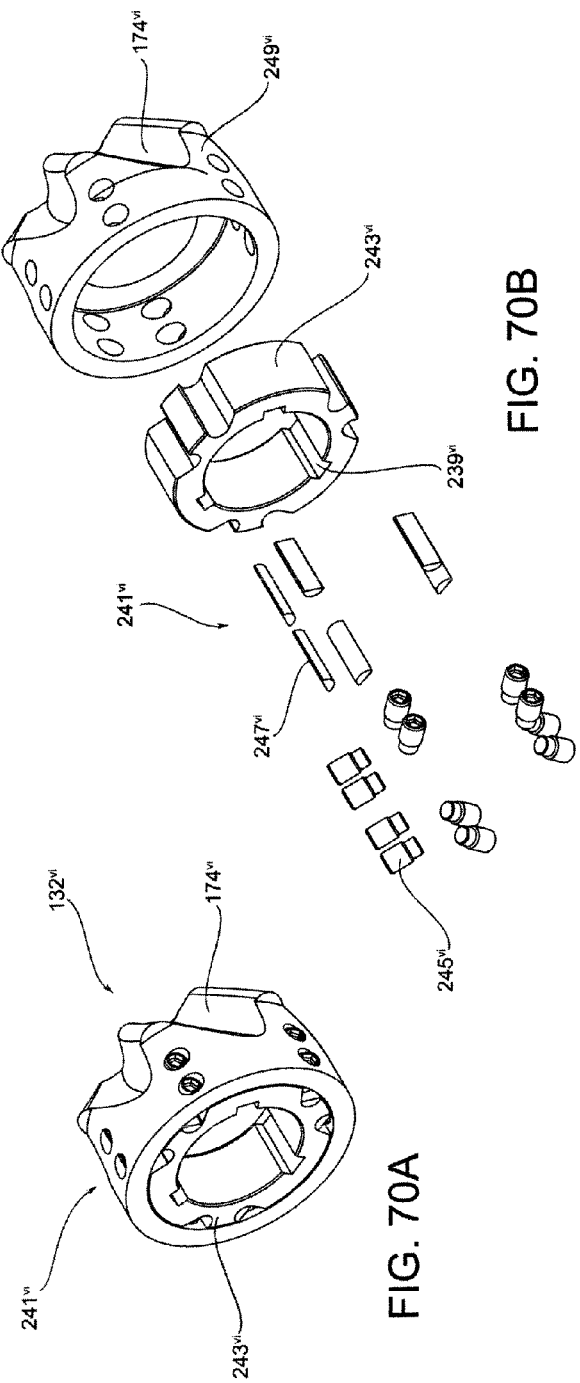

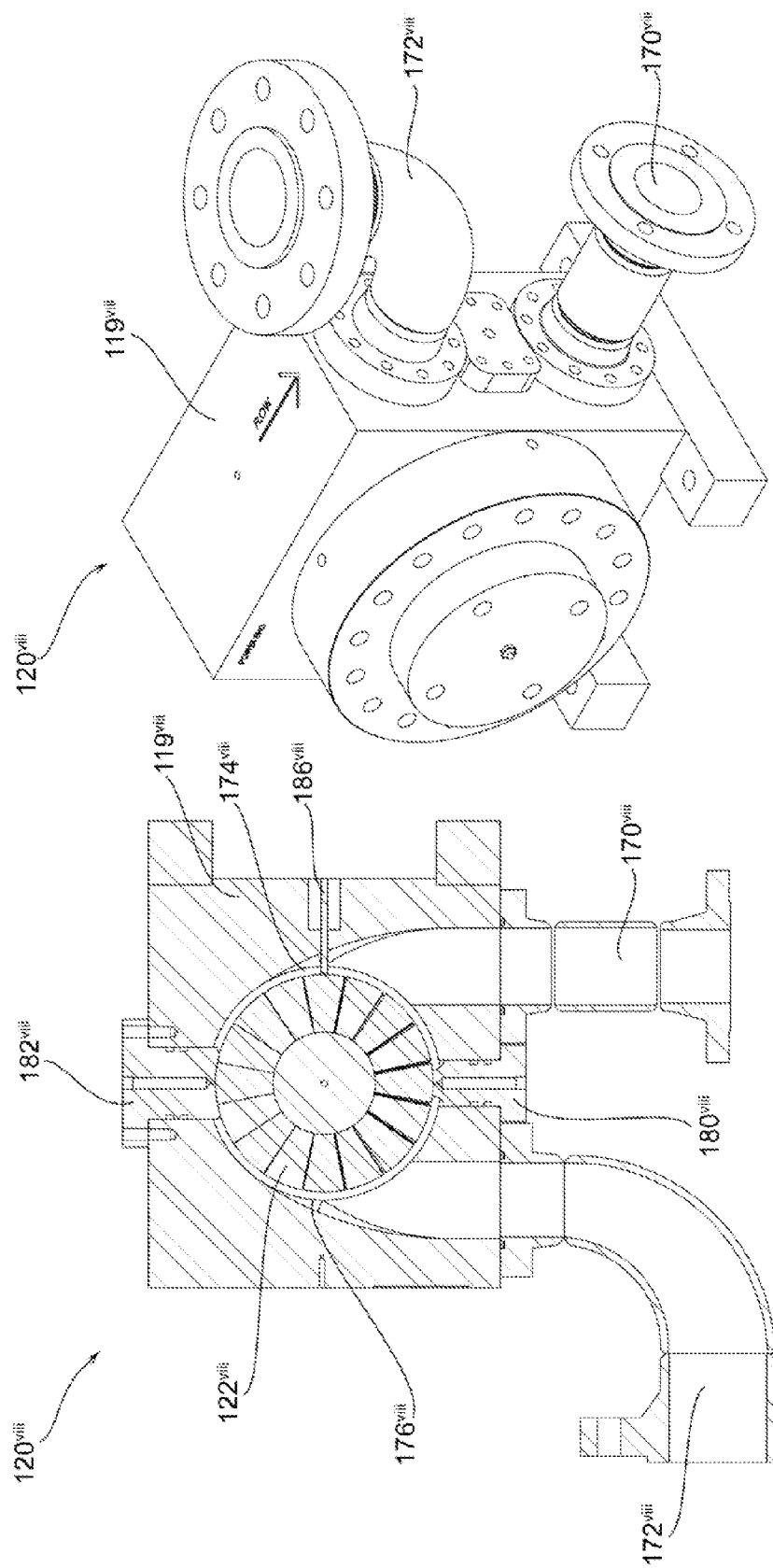

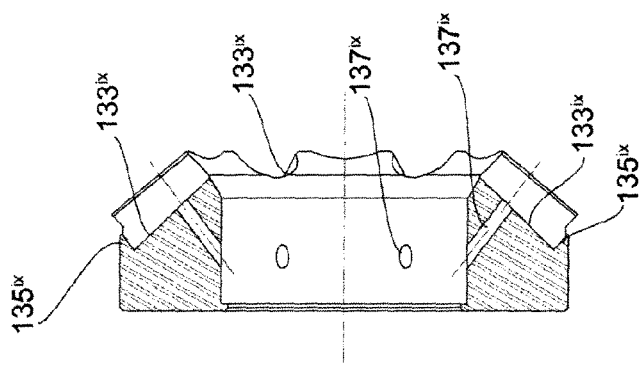
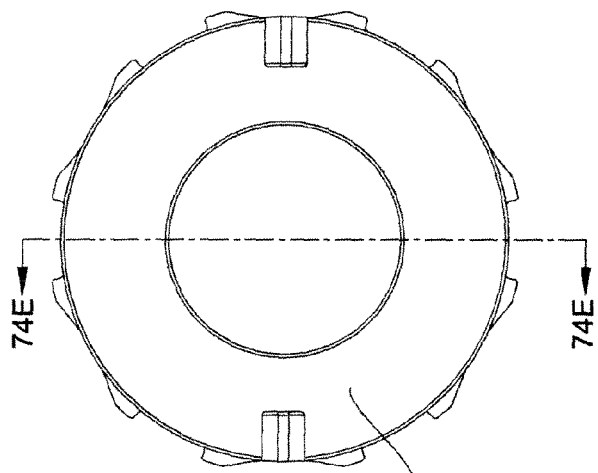
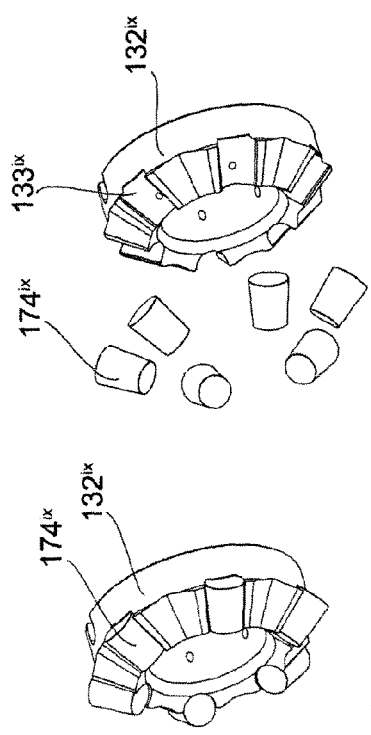
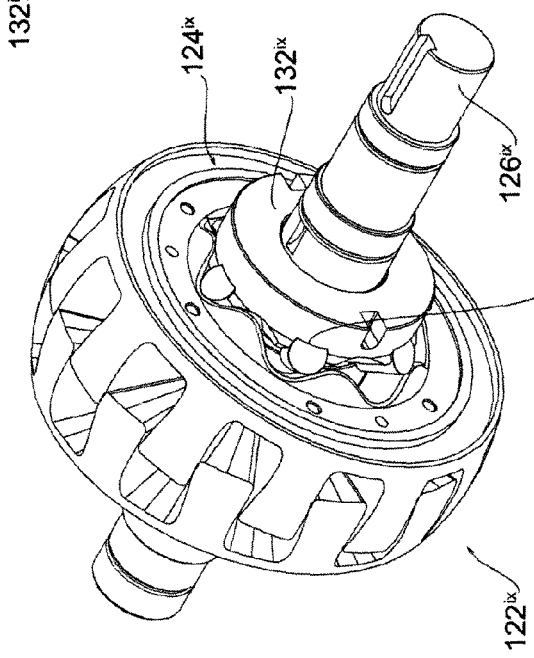

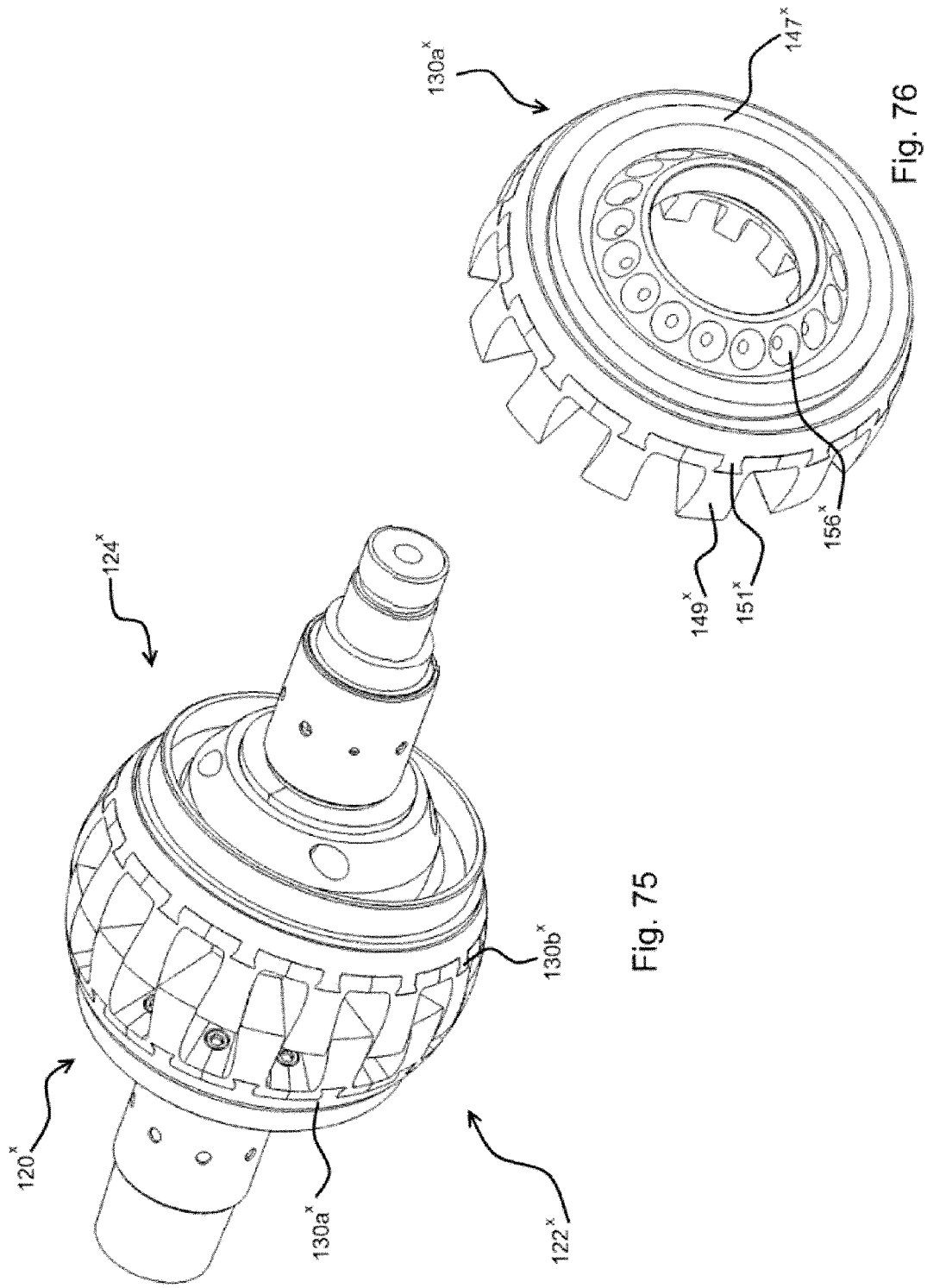

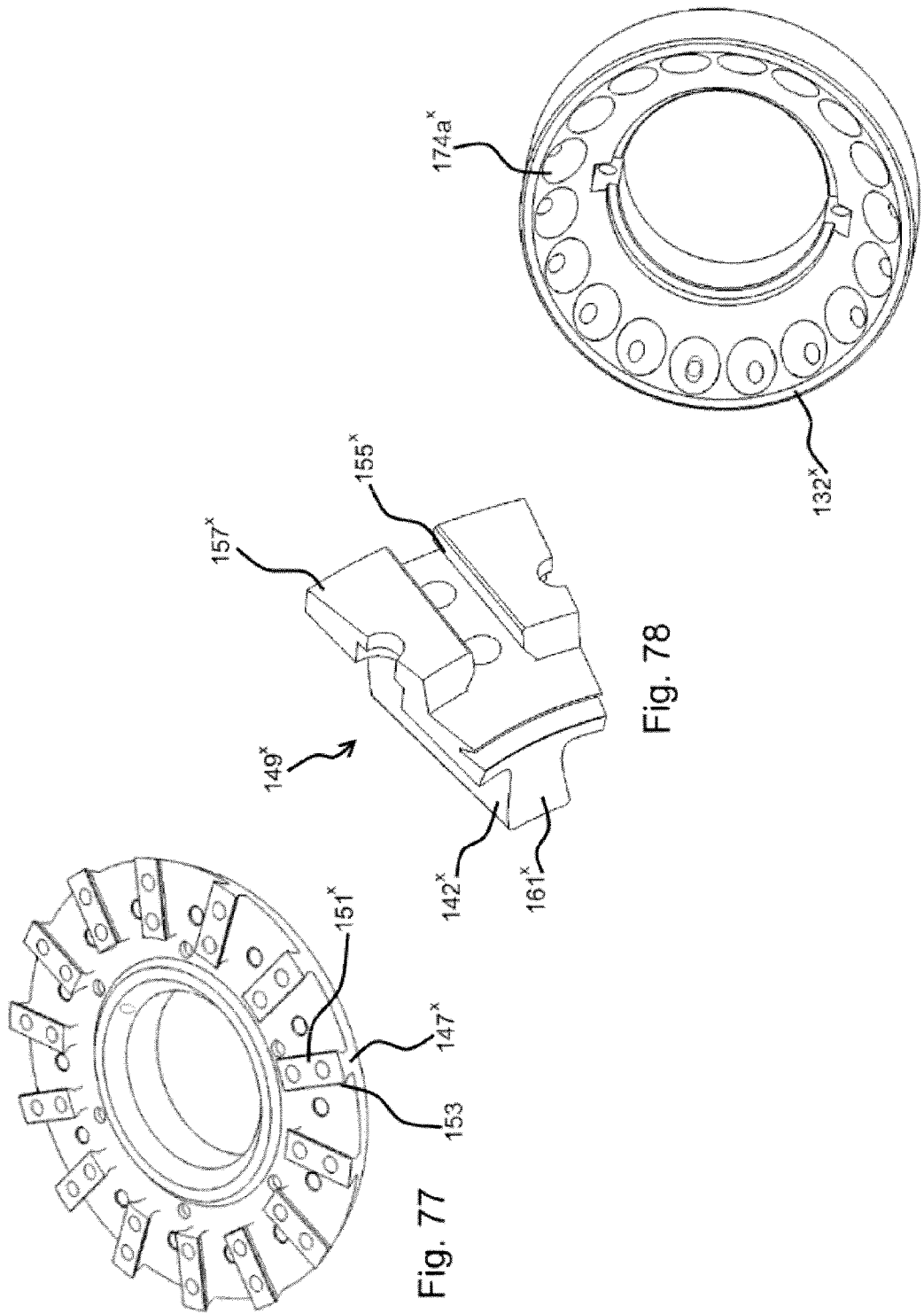

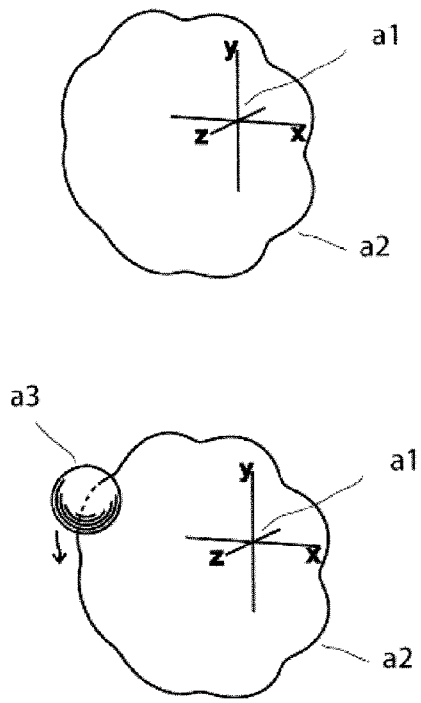
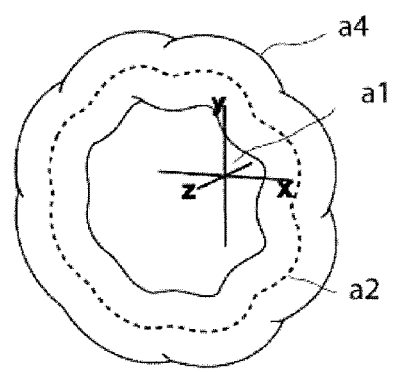
Fig. 83
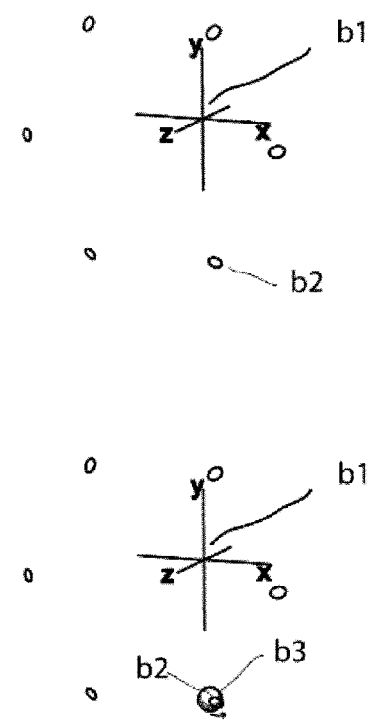
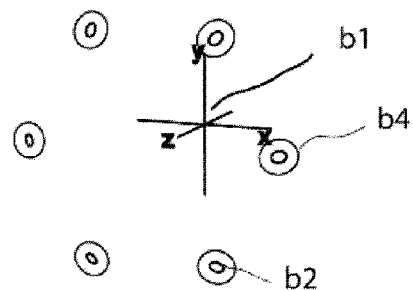
Fig. 84

INDEXED POSITIVE DISPLACEMENT ROTARY MOTION DEVICE

RELATED APPLICATIONS

This application claims priority benefit of U.S. Ser. Nos. 61/097,744, filed Sep. 17, 2008, 61/110,770, filed Nov. 3, 2008, 61/142,035, filed Dec. 31, 2008, 61/181,236 filed May 26, 2009, 61/226,199 filed Jul. 16, 2009, and 61/183,873 filed Jun. 3, 2009, each incorporated herein by reference.

BACKGROUND OF THE DISCLOSURE

Described herein is a method for creating surfaces to be utilized on rotating devices having rotational axes offset from being co-linear, and in a preferred form intersecting at a center location.

In general, the prior art related to rotary composite displacement devices has disclosed various types of mechanisms, some of which include mechanisms operating in a cyclic reciprocating-type pattern, such as a piston-and-cylinder type design which is utilized in most automotive engines. Other types of positive displacement devices, such as the Wankel engine, may have a reciprocating member which rotates with an elongated cylinder shaped somewhat like a peanut. The Wankel engine is of course a commercially successful engine utilized in various Mazda® automobiles.

However, one issue with the rotary devices as shown in the prior art is that the two mating gear-like members generally must engage one another or have a fluid film therebetween to maintain separation thereof. For example, as shown in U.S. Pat. No. 5,755,196 which is a patent assigned to the applicant's company, there is shown a device having two mating rotors, and follow-on continuation applications such as U.S. Pat. No. 6,739,852 by the same inventor show rotors having opposing engagement faces on either side of the lobe which engage a "pocket" region between two adjacent lobes on the opposing rotor. This type of device discloses a positive displacement device but, for example, if a low-viscosity fluid such as a gas is positioned within the bucket regions for a gas expander or a compressor, this low viscosity gas has difficulty maintaining a gap seal between the two rotors, and rotor-to-rotor contact can occur. The Klassen application U.S. Pat. No. 6,497,564 discloses an embodiment for balancing a slave rotor, thereby providing a prescribed gap on the slave rotor so that when a lobe is completely inserted into a bucket of an opposing rotor behind the casing seal of the surrounding casing as shown in FIG. 9 of Klassen, a fluid circuit path is provided to allow a balancing force on either side of the lobe so as to balance the slave rotor. This innovation was helpful for non-compressible fluids utilized as a pump or water turbine. However, with a gas the porting is substantially different in that a gas can be compressed. In, for example, an embodiment of a compressor, the ports are such that the contracting chambers of a rotary motion positive displacement device must reduce in volume before expelling the gas into an exit higher-pressure chamber.

Other prior art references, such as German patent 1,551,081 filed Jun. 6, 1967, show rotors constructed in a manner to have a lobe region and an opposing bucket region between two adjacent lobes of the opposing rotor. However, as shown therein, there are a plurality of small insert members, such as those shown in FIGS. 3 and 4 on the lobes, which provide sealing. As discussed in a best available translated English version of this disclosure, rollers and ball bearings are utilized to absorb the actual pressure movements. The disclosure of this particular German reference shows various types of spacing elements such as those shown in FIGS. 3 and 4 which are directly positioned on the lobes themselves.

Through various failures of rotary motion positive displacement devices, it became apparent that a need for positioning the rotors spaced apart from one another is required in certain operating environments. However, such a spacing system was not feasible because the rotors had to self-lubricate to maintain a fluid layer gap therebetween. Alternately, inserts such as that shown in the above-mentioned German 1,151,081 reference appear to be necessary to maintain a prescribed gap to mitigate wear between the rotors. Further attempts included having power sources on either rotor to apply torque thereto. In this form, if the device is utilized as (for example) a pump or a compressor, if equal amounts of torque are present on opposing rotors then there would be substantially less rotor to rotor contact. However, this requires that two torque-producing (e.g. motor) or receiving (e.g. generator) devices be placed on either opposing rotor.

As described in detail in the Klassen patent application U.S. Pat. No. 6,036,463, which is owned by the present applicant, it can be appreciated that in this application, as shown in the initial figures, there is a method of carving a rotor using a central axis that bifurcates the distance between the axis of rotation of the two opposing rotors. If one develops a cone around this axis and fixes the axis to one of the rotors, this cone will cut out a path in the opposing rotor. FIGS. 1-7C show this progression. Further, as described in U.S. Pat. No. 6,497,564, there is shown the full lobe design where the same process of forming the offset face is utilized on an adjacent portion of the rotor to make a lobe. As shown in U.S. Pat. No. 6,739,852 in FIGS. 15A-16B, the general process can be appreciated. The US patent references U.S. Pat. No. 5,755,196, U.S. Pat. No. 6,036,463, U.S. Pat. No. 6,497,564, U.S. Pat. No. 6,705,161, and U.S. Pat. No. 6,739,852 are all incorporated by reference in their entirety.

It should be noted that one issue with the embodiment as shown in the '196 patent was that there existed separation between the rotors, and not having a full lobe but rather only one-half of the lobe allowed the rotors to rotate apart from one another. Although creating a full lobe prevented such backlash, there is still the issue of rotor-to-rotor contact without some form of an indexing system.

Therefore, for a relatively considerable length of time it did not appear feasible to maintain an index position of two opposing rotors.

Disclosed herein is in one form is a novel method for having indexed rotors with a prescribed space whereby the operating lobes can maintain a prescribed rotational distance from one another during rotation and an indexing lobe positioned in one form at a longitudinally rearward portion of each lobe is utilized.

BRIEF DESCRIPTION OF THE DRAWINGS

FIG. 20 shows a side view of a central shaft;

FIG. 21 shows a side view of a central shaft at a 90° angle of rotation from FIG. 20;

FIG. 22 shows a cross-sectional view of a shaft in one form taken along line 22-22 of FIG. 21;

FIG. 28 shows an isometric view of a modified drive rotor;

FIG. 29 shows side and front views of a modified drive rotor;

FIG. 30 is an isometric and side view of an opposing drive rotor;

FIG. 58 shows a side sectional view of a pulse detonation device;

FIG. 59 shows a full cross-sectional view taken from line 59-59 of FIG. 58;

FIG. 60H shows an example of a interior cam member that can be used in one form for adjusting the number of plates to be engaged in a sealing engagement or non-sealing engagement orientation;

FIG. 60G. shows a stack of adjustment slide plates;

FIG. 62A shows an end view of the device showing the number of lobes of the indexing system;

FIG. 62B shows a cross-sectional view taken at line 62B-62B of FIG. 62A;

FIG. 63A shows a spiral design in an isometric view of a drive rotor in a broader scope and indexing rotor;

FIG. 63B shows a front view of the spiral rotor;

FIG. 63C shows a cross-sectional view taken at line 63C-63C of FIG. 63B;

FIG. 63D shows a rearward view showing the indexing surface of the rotor;

FIG. 63E shows an isometric view of the rotor;

FIG. 64A shows an isometric view showing the front portion of a spiral rotor adapted to interface with the rotor as shown in FIGS. 63A-63E;

FIG. 64B shows a front view of the spiral rotor;

FIG. 64C shows a sectional view taken at line 64C-64C of FIG. 64B;

FIG. 64D shows a longitudinal rearward view of the spiral rotor showing one form of an indexing surface;

FIG. 64E shows an isometric rearward view of the spiral rotor;

FIG. 64F shows another embodiment of a device to convert energy having an inner and outer rotor member;

FIG. 64G shows an outer rotor member having interior mounds and valleys;

FIG. 64H shows the interior rotor member in one form;

FIG. 64I shows the front view of the device to convert energy;

FIG. 64J shows a cross-sectional view taken at line 64J-64J of FIG. 64I showing the respective axes of the inner and outer rotors and the engagement of the interior mounds to the opposing valleys and vice versa between the rotors;

FIG. 65 shows an isometric view of an index housing having an index surface;

FIG. 66 is a front view of the index housing which is operatively configured to engage the corresponding index surface of the main rotors in the manner as shown in FIG. 62A;

FIG. 67A is an isometric view of another embodiment of a drive rotor having a spiral index surface;

FIG. 67B is a side view of the drive rotor member;

FIG. 67C is a rear view showing the spiral index offset surface;

FIG. 67D shows a rearward isometric view of the drive rotor;

FIG. 68A shows a side view of a fixed index rotor operatively configured to rotate with a center through shaft;

FIG. 68B shows a front longitudinal view of the index rotor;

FIG. 68C shows an isometric view of the index rotor;

FIG. 68D shows a cross-sectional view of the index rotor taken along line 68D-68D of FIG. 68B;

FIG. 70A shows an isometric view of an indexer adjustment system in one form as a part of an extra housing;

FIG. 70B shows an exploded view of the indexer adjustment system;

FIG. 70C shows a side view of the indexer housing;

FIG. 70D shows a cross-sectional view taken at line 70D-70D of FIG. 70C showing the adjustment members operatively configured to reposition the base ring with respect to the outer ring;

FIG. 72 shows an isometric view of one form of a pump;

FIG. 73 shows a cross-sectional view of a pump;

FIGS. 74A-74E shows another embodiment of an indexing system.

FIG. 75 shows another embodiment of the device to convert energy, where the lobe members are attached to a base ring at an attachment location;

FIG. 76 shows another attribute of the new embodiment, where an indexing system is shown utilizing a ball bearing member as an indexing surface;

FIG. 77 shows one form of a base ring forming a portion of a rotor;

FIG. 78 shows one form of a lobe insert;

FIG. 79 shows one form of an indexer housing, having a surface which is a portion of the indexer surface to transmit rotational torque for positioning the rotors and other purposes;

FIGS. 83-84 show various mathematical principles of defining a ballbearing, indexing-type surface;

FIGS. 85-88 show another embodiment, illustrating the ballbearing indexer-type system.

FIGS. 89-92 show another embodiment with a plurality of bearing members.

DESCRIPTION OF THE PREFERRED EMBODIMENTS

Figure 1:
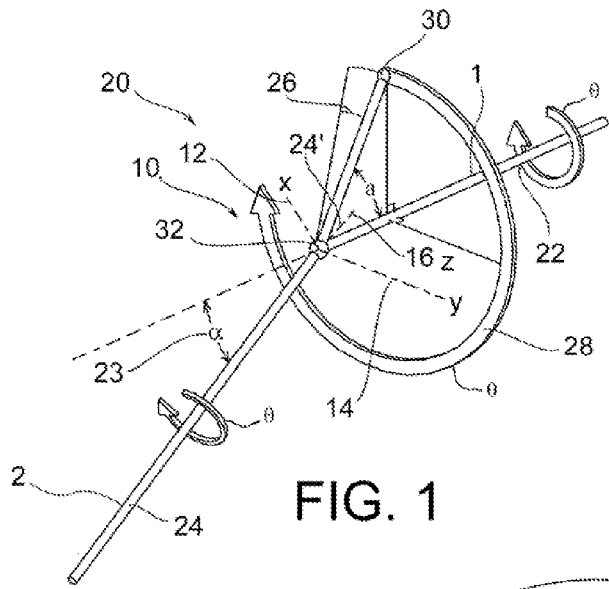
FIG. 1 shows a general geometric concept as applied to rotors for creating a base curve between two rotors having rotational axes that intersect and are offset from co-linear.

As shown in FIG. 1, there is a first axis system 20, which comprises a first axis 22, a second axis 24, and a reference axis 26. In general, for purposes of discussion, the reference axis 26 is set at a prescribed angle "a" about the first axis 22 and as axes 22 and 24 rotate by an equal amount, the arc path 28 is formed and a prescribed amount of rotation about axis 1 is defined by the value theta (θ). It should be noted that there is a correlating amount of rotation of the value theta in a first form wherein an equal number of lobes are formed. However, the amount of rotation about axes 1 and 2 can alter in further embodiments described herein.

As shown in FIG. 1, a reference axis system 10 is defined wherein the axis 12 indicates an X direction and the axis 14 indicates the Y direction. Further, the axis extension indicated at 24', otherwise referred to as 16, is the Z direction, which is co-linear with the axis 24 which is the center of rotation of the rotor corresponding therewith. The axes system is generally utilized as described further below related to mathematics for forming a base curve 33 shown in FIG. 4, which will be described at an abstract level.

Figure 2:
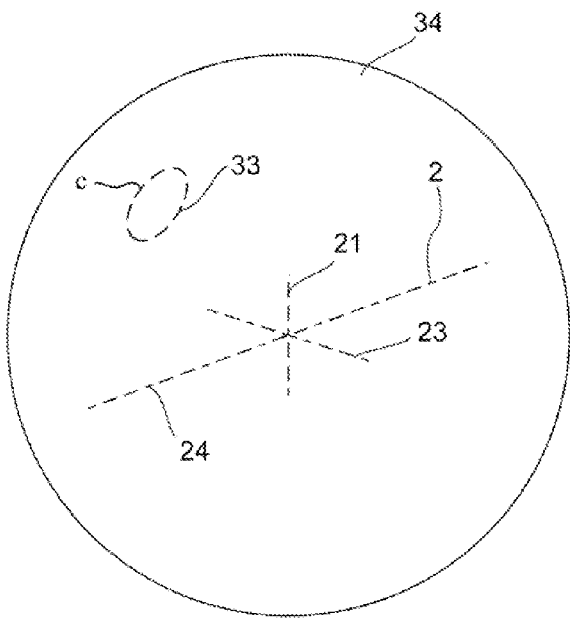
FIG. 2 shows the resultant base curve positioned on the outer surface of a sphere.

Therefore, it can be appreciated that the arc path 28 is circumferentially positioned around the first axis 22. However, given a reference point with respect to the rotating axis 24, the path of the reference point 30 defines a base curve 33 as shown in FIG. 2.

Before further description, some reference points and directions will be defined to aid in the description. The point indicated at 32 is an intersect point of the first axis 22 and the second axis 24. The alpha angle (α) as shown in FIG. 1 is the offset angle from being co-linear between the intersecting axes 22 and 24. As further described herein, on both axes 22 and 24, a value positioned further away from the intersect point 32 is referred to as a longitudinally rearward or distant position. Further, any direction extending outwardly or substantially outwardly from the intersect point 32 is considered to be radially outward, and 90° to this direction is a tangential direction.

It should be noted that in the prior art as described in the U.S. Pat. No. 5,755,196 patent, a reference axis was utilized which was an angle alpha/2 plus 90° directly between the two axes. This created a reference curve having a teardrop shape, which was believed to be a necessary curve for a rotor at the time of that application. Now referring to FIG. 3, it can be appreciated that the reference axis 26 is repositioned at a value "a" from the axis 22 whereby the newly created base curve 33 is positioned on an outer sphere 34. For purposes of definition, the axis 21 with reference to axis 2 is generally described as a vertical axis, and the axis 23 will be described as a lateral axis. Of course the orientation of these axes is relative to the position of the base curve 33 as positioned in FIG. 2.

Figure 3:
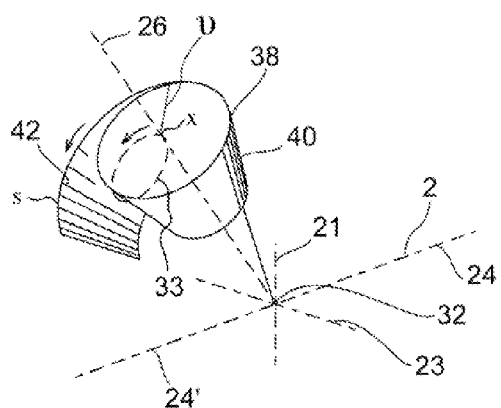
FIG. 3 shows the path of travel of a central reference axis around the base curve between the relative rotation of both rotors whereby a defining surface, which in one form can be a frustoconical surface or other shape, is positioned around the central reference axis.
Figure 4:
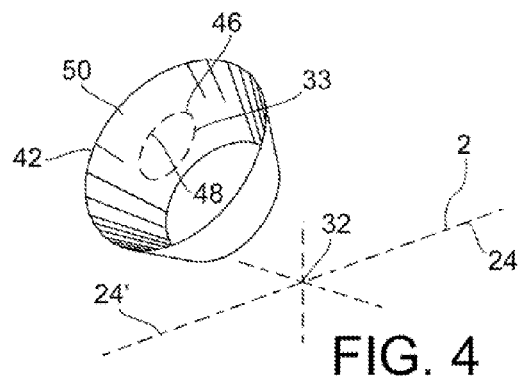
FIG. 4 shows the offset surface which in one form is based upon the defining surface as shown in FIG. 3.

Now referring to FIG. 3, it can be appreciated that if a defining surface 38 is provided which in one form can be a conical member, this member has an outer surface 40 which is a prescribed distance from the reference axis 26. It should be noted that as shown in FIG. 3, the view is rotated approximately 180° from the view of FIG. 1 and the extension portion 24' is shown in the left-hand forward portion in FIG. 3. Therefore, it can be appreciated that as the reference axis 26 rotates about the first axis 22 (only shown in FIG. 1) a simultaneous theta value (θ) with the axis 24, the reference axis 26 as shown in FIG. 3 will follow the base curve 33. In a similar manner, the defining surface 38 will move with axis 26 to create the offset surface 42. As shown in FIG. 4, it can now be appreciated that the offset surface 42 is complete, whereas the defining surface 38 in one form is a uniform distance around the axis 26. However, other types of defining surfaces can be utilized such as ellipses, and this is further described herein. It should further be noted that although the defining surface 38 is shown having a frustoconical-like surface, for every prescribed distance from the intersect point 32, a different set of surfaces can be formed with respect to the distance from the intersect/center point 32. In other words, the outer surface 40, which as noted above in one form is conical, could have any type of variations at given values from the center point which are defined as values of the variable "rho" (ρ).

Now referring to FIG. 4, in this form it can be appreciated that for any theta value (θ) around the base curve 33, there is a corresponding location on the offset surface 42. For example, at the position as shown in FIG. 1, the theta value as shown in FIG. 4 is at zero at approximately point 46. At a theta value of 90°, the position along the base curve 33 would be at the location approximately shown at 48, which correlates to a position on the offset surface 42 at approximately the point location 50.

Figure 5:
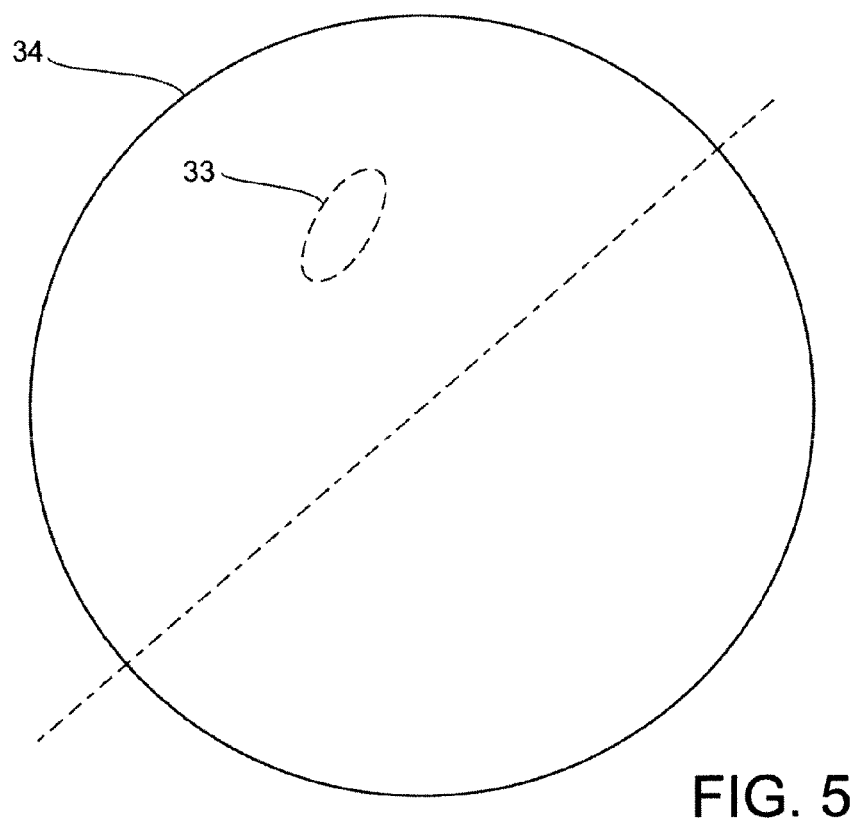
FIG. 5 shows the base curve positioned on the outer spherical surface of a sphere.
Figure 6:
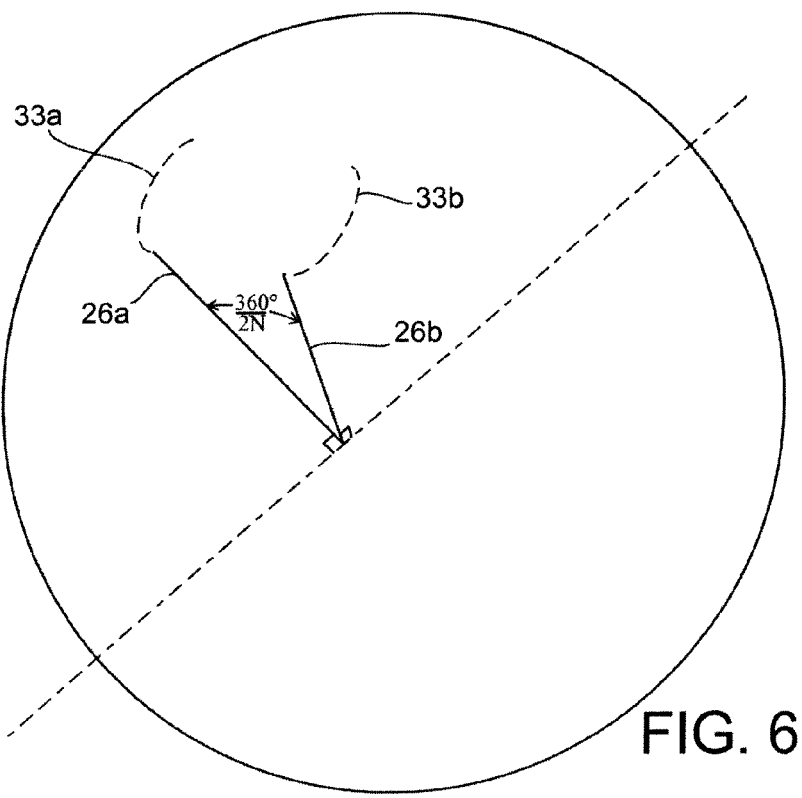
FIG. 6 shows the base curve being separated into two separate radially spaced locations.
Figure 7:
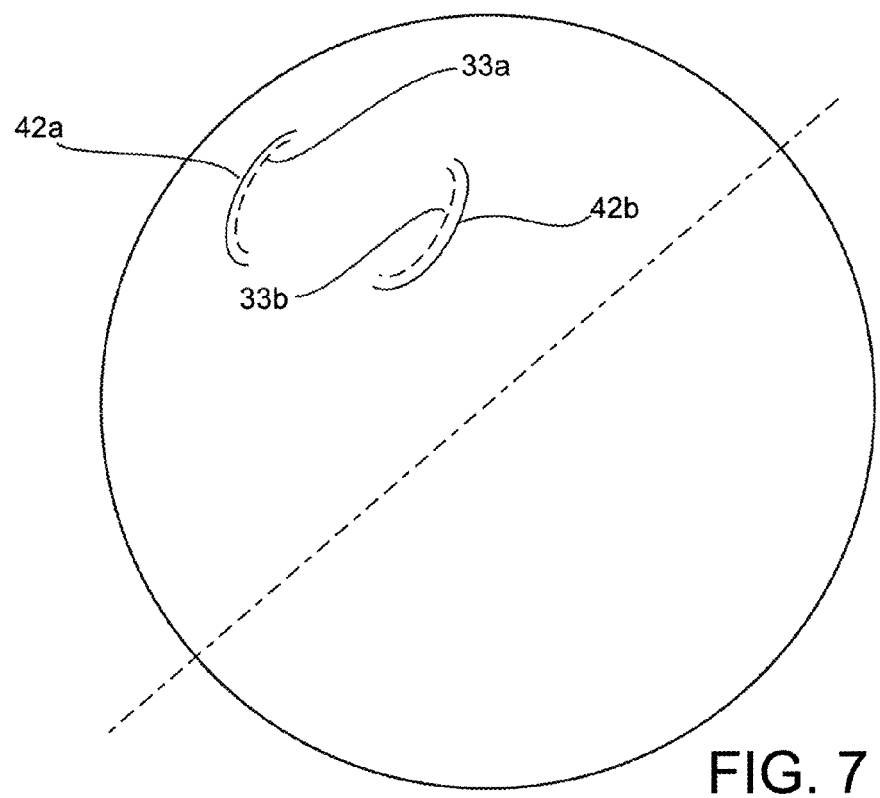
FIG. 7 shows an offset surface from the base curve corresponding to an offset surface from a circular engagement tip on the opposing rotor.

Now referring to FIG. 5, it can be generally seen that the base curve 33 is positioned upon the outer sphere 34. As shown in FIG. 6, it can be appreciated that two reference axes 26a and 26b can be defined to have a separation thereof, which is 360° divided by 2 times the number of desired lobes. Therefore, the base curve portions 33a and 33b are offset rotationally from one another. Now referring to FIG. 7, it can be appreciated that offset/surfaces 42a and 42b can be created in a similar manner as shown in FIGS. 3 and 4 above. However, it can be further appreciated that the rotational distance from the base curve portions 33a and 33b is a lower value than the example as shown in FIGS. 3 and 4 discussed above. It can now further be seen that in FIG. 8 at the upper theta value location generally indicated at 56a and 56b, a cutting surface 60a and 60b having the approximate same diameter as the cutting cone to define the offset surfaces 42a and 42b is positioned at this upper theta value region. As will become apparent further herein, a portion of one rotor operates as an engagement tip to engage the offset surface of the opposing rotor.

Figure 8:
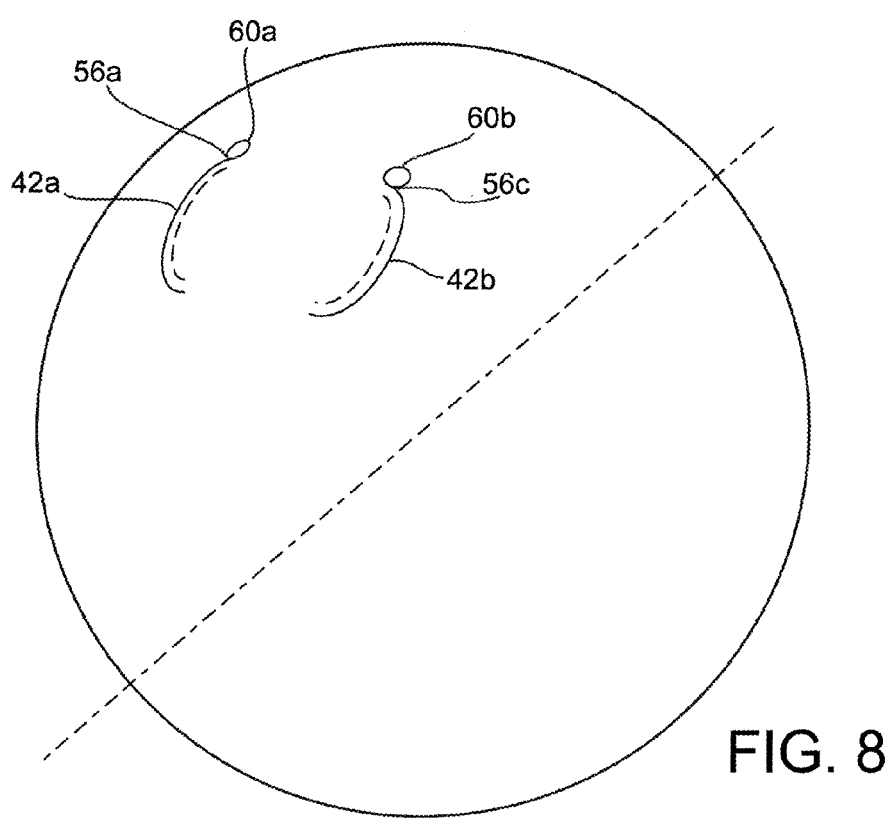
FIG. 8 shows the positioning of an engagement tip upon the rotor for engagement of the opposing offset surfaces as shown in FIG. 12.
Figure 9:
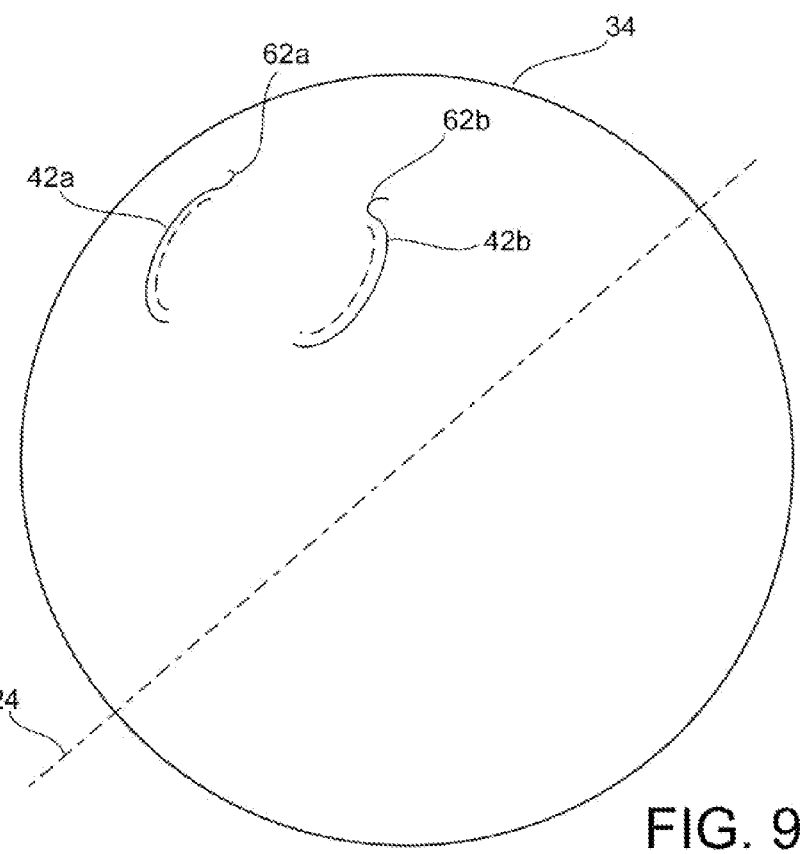
FIG. 9 shows the final formation of the engagement tip with the adjacent offset surface.

FIG. 9 shows that the circular members previously referred to as the cutting surfaces 60a and 60b of FIG. 8 are integral with the offset surfaces 42a and 42b. Therefore, these engagement tips now referred to as 62a and 62b are continuous with the offset surfaces 42a and 42b respectively. It should be reiterated that in one form all of these lines lie on the outer surface of the reference outer sphere 34. It should further be reiterated that for every prescribed distance rho from the intersect point 32 (see FIGS. 1-4), there can be defined a completely unique set of rotors since the value of rho (the distance from the centerpoint) does not change since the two axes of rotation 22 and 24 are intersecting and are offset from co-linear.

Figure 10:
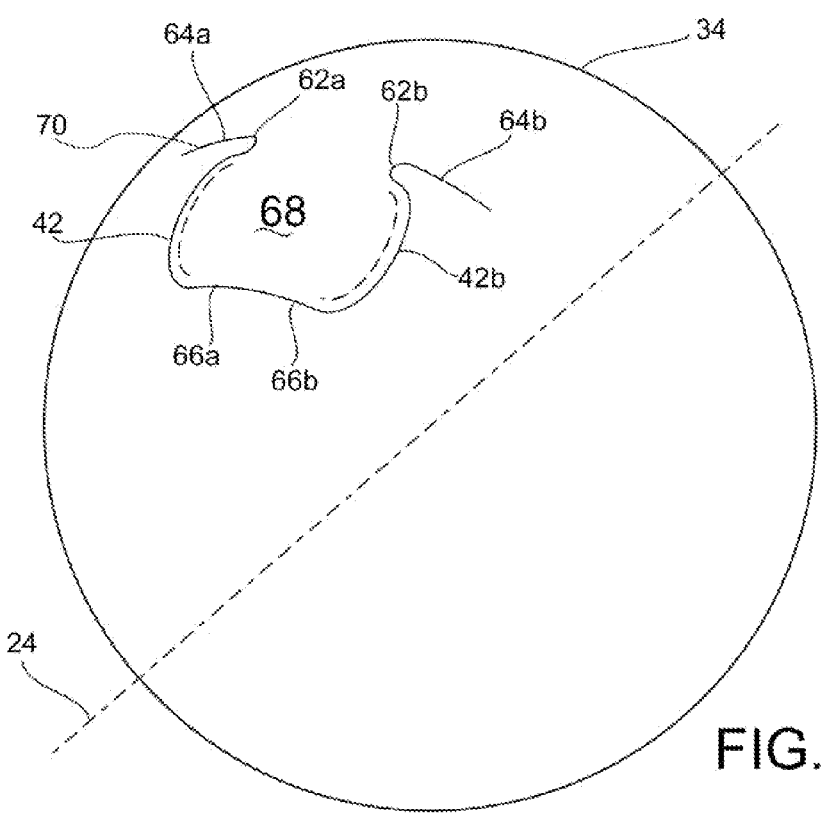
FIG. 10 shows one form of making connecting surface lines for constructing a repeatable pattern around the central axis of rotation of the rotor.

Therefore, now referring to FIG. 10, the central forward lobe surfaces 64a and 64b are defined and connected to the end regions of the engagement tips 62a and 62b respectively. Further, the central rearward lobe surfaces 66a and 66b extend around the outer surface of the outer sphere 34 to connect and fully define a bucket region defined at the central region 68 interposed between the offset surfaces 42a and 42b.

Figure 11:
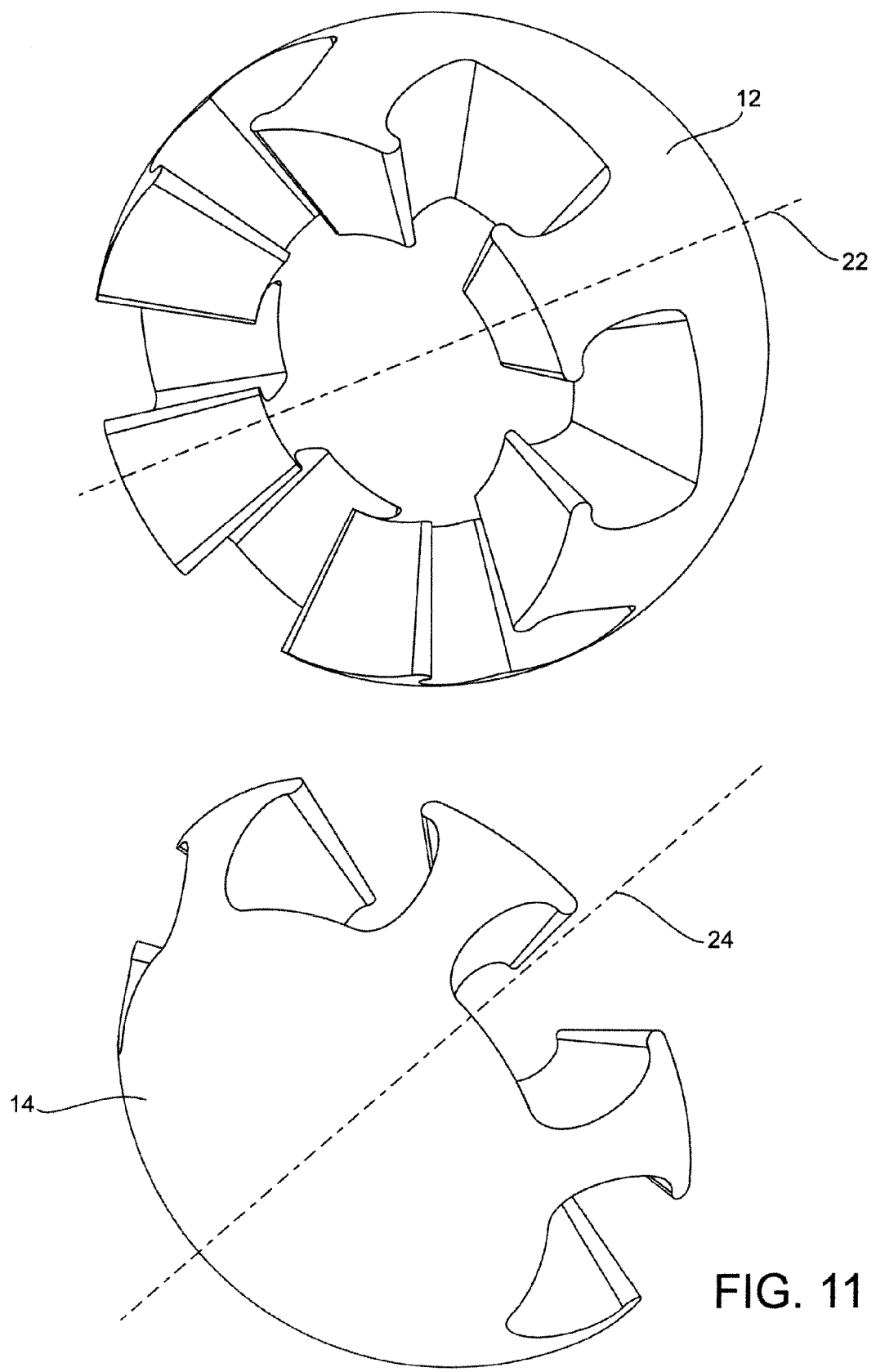
FIG. 11 shows the formation of first and second rotors where it can be appreciated that the axes of rotation are offset from co-linear.

Therefore, copying the line pattern as shown in FIG. 10 around the axis 24 at an integer value N which correlates to the number of defined lobes creates an outer profile shown in the second rotor 14 as shown in FIG. 11. It should be noted that although the line pattern generally referred to at 70 in FIG. 10 is referred to as various surfaces, at a theoretical level, the pattern 70 is actually a line drafted around the outer surface of an outer sphere 34. Giving any radial depth to this line provides a workable surface to have operating lobes as shown in FIG. 11. However, it should be reiterated that the various surfaces extending radially inward and outward need not be conical, and for every value of rho, the offsets, cone values, and offset surfaces all can be changed and, for example, could be a function of rho ($\rho$). However, one constant is the base curve 33 as shown in, for example, FIGS. 3-5, whereby having a fixed reference axis 26 to one of the rotors and rotating this with respect to the other rotor creates a base curve 33 which is a geometric and constant curve irrespective of the various defining surfaces 38 and offset surfaces 42. However, adjusting the location of the reference axis with respect to rho would of course create a different base curve for each value of rho.

Figure 12:
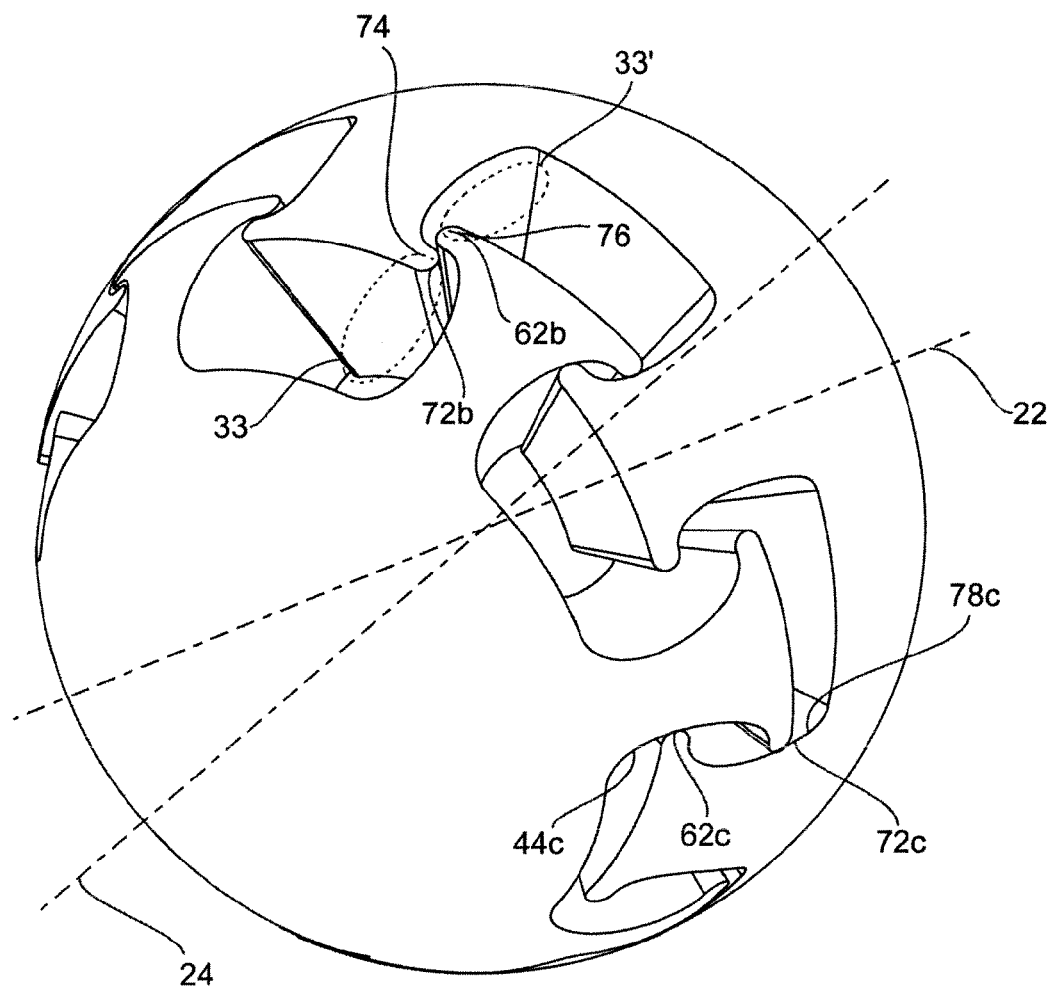
FIG. 12 shows the first and second rotors in engagement with one another.

Now referring to FIG. 11, it can be seen how the first rotor 12 and the second rotor 14 are positioned in a partially exploded view, each having a center rotation axis 22 and 24 respectively. It can be appreciated that the axes 22 and 24 are offset from co-linear, and these axes are shown in an isometric view with respect to the first and second 12 and 14. Referring to FIG. 12 it can generally be appreciated that the center of the engagement tip 72b is generally indicated at 74, and the center 74 travels around the base curve 33. In a similar manner, the engagement tip 62b also shown in the upper portion of FIG. 12 has a centerpoint 76 which thereby travels around the opposing base curve 33'. As can generally be appreciated in FIG. 12, each of the engagement tips as shown in the lower right-hand portion referred to as 62c and 72c are in engagement with the offset surfaces 44c and 78c. In one form the lobe members can be inserts such as that as shown in FIGS. 75-79 discussed below. An insert would allow the rotors to be assembled.

Of course, the above description related to FIGS. 6-12 shows a method of combining an offset surface and engagement tips of opposing rotors to form a positive displacement device. Described further herein is a method to utilize a surface such as that shown in FIG. 4 for a positional indexer to maintain a prescribed spacing between two rotors throughout their rotation with one another.

Figure 13:
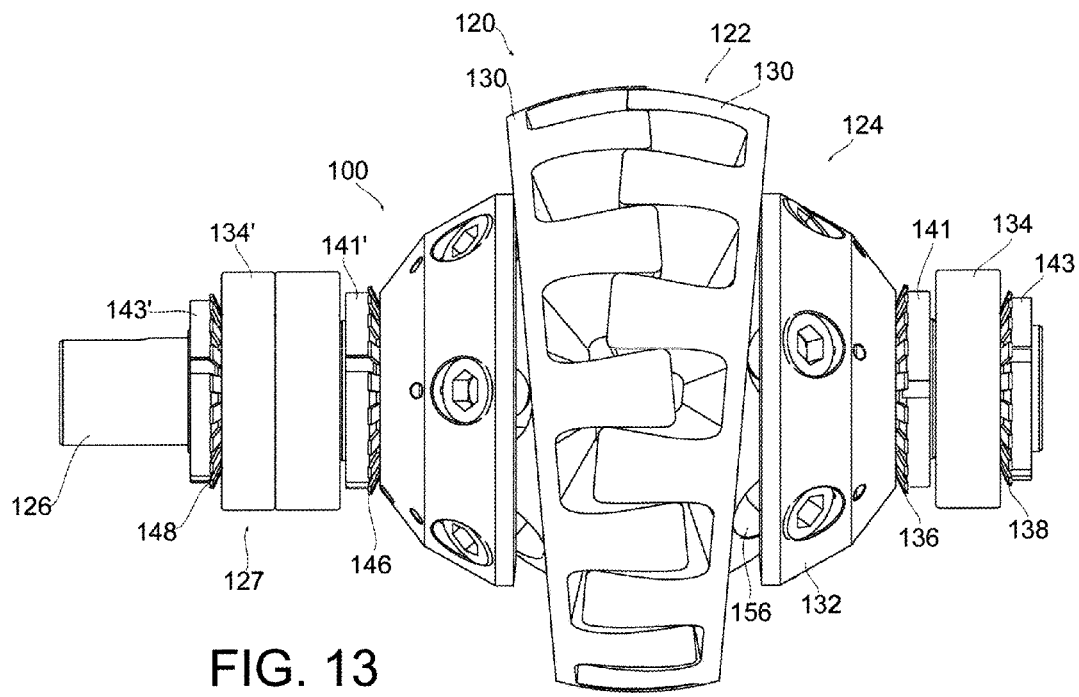
FIG. 13 shows a side profile view of a device to convert energy having a center pair of rotors and an indexing system for positioning the rotors with respect to one another.
Figure 17:
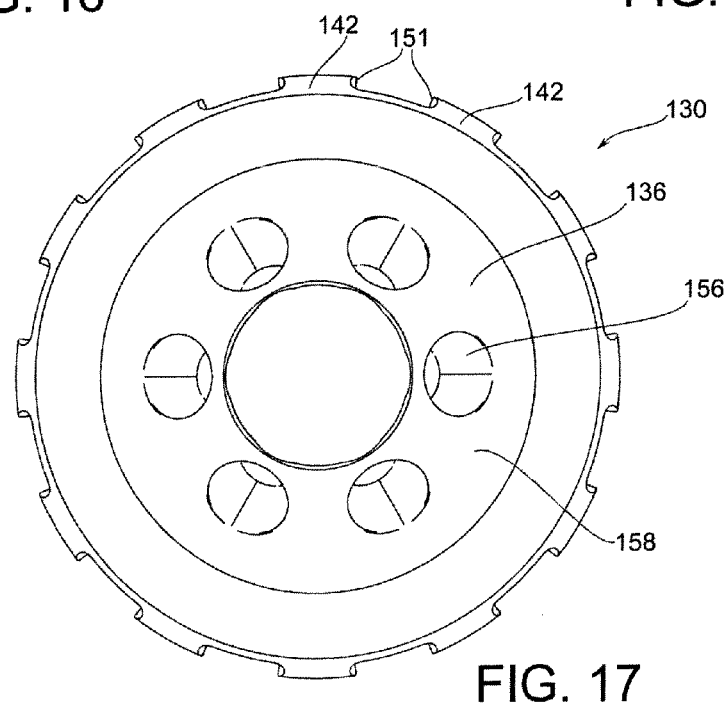
FIG. 17 shows a rearward view of a drive rotor.
Figure 19:
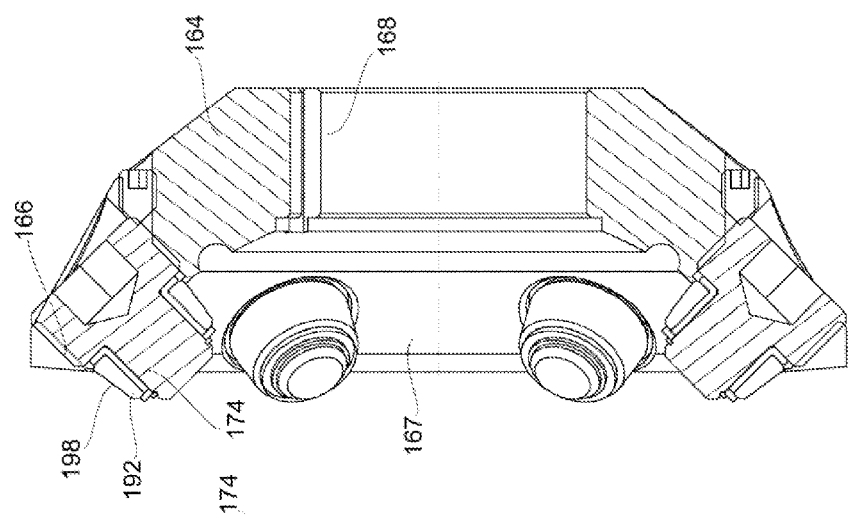
FIG. 19 shows a side cross-sectional view of an index housing taken at line 19-19 of FIG. 18.
Figure 18:
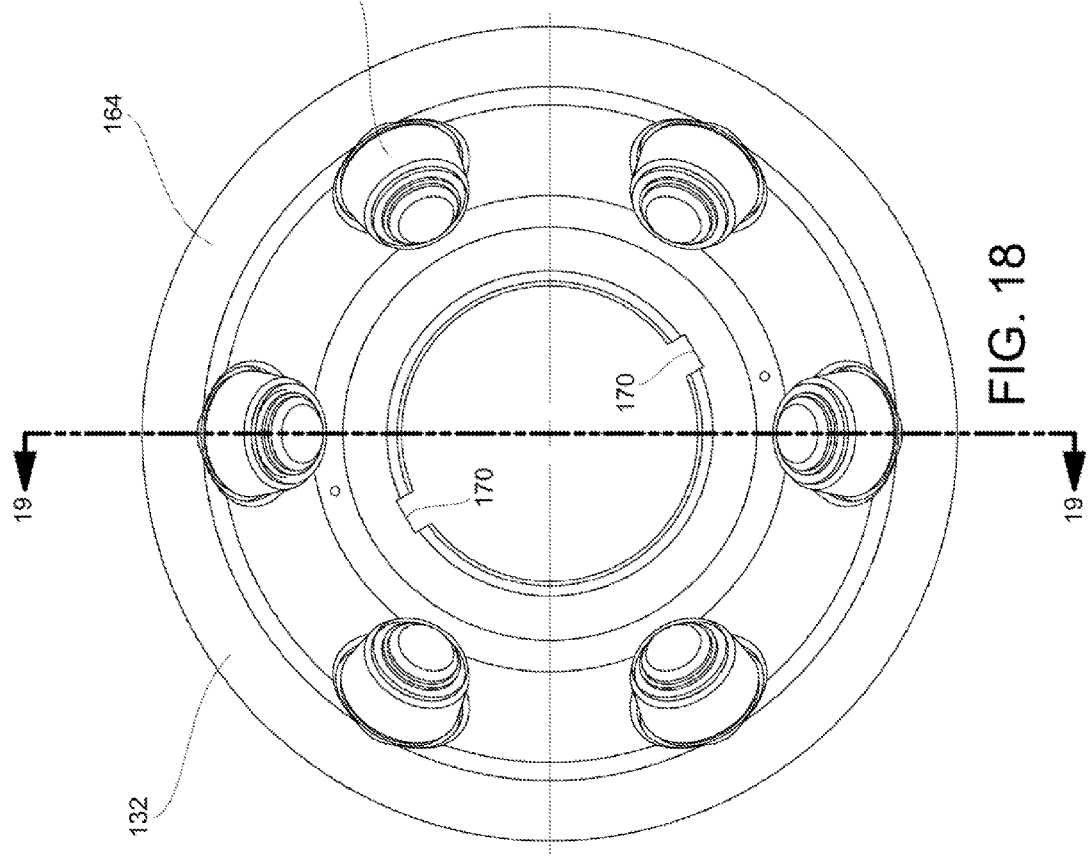
FIG. 18 shows a front view of an index housing.
Figure 23:
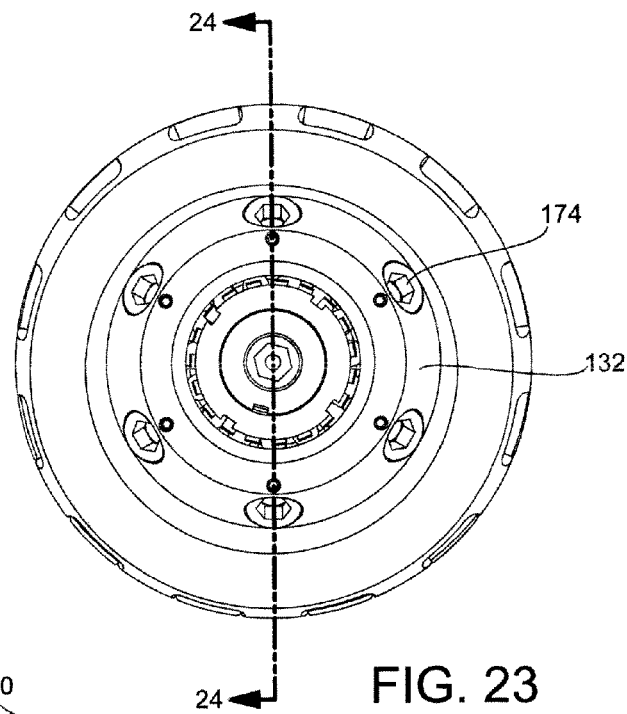
FIG. 23 shows a rearward view of the device to convert energy.
Figure 24:
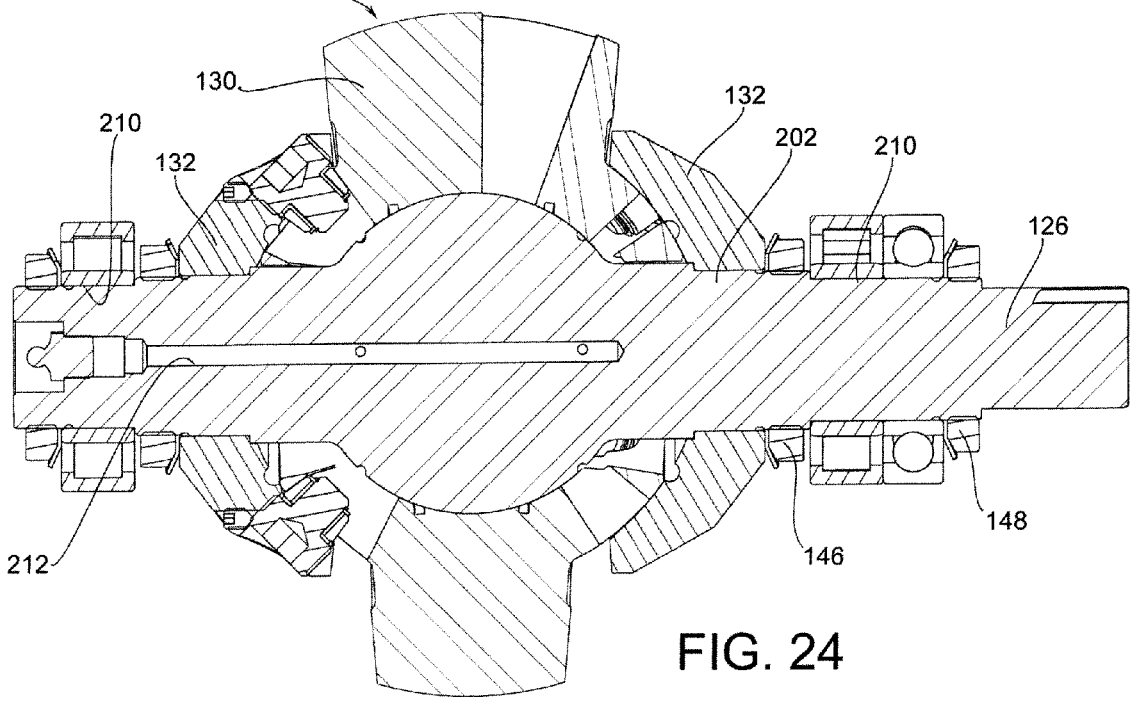
FIG. 24 is a cross-sectional view taken from line 24-24 of FIG. 23.

Referring to FIGS. 18 and 19, there will be a discussion of the indexer housing 132. In general, the indexer housing 132 is a part of the indexing system 124 as shown in FIG. 13 where the indexing system comprises a housing 132 to cooperate with the index offset surfaces 156 shown in FIG. 17 of the drive rotor 130. Referring now to FIGS. 18 and 19, the indexer housing 132 generally comprises a circular-shaped base ring 164. In general, the base ring as shown in FIG. 19 has a surface defining the openings 167, which are defined as indexer extension mount locations. The base ring 164 has a central cavity region 167 operatively configured to engage the base surface 158 of the drive rotor 130 as shown in FIG. 17. FIG. 19 further shows a central bore 168 configured to be mounted to the shaft 126 at an indexer housing mount location 202 as shown in FIGS. 20 and 24. In general, the central bore 168 is operatively configured to be fixedly and removably attached to the shaft, where in one form a notched location as shown in FIG. 18 at 170 can fit a key or the like so the base ring 164 rotates with the shaft 126 (see FIG. 13). As further shown in FIG. 18, there is an indexer surface which in one form is a plurality of indexer extensions 174.

Figure 26:
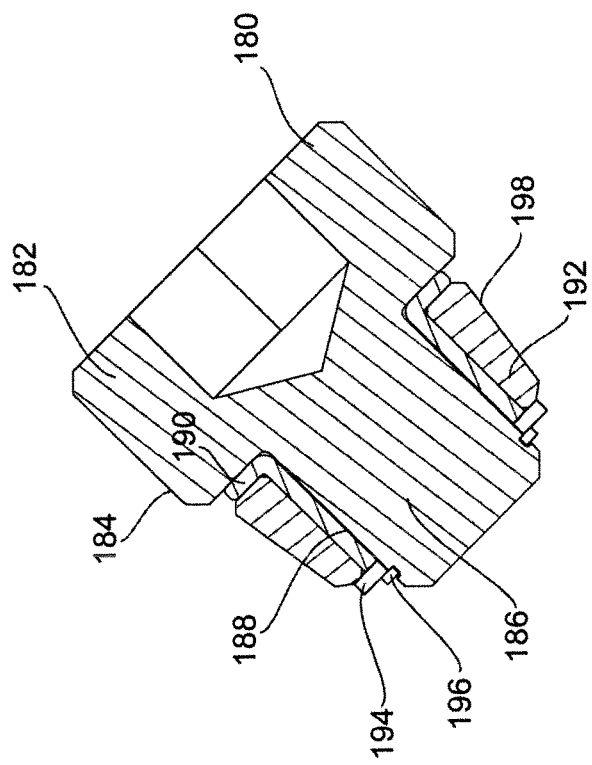
FIG. 26 is a sectional view taken along line 26-26 in FIG. 25.
Figure 25:
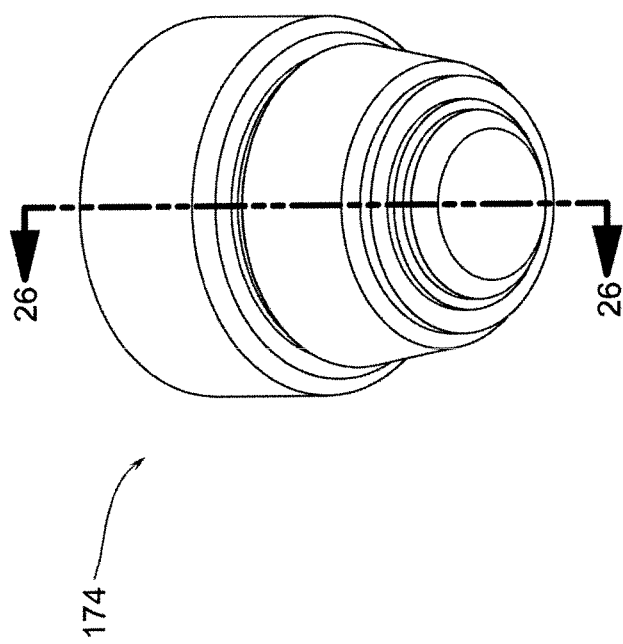
FIG. 25 shows an isometric view of an indexer (roller pin)

Shown in FIG. 19, the indexer extensions 174 are operatively configured to fit within the indexer extension mount locations 166 and are in one form threadedly engaged therein. As shown in FIGS. 25 and 26, there is a front isometric and cross-sectional view of an indexer extension 174 in one form. In general, FIG. 26 shows a main body 180 having a base region 182 with an outer surface 184, which in one form is threaded and as noted above can be threadedly engaged to the surface opening 166, referred to as the indexer extension mount location 166 as shown in FIG. 19. FIG. 26 further shows the main body 180 having a pin region 186 where a bushing 188 is positioned therearound. In one form, the bushing can have a flange region 190 to absorb some thrust placed upon the base region 182. The roller member 192 is positioned around the bushing and is configured to rotate with respect to the pin region 186. A washer 194 can be employed along with a retaining ring 196. It should be noted that the roller member 192 has an outer surface 198 which in one form is frustoconical. Having a frustoconical surface is desirable in one form, and as shown in FIG. 19 it can be appreciated that as the indexer extension 174 is positioned within the indexer extension mount location 166, the radially spaced location of the frustoconical surface and 198 will affect the engagement of the index offset surface 156 as shown in FIG. 13.

Figures 15, 16:
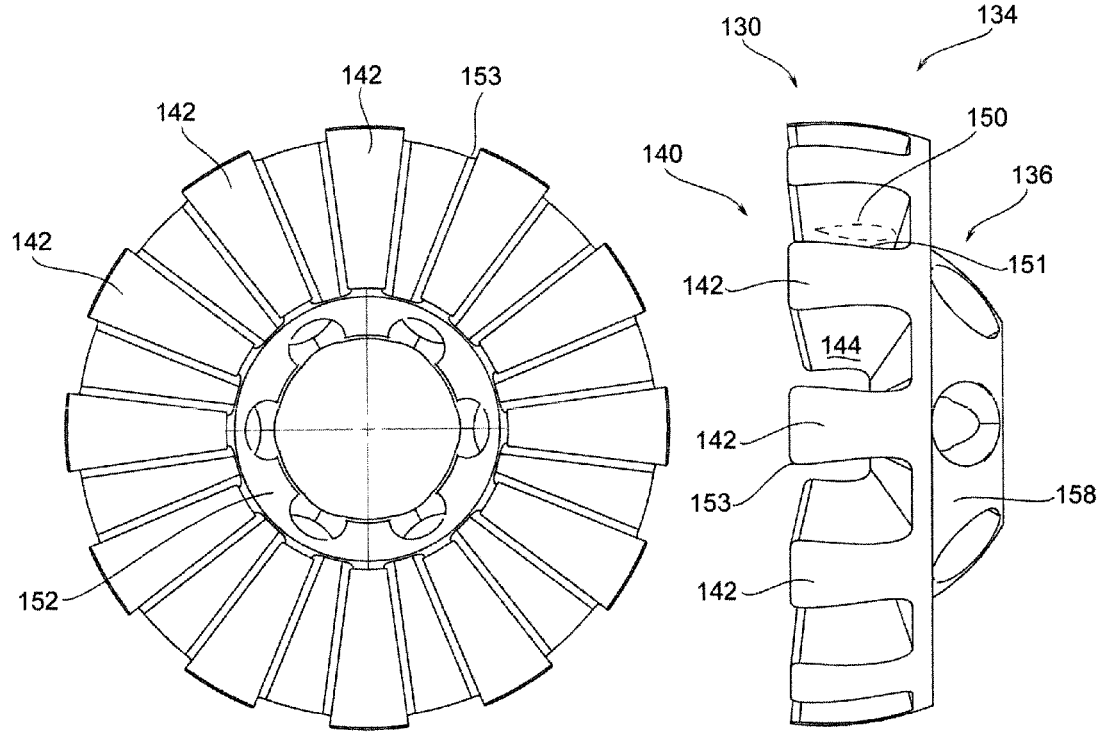
FIG. 15 shows a side view of a driver rotor.
FIG. 16 shows a front view of a driver rotor.

Referring now to FIGS. 20-22, there is shown a shaft 126 which in one form is a straight pass-through shaft. In general, the shaft 126 comprises a center spherical surface 200 which is often reconfigured to engage the inward surface 152 of a rotor as shown in FIG. 16. The index housing mount location 202 is provided, having in one form a key extension 204 which is configured to engage the notched location 170 as shown in FIG. 18 of the indexer housing 132 so as to have the index housing be integral and rotate with the shaft 126. The shaft may include bearing mount regions 210, generally shown in FIGS. 20-22. As further shown in FIG. 22 in the cross-sectional view, an internal passageway 212 can be provided so as to provide a lubricating passageway which allows a lubricant to be passed through the lubricant receiving location 214, which in one form can be a grease nipple. Passageway extensions 216 can extend radially outwardly, for example to provide the lubricant and/or cooling to the annular recess 218 as shown in FIGS. 20 and 21.

As shown in FIG. 19, there are various benefits to having a thrust plate arrangement. One such benefit is to have smaller bearings placed in the system which can allow for greater rotation-per-minute speed of the assembly. Further, having the separating forces acting upon each rotor applied to the internal shaft and the tension in the shaft can handle the load better than, for example, such loads being applied to the exterior housing. Further, the center shaft can be made thinner, and through load stiffening effects the tension placed thereon can decrease flutter or other types of vibrations within the shaft as the shaft rotates.

Now referring back to FIG. 13, it can be appreciated that the device to convert energy 120, which is almost completely shown with the exception of the housing, further comprises a first locking ring 141 and a second locking ring 143 with a bearing member 134 interposed therebetween. Further, lock washers 136 and 138 can be provided. On the opposing region of FIG. 13 there is further shown locking rings 141' and 143' and bearing 134' interposed therebetween. Of course, other types of locking arrangements can be employed. Optionally the lock washers 146 and 148 can be provided. The portion of the shaft 126 can extend to have torque applied thereto or withdraw torque therefrom if the unit is to extract energy in some form, as for example a gas expander or a water turbine (an incompressible fluid-type turbine).

Figure 14:
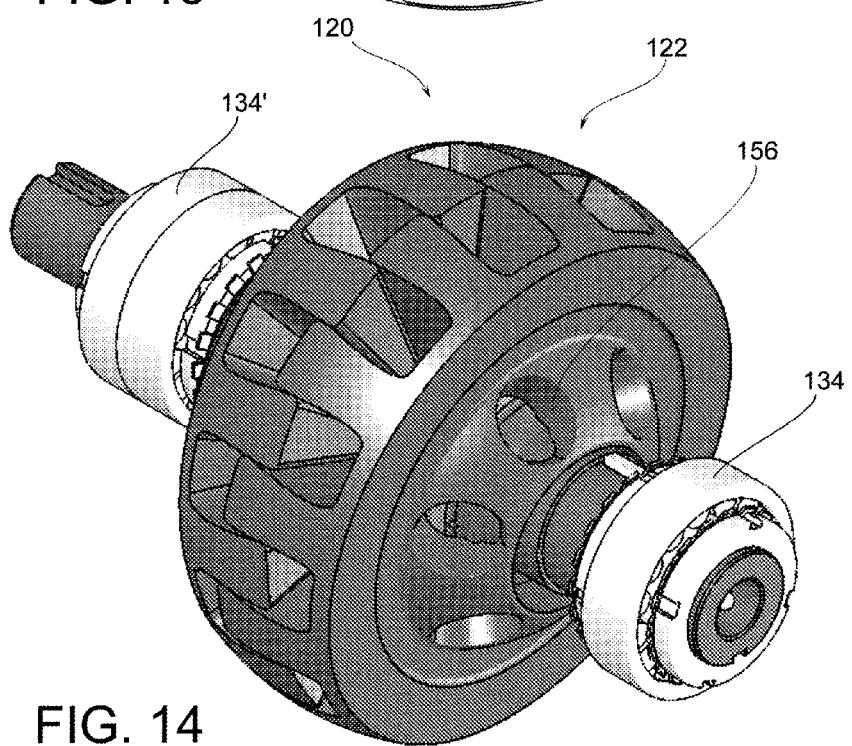
FIG. 14 shows an isometric view of the device to convert energy with the index housing removed therefrom.
Figure 31:
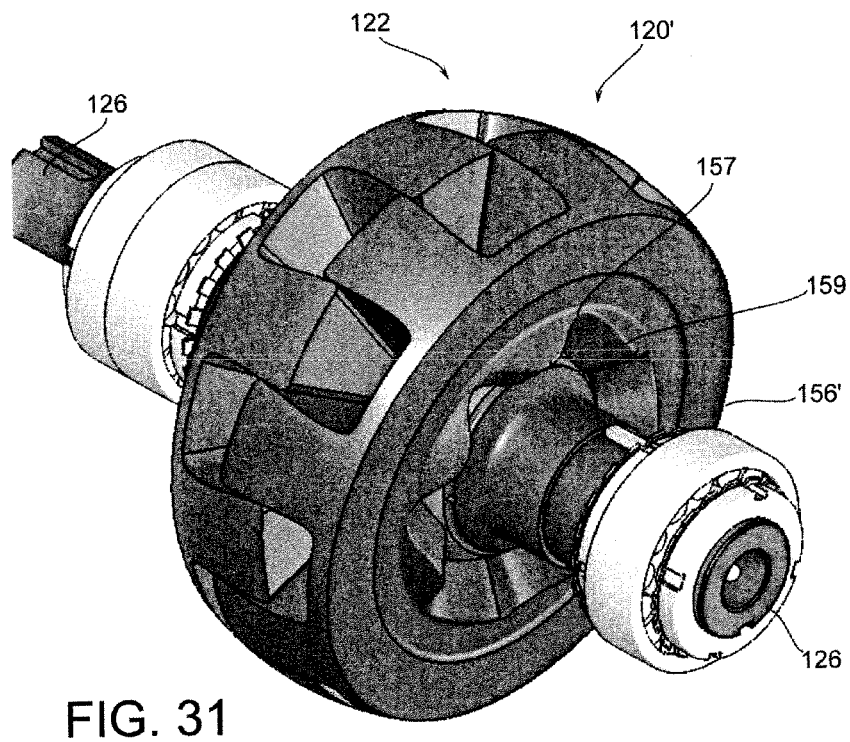
FIG. 31 shows an isometric view of a continuous wave indexing offset surface with the indexer housing removed therefrom.

With the foregoing description in place, there will now be a discussion of another embodiment beginning at FIG. 31 that is similar to that shown in FIG. 14, but as shown in FIG. 31 the next embodiment comprises an index offset surface 156' which has a sinusoidal-like surface and the making thereof is described further herein with reference to FIGS. 39 through 45.

FIGS. 39-45 are similar in nature to FIGS. 1-4 described above, and these figures now disclose another method of making an offset surface. As described above, FIG. 4 shows an offset surface 42 which is similar in nature and construction to the offset surface 156 as shown in FIG. 14.

It should be noted that after a detailed description of the actual apparatus as shown in FIG. 31, there will be provided thereafter a detailed discourse on the mathematics, which in one form can be utilized to create the surfaces and apply parameters to the equations so as to produce engagement and offset surfaces to create positive-displacement energy conversion devices, as well as the indexing device system 124 (shown in FIGS. 13 and 32) and other mechanical devices.

Figure 27:
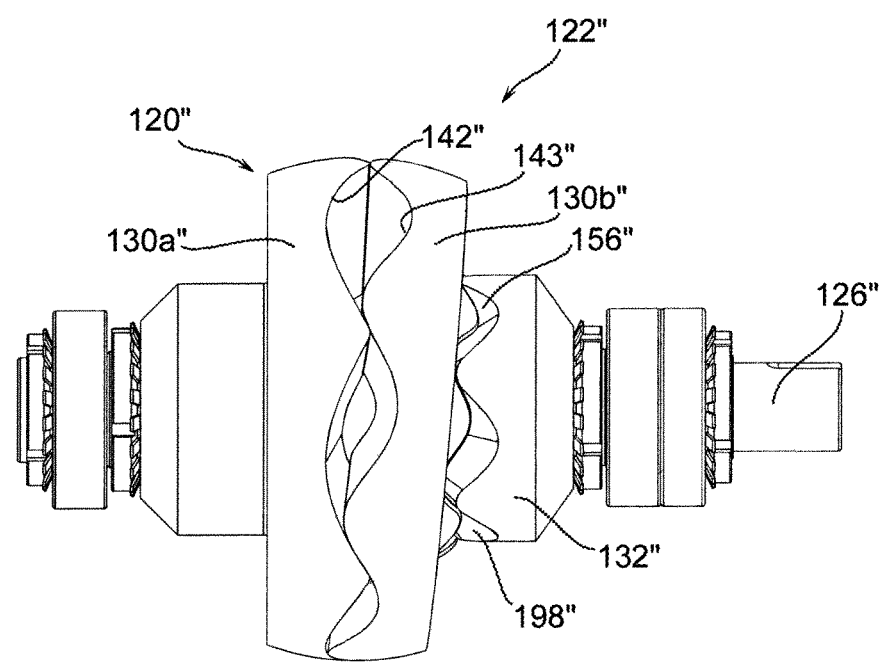
FIG. 27 shows one embodiment of a device to convert energy where the indexing component cooperates with one of the driver rotors so the interposed drive rotor has a rotational speed that is different from the opposing drive rotor and the fixed indexer rotor.

As shown in FIG. 27, there is another environment where the device to convert energy 120″ is shown having a pair of drivers 122″ (a rotor assembly), where in one form the engagement surfaces 142″ and 143″ are similar in nature to the index offset surface 156′ as shown in FIG. 31. Therefore, in this form, the rotor member 130*a*″ is fixedly attached to the shaft 126″ and the rotor member 130*b*″ is designed in a manner so this rotor will rotate at a different rotational speed from the shaft and the rotor member 130*a*″ as well as the fixed indexing rotor 132″. For example, the various engagement surfaces between the drivers 122″ and the surfaces 156″ and 198″ are arranged in a manner so there is, for example, a 6:7 ratio of rotation between the surfaces 198″ and 156″ and a 7:6 ratio between the surfaces 142″ and 143″. As shown in FIG. 30, there is a side and isometric view of the rotor member 130*a*″. It can be appreciated that the surface 142″ can be constructed in a similar manner as described with reference to FIGS. 40-45. In general, as shown in the isometric portion of FIG. 30, the internal region 157″ can be arranged in a manner so as to be fixedly attached to the shaft. As shown in FIG. 28, the rotor 130*b*″ is shown, and it can be appreciated that the surface 143″ is configured to engage the surface 142″ of FIG. 30. The longitudinally rearward indexing surface 156″ is provided and is operatively configured to engage the fixed indexer rotor 132″ of FIG. 27.

Figure 32:
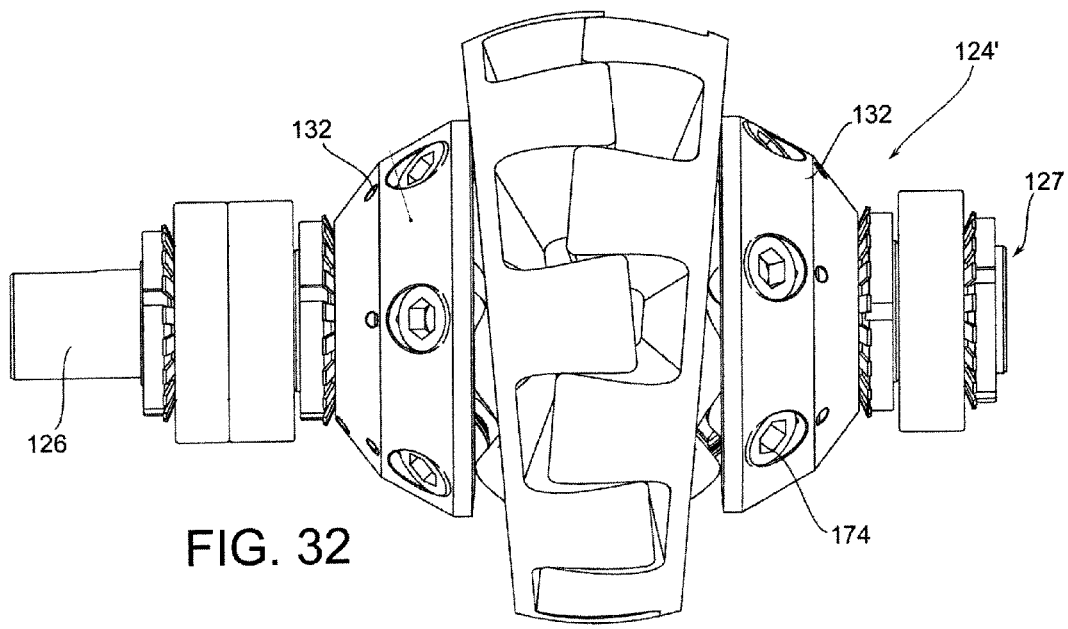
FIG. 32 shows a side view of the device to convert energy with a continuous wave indexing offset surface.

As shown in FIG. 31, there is an isometric view of the device to convert energy 120′ with the indexing housing not shown (see the indexing housing 132 in FIG. 32). Shown in the isometric view of FIG. 31 is an offset surface 156′, which in a preferred form is a continuous surface and comprises longitudinally forward portions or valleys 157 and longitudinally rearward portions or mounds 159. The surface 156′ is configured to engage the indexer extensions 174 of the indexer housing 132″ as shown in FIG. 32. It can generally be appreciated that the indexer extensions 174 are similar in nature to those shown in FIGS. 25 and 26, and are further shown as attached to the indexer housing 132 in FIGS. 18 and 19. As described above, the indexer housing 132 is fixedly attached to the shaft 126 as show in FIG. 32 and the same type of bearing arrangement 127.

Figure 33:
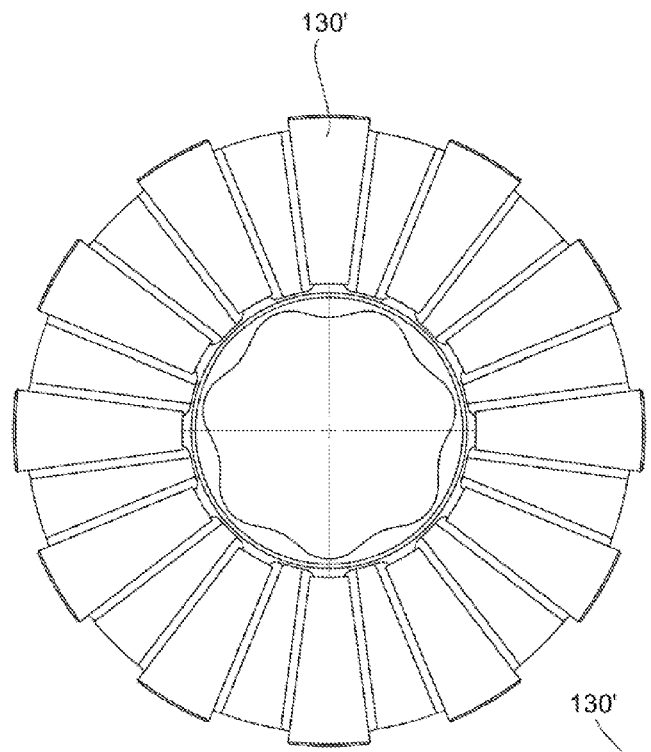
FIG. 33 shows a front view of a drive rotor.
Figure 34:
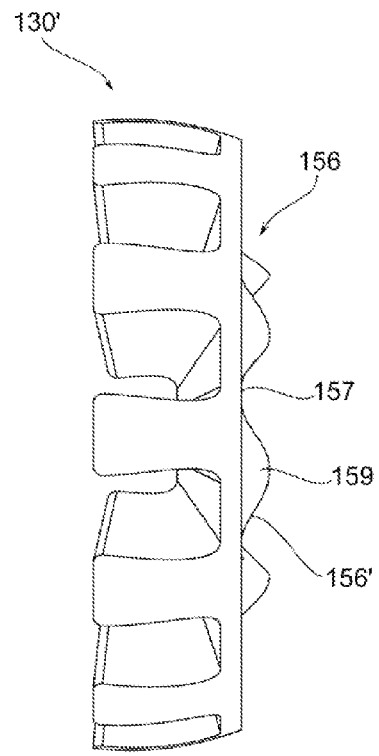
FIG. 34 shows a side view of a drive rotor.
Figure 35:
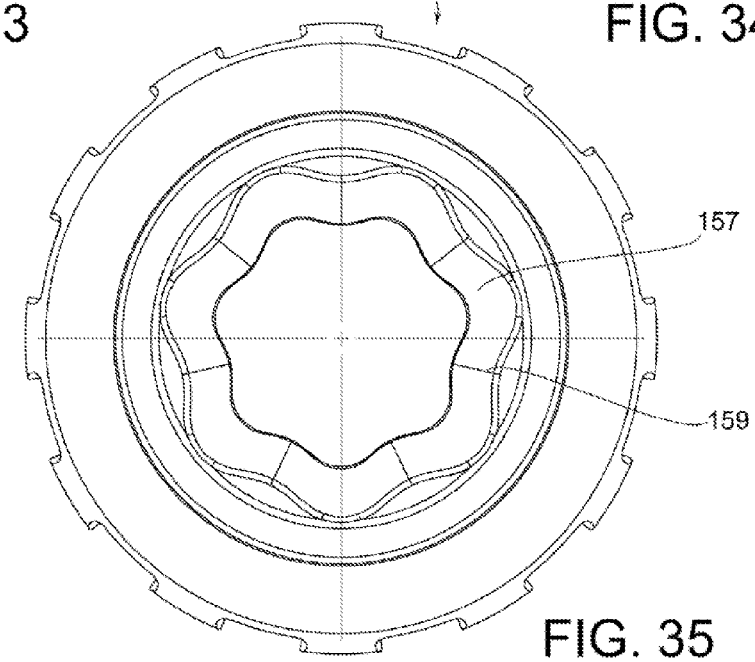
FIG. 35 shows a rearward view of a drive rotor showing the offset surface as a waveform.

FIGS. 33-35 show a drive rotor 130′, which as noted above can be a unitary structure. As shown in the base portion 136′ there is the above-mentioned and described index offset surface 156′. The index offset surface which is created pursuant to the model shown in FIGS. 27-30 described above generally has a sinusoidal-like shape wherein the longitudinally forward and rearward portions, generally referred to as the mounds 159, and the longitudinally rearward portions are referred to as the valleys 157. The longitudinally forward portions are provided in any type of engagement surface such as the indexer extensions 174 shown in FIG. 18 rolled along the surfaces. It should be noted that for every revolution of the drive rotor 130′, the rotation of the index housing 132 will be slightly less, and more specifically a value of (n−1)/n where n is the number of mounds 159. Therefore, it can be appreciated that as shown in FIGS. 31 and 32 with that embodiment, the drive rotors 122 will rotate at a slightly lower rotation-per-minute than the shaft 126. In this particular instance, the rotation of the device to convert energy 120 as shown in FIGS. 31 and 32 would be 6/7 of the rotation of the shaft. Of course this ratio is for the specific embodiment and it should be further noted that this ratio is not necessarily dependent on the number of indexers, as additional indexers could be present along the indexing path, and in one form these additional indexers may disengage from the offset surface during portions of the rotation.

Figure 36:
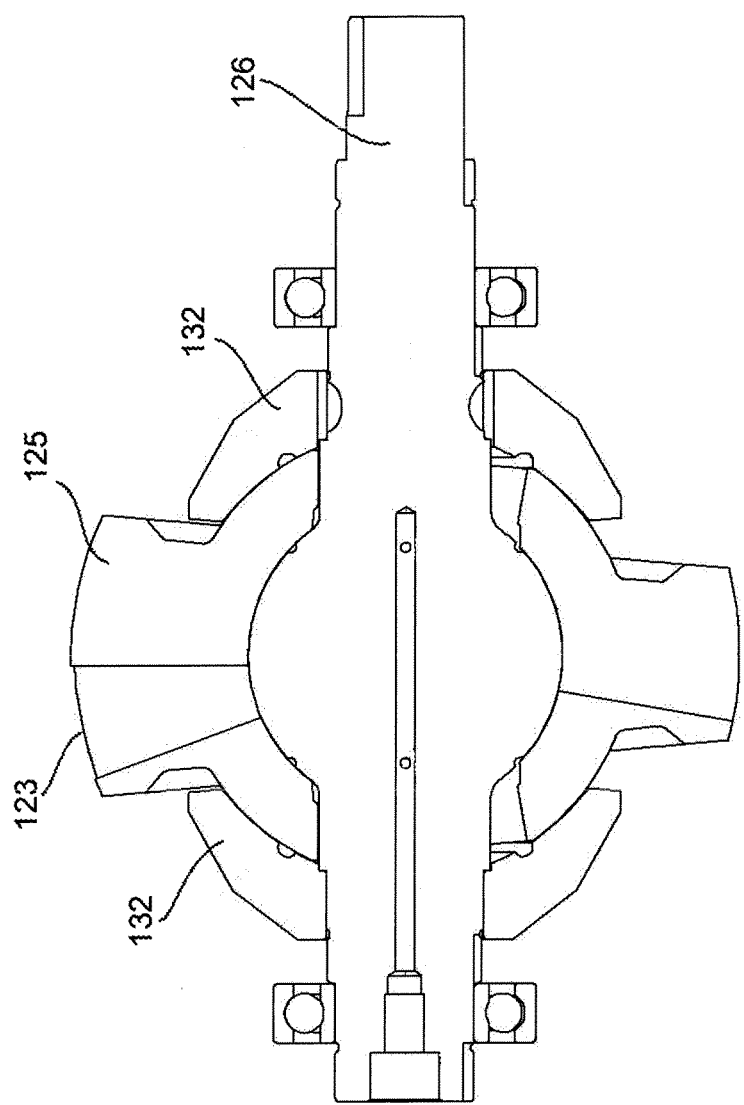
FIG. 36 is a schematic side view showing the relative angles.
Figure 37:
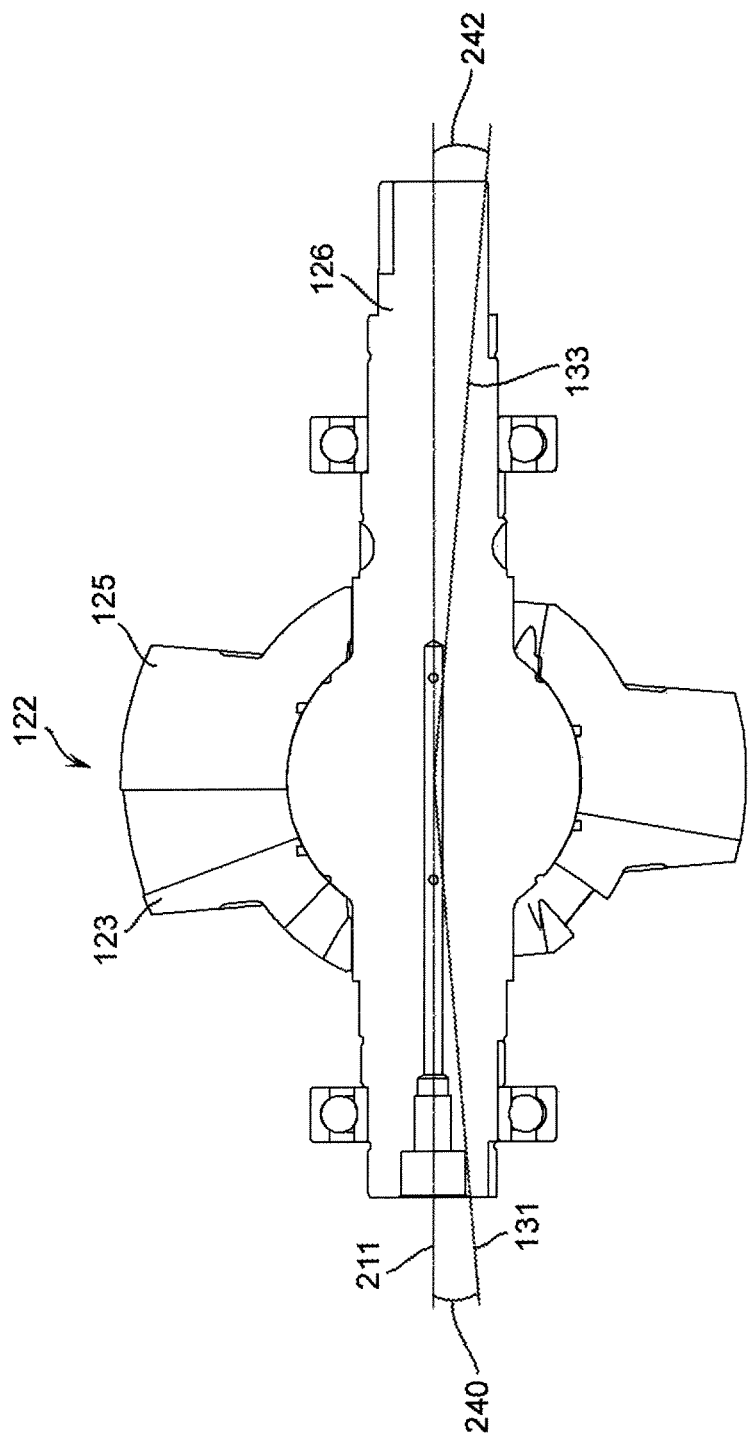
FIG. 37 shows the rotors with the indexer housing removed therefrom.
Figure 38:
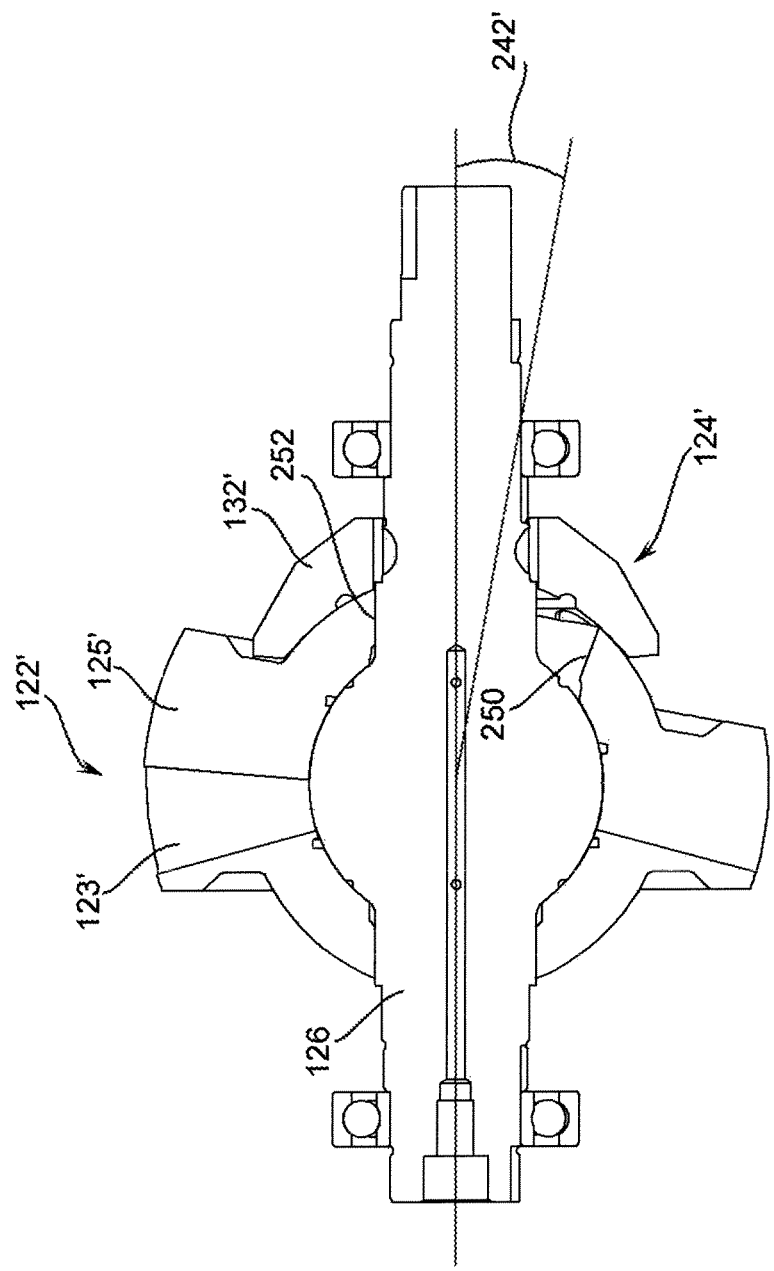
FIG. 38 shows a schematic side view illustrating the principle of having a single rotor offset from co-linear where the opposing rotor is a center axis of rotation with a common center axis such as the shaft where the offset rotor has a single index housing.

In general, it can be appreciated that the previous figures show one embodiment having two indexers positioned at opposing longitudinal regions along the shaft. FIG. 36 schematically shows the indexers positioned at such regions. FIG. 36 shows a cutaway view having the shaft 126 where the indexing housings 132 are fixedly attached to the shaft 126 in one form as described above. As shown in FIG. 37, it can be appreciated that the indexing housings are not shown, and in general, the drive rotors 122 comprising the first and second rotor members 123 and 125 are shown, each having a center axis of rotation 131 and 133 respectively which are in one form offset from the center axis 211 of the shaft 126. The angles indicated at 240 and 242 therefore are for example one-half alpha. Referring to FIG. 38, it can be appreciated that in one form, the rotor 123′ is for example fixed to the shaft 126 and rotates therewith. Therefore, the rotor 125′ is offset at an angle 242′ which is the full alpha angle. In this form, the index housing 132′ is arranged in such a matter that the indexing system is comprised of surfaces that are defined by a parameter at a full alpha angle.

The advantage of the system as shown in FIG. 38 is that a single index housing 132′ can be utilized to comprise an indexing system 124′ (and it should be noted that such a system will only work with the type of indexer shown in FIG. 14, not the type shown in FIG. 32). The rotor 123′ as mentioned above simply rotates with the shaft 126 being fixedly attached thereto, and a surrounding housing not shown in FIG. 38 is positioned around the drive rotors 122′ so as to provide various ports for lowering fluid to enter and exit the rotors. One issue with having the canted rotor 125′ is that the housing must have a greater angle therein to accommodate this cant, and the interior surface 250, which presumably is conical in nature and in one form is frustoconical, must be of a sufficient diameter so as to clear the rotor at the top dead center portion 252 as shown in FIG. 38.

With regard to dynamically adjusting the indexing system, the indexers can be rotated, or moved in and out axially. Axial movement may have drawbacks because it can result in backlash and non-smooth motion. With the through-shaft design, rotation relative to the through-shaft in real-time could possibly be designed, but the angular play is very small to control gaps between lobes. If the indexer extensions are the cone rollers, they could be axially adjusted to help remove backlash. However, such adjustment is in small increments and should be done once during assembly and locked into place. It should be noted that the indexer extensions 174 do not need to be cone rollers and could be other shape rollers. However, the frustoconical cone is a preferred roller shape because this shape in some applications eliminates sliding contact on the roller surface. Any roller profile other than a frustoconical one may result in an abrasive wear running action. Therefore, in a preferred form the cone would have a center towards the center of rotation of the rotors. Of course, this is for having a rolling action without any sliding between the inner and outward portions of the rollers.

Present analysis indicates that the indexers are best left fixed in position; however, springs can be designed to work for small deflections (such as less than 5 thousands of an inch). In some applications spring tensioners on the indexers might actually help the machine run more smoothly. However, there is a radial outward force that occurs when the indexers have a torque applied to them. If this force+pressure force of fluid combined exceeds the pre-tension of the springs, then the indexers might back-out axially, and that would result in backlash and non-smooth operation of the machine.

With the forgoing description in place there will now be a description of mathematically deriving the surfaces described above. The curves to be described herein are to be assumed to lay on the unit sphere, that is, a sphere of radius R=1 such as the vector (reference axis) 26 as shown in FIG. 1. It is assumed that the derived curves lay on the surface of this unit sphere and are to be projected spherically inward to form surfaces. Mathematically speaking, any particular point along one of these spherical curves and connected with a straight line to the origin (center of the sphere), the collection of an infinite number of these lines for all points along the curve forms a continuous surface. The resultant curves on the outer surface of a sphere can be viewed as a surface that is constructed by sweeping a straight line of length R=1, where the line is held on a pivot point at the origin, and the surface that results is created by traversing the opposite end of the line along the spherical curve. Since all surfaces are connected in this manner to the spherical center, all the geometry to follow can be derived as a series of "rotations" about that center. There are times when it may be necessary to deviate from this rule when using non-conical mating geometries which are indeed possible, but the disadvantage of these geometries is that there is a possibility for sliding contacts to occur instead of pure rolling contacts (to be discussed later on, for conical roller "indexers" or torque transfer devices that utilize conical rollers).

As stated in the beginning of this specification referring to FIGS. 1-4, it is assumed that there are at least two meshing rotors. That is, a meshing assembly could be comprised of 2, 3, 4 or more rotors that interact with one another. Each rotor may have a frusta-spherical outer surface; however, they are not complete spheres, and have some type of lobes or cavities that are cut out by surfaces that resulted from curves such as the ones discussed in the background information. The rotors spin on their own individual rotational axes that are in a preferred form at different angles to each other, and each axis may possibly pass through the common spherical origin of the rotors. For purposes of description, the two rotors are referred to as rotor A and rotor B, where rotor A rotates about axis 1 (22) and rotor B rotates about axis 2 (24) of FIGS. 1-4 and in the following figures. The spin velocity of rotor A may or may not be equal to rotor B; it may be equal to, less than, or greater than that described in FIGS. 39-45 below. However, for useful surfaces to result, the speed ratio between A:B must be 1:(1±1/integer), such that the resulting surfaces are continuous over any number of revolutions of both A and B.

As described above, the angle between the rotation axes of two of the mating rotors that share a common sphere center is called the alpha ($\alpha$) angle shown in FIG. 1. Attached (fixed to) rotor A is the reference axis 26 that extends from the center of the sphere of rotor A to some point on the sphere at radius R. The tip of this line represents a "cutter". If both rotors A and B are rotated at the same velocity and in the same global direction much like a bevel gear pair would rotate together, the cutter attached to rotor A will sweep out a spherical space curve onto the surface of rotor B, with respect to rotor B's frame of reference. That is, if you were sitting on the surface of rotor B rotating along with rotor B, you would see the cutter reference axis 26 tip cutting out a curve onto the surface of rotor B. This curve would repeat itself over and over again as the rotor rotates once with respect to the global coordinate system.

The "mating curve" of the traditional rotary motion machine with an $\alpha/2$ base reference curve is made by replacing the reference axis 26 with a cone shaped cutter defining surface 38 as shown in FIG. 3 instead of an infinitely thin line. That is, the cutter now has an angular radius of "nu" (v) as illustrated in FIG. 3, and cuts out an offset surface 42. On the traditional rotary motion machine with an $\alpha/2$ base reference curve as described in U.S. Pat. No. 5,755,196, the use of a conical cutter in order to create so called "rabbit ears" eliminates the sharp edges of lobe-tips associated with zero radius cutters.

To derive the equations of the original rotary motion machine with an $\alpha/2$ base reference curve meshing curves, a series of 4 rotations about the origin of the common sphere center is utilized. FIG. 1 illustrates the common frame of reference used for this derivation, in X Y Z coordinates. The solution is as follows using the right-hand-rule for rotations (RHR):

Let vector V represent the vector in XYZ coordinates that extends from the origin, point 32, to point 30 shown in FIG. 1.

$$V = \begin{bmatrix} R\sin(a-p) \\ 0 \\ R\cos(a-p) \end{bmatrix}$$

perform a vector rotation of V by +p (the alpha angle) about axis Y. Rotate the resulting vector by +t about the Z axis. Then rotate the resulting vector by −p about the Y axis. Rotate the resulting vector by −t about the Z axis, the result is the base curve C, otherwise known as the centerline cutter path. Parameter "t" represents theta, $\theta$, (the rotation angle of a rotor about its respective axis). For 0<t<360 degrees the base curve traces out a complete "teardrop" of the meshing curve for the original rotary motion machine with an $\alpha/2$ base reference curve. Below is the matrix multiplication with the four rotation matrices written out in full:

$$C = \begin{bmatrix} \cos(-t) & -\sin(-t) & 0 \\ \sin(-t) & \cos(-t) & 0 \\ 0 & 0 & 1 \end{bmatrix} \begin{bmatrix} \cos(-p) & 0 & \sin(-p) \\ 0 & 1 & 0 \\ -\sin(-p) & 0 & \cos(-p) \end{bmatrix}$$

$$\begin{bmatrix} \cos(t) & -\sin(t) & 0 \\ \sin(t) & \cos(t) & 0 \\ 0 & 0 & 1 \end{bmatrix} \begin{bmatrix} \cos(p) & 0 & \sin(p) \\ 0 & 1 & 0 \\ -\sin(p) & 0 & \cos(p) \end{bmatrix} \begin{bmatrix} R\sin(a-p) \\ 0 \\ R\cos(a-p) \end{bmatrix}$$

After multiplication and simplification, the parametric equation in Cartesian coordinates for the base curve is therefore:

$$C = \begin{bmatrix} X(t) \\ Y(t) \\ Z(t) \end{bmatrix}$$

$$= \begin{bmatrix} R(\cos(t)(\cos(p)\cos(t)\sin(a) - \cos(a)\sin(p)) + \sin^2(t)\sin(a)) \\ R(-\sin(t)(\cos(p)\cos(t)\sin(a) - \cos(a)\sin(p) + \cos(t)\sin(a))) \\ R(\sin(p)\cos(t)\sin(a) + \cos(a)\cos(p)) \end{bmatrix}$$

For traditional rotary motion machine with an $\alpha/2$ base reference curve, a=(pi+alpha)/2, and let R=1 for unit sphere, and let "p" represent the alpha angle in the equations above for the original Rotary motion machine with an α/2 base reference curve.

The original rotary motion machine with an α/2 base reference curve "teardrop" shape that results is split in half down the plane of symmetry of the teardrop, and spaced apart evenly or unevenly in order to mesh with similarly shaped lobes on an opposite rotor spinning at the same rotational speed and direction so as to mesh without interference between lobes As described above schematically in FIGS. 1-4 and in a tangible operation in FIGS. 13-38, the indexer illustrates the ability to create a fixed-angle torque transmission coupling device with potentially zero-backlash (based on adjustment of rollers and/or tolerances of surface machining) that exhibits a true rolling contact (in case of pin-type indexer) using the original rotary motion machine with α/2 base reference curve mating curves (offset from meshing curves by the cone cutter angle nu). As described above in detail with reference to FIGS. 13-38, the indexer extensions 174 are attached to an indexer housing 132. The indexer extensions 174 can mathematically be thought of as the "cutters" as mentioned above. The indexer extensions 174 are fixed to and rotate with the shaft along the rotation axis of the shaft. The centers of the indexer extensions 174 mathematically trace the "meshing curve" equations through the rotor shaft's frame of reference. It should be noted how the rollers "grasp" the other rotor such that it could potentially have zero backlash or transmit torque in either rotational direction.

If the angle is changed from a=(180 deg+/−alpha)/2 degrees to any other angle, a family of curves result that range from a "figure 8" shape when a=90 degrees to lopsided figure eights (8's), to egg-shape curves as shown in FIG. 4, to oval in shape, to perfect circles when a=0 or a=180. The family of curves is symmetric such that angles ranging from 0<a<90 produce a mirror image of curves between 90<a<180 degrees.

It is possible to construct many types of rotor surfaces from this family of curves using similar methodology as splitting the curves down the mirror planes of the curves and separating them, much like in the original rotary motion machine with an α/2 base reference curve, and to "layer" multiple units into a single sphere by choosing different offset angles "a" for different chambers. This could increase the performance density of engines, pumps, expanders etc. by having multiple units in the same sphere. It is also possible to have a "through-shaft" design as described in detail above, and further an embodiment where two rotors of a unit sandwich a third rotor in between as described herein, the third rotor being fixed rigidly to that through-shaft in one form. There are many other embodiments as well, such as for nonsymmetrical rotors or rotor pairs comprised of lobes that are at different "a" angles within the same rotor.

The same concept as the original rotary motion machine with an α/2 base reference curve indexer applies to the offset indexer. If the cutter angle "a" is set to 45 degrees, this results in an oval-shaped path on rotor B instead of a teardrop. FIGS. 3 and 4 along with FIG. 14 illustrate the concept of the offset indexer described above. This embodiment exhibits the same behavior as other possible indexers, however it has the following benefits: 1) the conical rollers/indexer extensions 174 in one form are in continuous smooth motion; 2) because the angle "a" is now much less than the original rotary motion machine as described in U.S. Pat. No. 5,755,196 with an α/2 base reference curve indexer, the rollers and indexing surfaces can be placed closer to a "through-shaft" axis, out of the way of centralized working chambers of a pair of rotors. A smaller angle "a" allows for the seal to prevent harmful fluids in the working chamber from entering the "indexing" surfaces and rollers and improves reliability of the indexer, and further also allows us to lubricate the indexer with oil (for example) without getting lubricant in the working rotor chambers.

The through-shaft concept in conjunction with the indexer system enables the transmission of torque from the rotors to the shaft and allows a known clearance gap to be set between the working rotors so that they never rub one another, thus decreasing wear that could result from rubbing between lobes.

It should be noted with a cone roller indexer extension 174, the design can be as such where the roller is replaced with just a "pin" that is lubricated with oil for example, instead of a bearing. This simplifies the assembly and may also prolong life, though not necessarily longer than the roller design, and could be ideal for small assemblies where size is of importance.

Instead of a cone roller that rides inside of a surface, there can be a cone roller ride on the outside of an oval shaped "boss" in the center region, for example in the center of the index offset surface 156 as shown in FIGS. 15 and 17. The disadvantage of this design is space requirements, as it takes more space to make this version of the indexer than the oval socket version. A designer could combine the oval socket with the oval boss together in order to constrain the alpha angle of the two rotors together. Again, this requires more space and is prone to rubbing issues since the rollers would now fight between rubbing on the inside boss, or the oval socket surface.

Now referring to FIGS. 39-45, there will be a discussion of the general principles for making an additional embodiment related to a wave design as shown by the indexer in FIGS. 31-35 described above. As noted above, the index offset surface 156' has a plurality of longitudinally forward and rearward portions (mounds and valleys) 157 and 159 as shown in FIG. 31. These essentially form lobes and buckets, the number of which is different than the number of indexer extensions 174 as shown in FIG. 18 (as well as FIG. 32). The discussion below related to FIGS. 39-45 is provided to give a detailed teaching of the creation of the surfaces in one form, and further provides a convenient mathematical model for formation of the same. FIGS. 39-42 are similar in concept to FIGS. 1-4.

Figure 39:
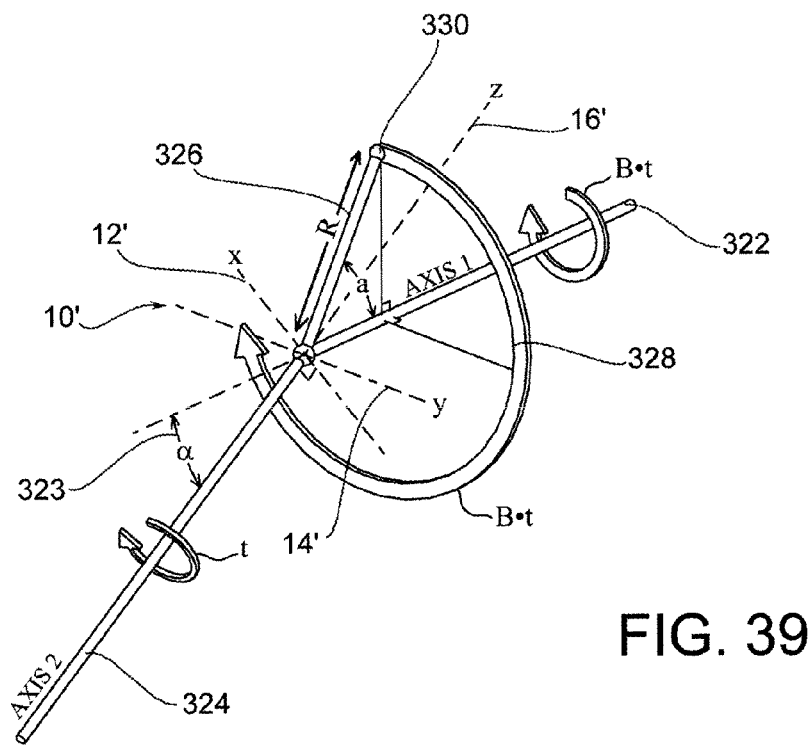
FIG. 39 shows a general geometric concept as related to the rotors for producing a continuous waveform offset surface.

As shown in FIG. 39, there is a first axis 322 and a second axis 324. The first and second axes correlate to the centers of rotation of the ultimate constructed rotors. Further, for purposes of discussion and description of the mathematics, the reference axes are defined in XYZ coordinates shown at 10'. The axis 12' indicates an X direction and orthogonal thereto is an axis 14' indicating the Y direction, while the Z axis is orthogonal to X and Y indicated at 16'. As described earlier, the axes 322 and 324 are offset from co-linear by the alpha angle (α) which is indicated at 323.

Figure 40:
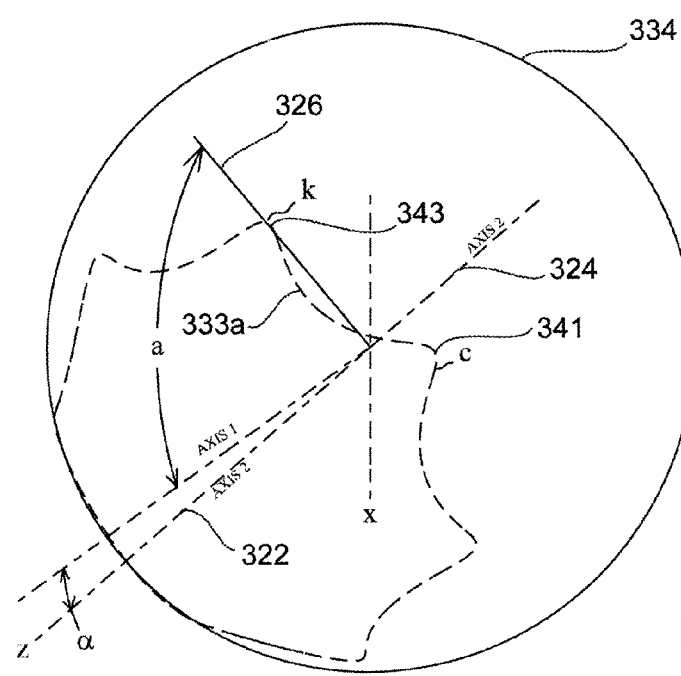
FIG. 40 shows a continuous waveform offset reference base curve.

In general, the reference axis 326 defines the reference point 330, which in turn defines the arc path 328 which sits on the surface of the outer sphere 334 as shown in FIG. 40.

In a similar manner as described above, the reference point 330 rotates around the axis 322.

The reference axis 326 having the length dimension indicated at "R" is defined as having the offset angle "a" as shown in FIG. 39 from the first axis 322.

FIGS. 1-4 describe an embodiment where the simultaneous rotation of the axes 22 and 24 occurs. The reference axis 26 is fixedly attached to axis 24 creating an arc path 28, but with respect to the rotating axis 22 actually creates a base curve 33. The embodiment as described in FIGS. 39-45 is provided with rotations of the axes 322 and 324, which are not equal. As noted in FIG. 40, for example, axis 322 will rotate a value "t" times a multiplier "B". When B equals 1, each will have an equal number of lobes. If B equals (1+1/N) rotor 1 corresponding to axis 1 indicated at 322 will have N number of lobes, and rotor 2 corresponding to axis 2 indicate at 324 will have N+1 lobes. Alternately, if B=(1−1/N) and if rotor 1 corresponding to the center axis 322 of axis 1 has N lobes, rotor 2 corresponding to the center of rotation of axis 2 (indicated at 324) will have N−1 lobes. The number of lobes, which is different by the value of 1, can be appreciated with the actual physical embodiment of the indexing system 124' as shown in FIG. 32. It can also be appreciated as shown in FIG. 35 that the longitudinally rearward portions 159 define the mounds which operate as a lobe. There are seven lobes in this embodiment, and as shown in FIG. 18, the same indexer housing 132 is used in the second embodiment, and there are six lobes where each lobe is effectively an indexer extension 174 as described above. In another example, the second rotor rotates with respect to the fixed index rotor and the first rotor at a vale of either (N+1)/N or (N−1)/N.

Referring now back to FIG. 40, it can be appreciated that the respective rotations of the reference axis 326 about the first axis 322 with a rotation of the second axis 324 at a rotational ratio that is one lobe greater or one lobe less over the number of lobes of the opposing rotor as compared to the rate of rotation of the opposing rotor. In other words, as shown in FIG. 40, as both of these axes 322 and 324 rotate where the reference axis 326 rotates with the axis 324 at, for example, a value that is 7/8 of the rotation of the axis 322, the reference axis 326 will effectively reposition in a relative movement from a beginning location indicated at 341 to an end location at 343 following along the segment of the base curve shown at 333a.

Figure 41:
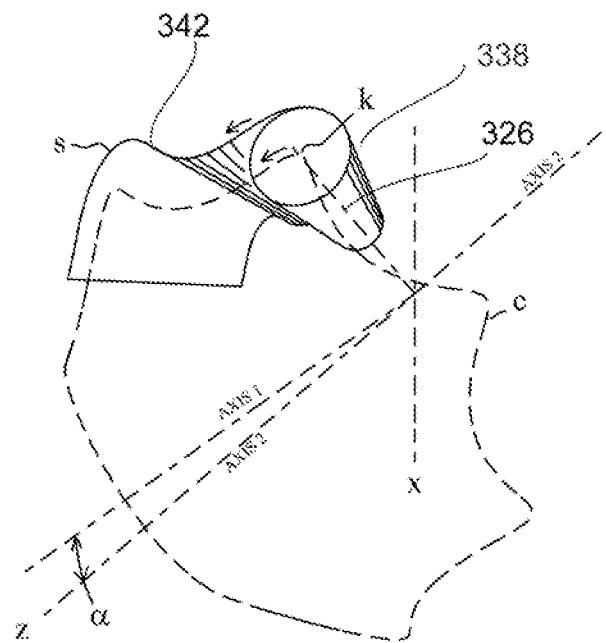
FIG. 41 shows the general concept of constructing an offset surface premised upon an engagement tip.
Figure 42:
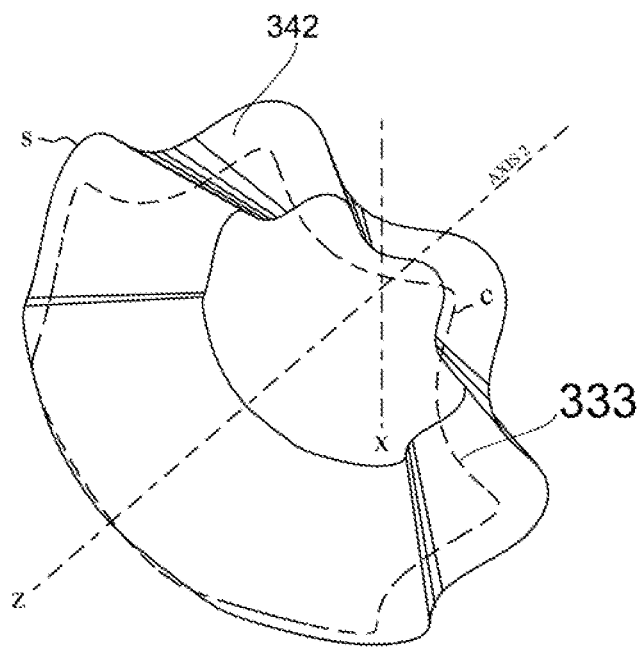
FIG. 42 shows the completed offset surface.

Now referring to FIG. 41, it can be appreciated that in a similar fashion as in FIG. 3, by applying a defining surface 338 about the reference axis 326, the offset surface 342 is thereby defined. As shown in FIG. 42, the offset surface 342 is shown fully developed. At this juncture, it can be appreciated that this offset surface is similar in concept to the index offset surface 156' as shown in FIG. 31.

Figure 43:
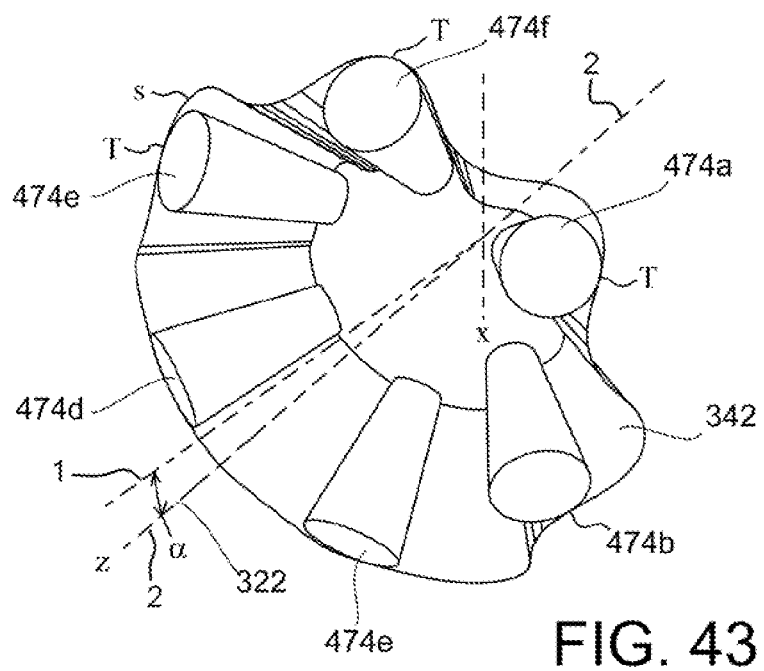
FIG. 43 shows the early conceptual makings of opposing rotors having a plurality of engagement tips and an offset surface.
Figure 44:
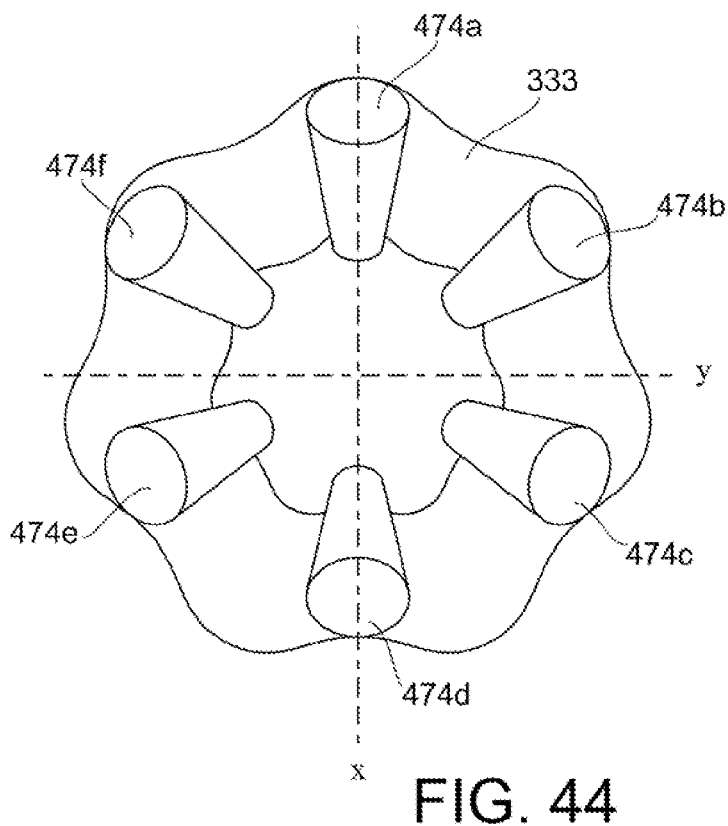
FIG. 44 is a front view of the conceptual rotor components.
Figure 45:
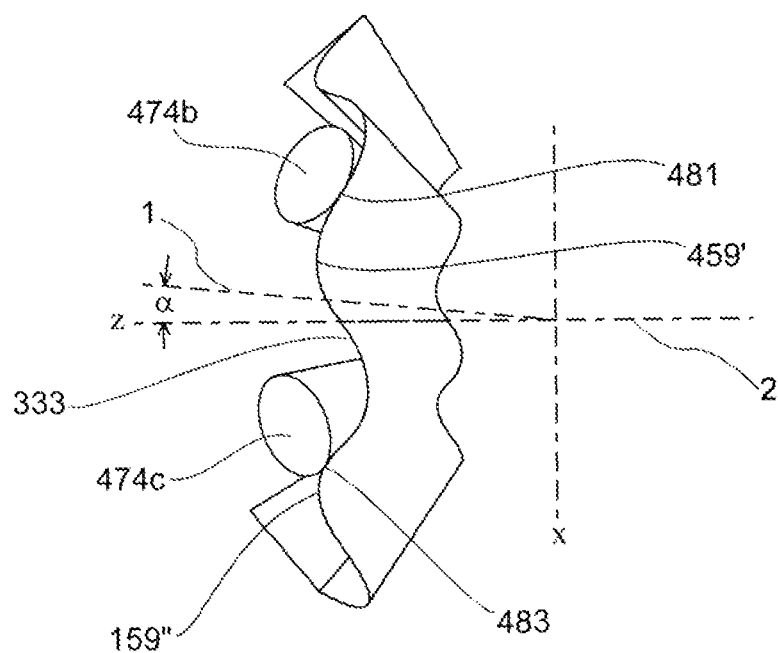
FIG. 45 shows a side view of the rotor components.

Now referring to FIG. 43, it can be appreciated that the offset surface 342 which has a center axis about the first axis 322 is shown with a plurality of indexer extensions 474a-474f. The center axis of each indexer extension 474 will pass along the base curve 333 as shown in FIG. 42. Therefore, it can be appreciated that as better shown in FIG. 44, although in one form there could for example be six indexers, the rotor which opposes the rotor having the offset surface 333 can actually have a plurality of indexers, or even a single indexer in one form. In other words, depending upon the apical radius or otherwise the distance from the center axis if a conical surface is not utilized, the number of indexer extensions would only be limited by the amount of space and physical constraints of physically assisting the rotors therein. One consideration with regard to positioning the indexer extensions 474 is illustrated in FIG. 45, where it can be appreciated that the engagement location indicated at 481 as well as 483 between the indexer extensions 474b and 474c is at different slopes along the offset surface 333. Therefore, one revolution of the rotors repositions the indexer from one longitudinal rearward portion 459' to a second longitudinal rearward portion 159".

Figure 46:
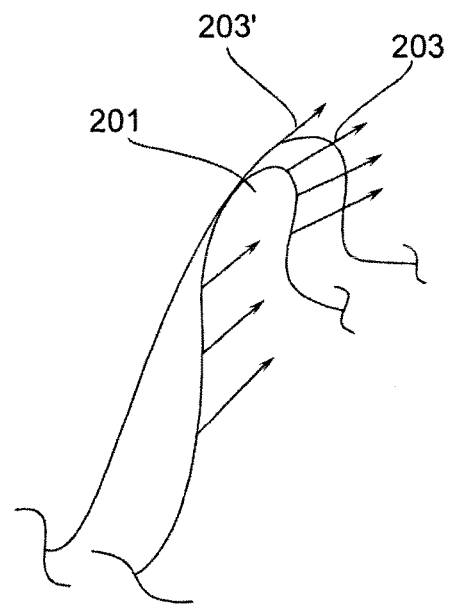
FIG. 46 shows a schematic vector diagram of relative motion of an engagement tip with respect to an offset surface.

With regards to making an offset surface with an engagement tip that is not circular, in general, the process is to first identify, for example, a positional equation for an engagement tip or other engaging feature. For this example an elliptical tip 201 is shown in FIG. 46. As can be seen in FIG. 46, there is a plurality of derivatives indicated by the various vectors positioned therearound where each vector lengths to the motion of the various portions along the tip 201. Therefore FIG. 46 shows that for every position along the engagement tip 201 there is an direction motion vector 203.

Figure 47:
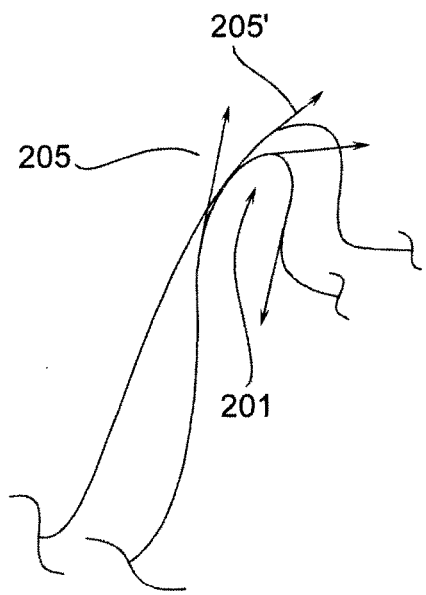
FIG. 47 shows schematic factors indicating tangential component members taken along the engagement tip.

FIG. 47 shows vector 205 which correspond to the derivatives of not the motion vectors 203, as shown in FIG. 46, but rather simply the various tangents thereupon the tip 201. Therefore, it can be appreciated looking at FIGS. 46 and 47 that the vectors 203' and 205' are co-linear. Therefore, at the various XYZ locations where the vectors are co-linear is the location where the offset curve from the tip 201 should be generated. Tip 201 is used to define a curve that describes the geometry of the lobes on the opposing rotor. The actual direction motion for every value in essence makes its own base curve when rotating therearound with respect to the opposing rotor. Therefore, defining the engagement offset of the basic equation is to determine where the vectors 203 and 205 are co-linear or otherwise point in the exact same direction at various rotational locations as both rotors rotate about their respective axis.

Figure 48:
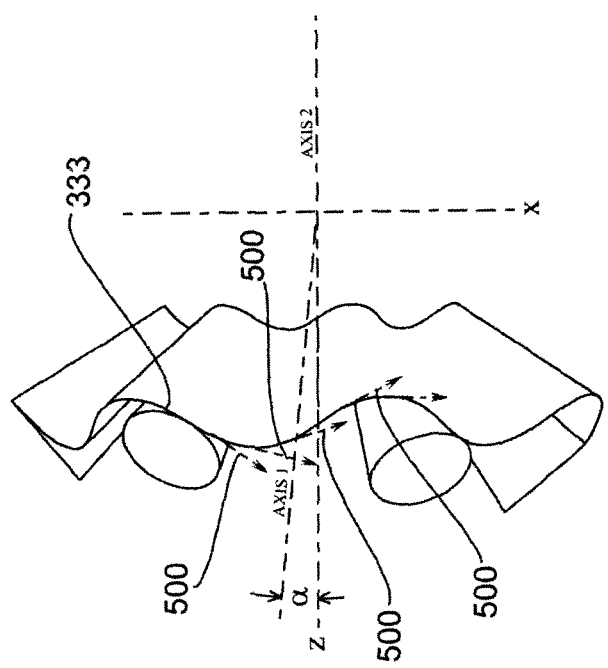
FIG. 48 shows various tangential factors taken along the position of the outer surface of a sphere having the wave reference line positioned thereupon.
Figure 49:
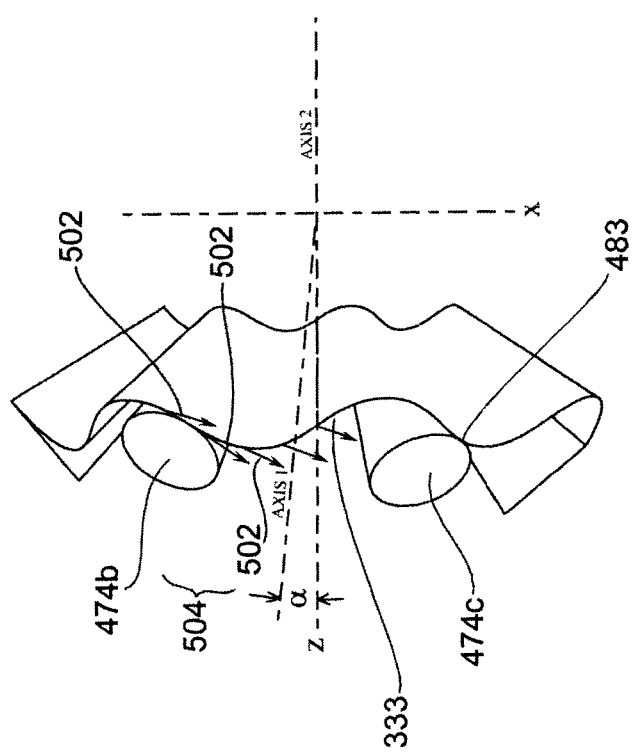
FIG. 49 shows the relative motion of the various points along the outer reference line as the rotor rotates about its axis.
Figure 50:
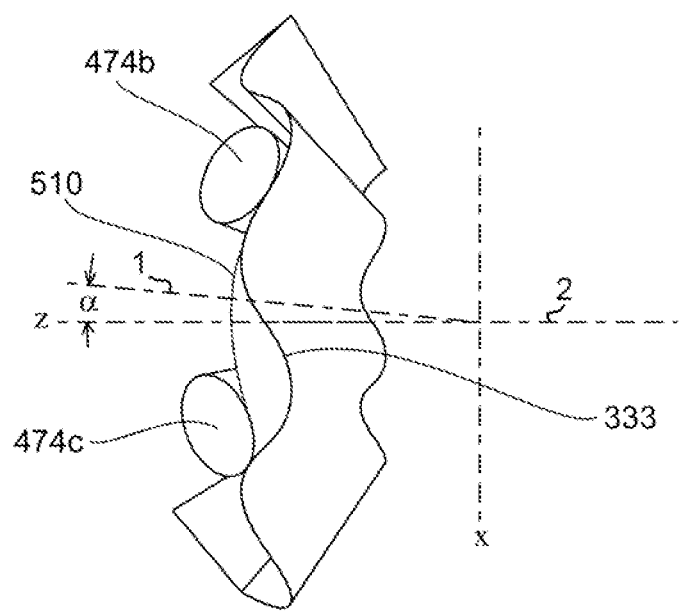
FIG. 50 schematically shows the formation of an engagement surface utilizing the opposing rotor, and in particular the position vectors and motion vectors of the opposing rotor at various rotational positions to form the opposing surface of the rotor.

There will now be a discussion of defining an offset surface in, for example, the embodiment as shown in FIGS. 48-50. Now referring ahead to FIG. 48, there is shown the side view, which is similar to that of FIG. 45 except a plurality of vectors 500 are shown in FIG. 48 as dashed lines. Essentially, these vectors represent the various tangents along the offset curve 333. In other words, because the offset curve 333 lies on the outside of the sphere, one could imagine placing small indexer lines along the tangential direction of each of the points making up the curve 333. Each of these tangential lines represents the vectors 500 shown in FIG. 48. Now referring to FIG. 49, the vectors 502 show the relative motion of each point as the entire curve rotates about its central axis. In other words, the vectors 502 represent an actual motion vector for each point. Therefore, in a similar manner as described above, determining a co-linear factor 500 with a vector 502 for a given constrained region such as that in the approximate XYZ coordinate region indicated at 504 provides for the XYZ coordinate location along the offset line 333 for the definition of the engagement surface of the opposing rotor, which in this case is the rotor related to the cones/indexer extensions 474. Therefore, to create a surface interposed between two indexer extensions such as 474b and 474c, the designer simply identifies the co-linear vectors for each given rotational position of the rotor corresponding to the offset surface 333, and as shown in FIG. 50, the resultant offset line/surface 510 would result. This surface could mesh with the outer surface of the cones 474b and 474c, or the various points along the offset surface 333 could simply to redefine these cone surfaces. It should be further noted that the offset surface 510 can further have gaps positioned therebetween where, for example, by taking the derivative of the direction of the path of the surface, the points could be further rotated a prescribed amount from this derivative 90° "handle" so as to create a predefined gap. Of course, this gap could be defined by taking the value of the distance from the center given a prescribed rotation to define the gap or have a certain angular gap. There could also be an interference fit between the rotors. It should further be noted that the various points which define lines are referred to hereabove as surfaces. Of course, in mathematical parlance, the points define lines; however, as these lines are utilized to form planes and (as described above) curved planes, in effect the various lines ultimately produce surfaces. Therefore, the terms lines and surfaces are utilized above to describe various steps in creating the actual rotors and indexers. It should be reiterated that the "cutter tip" can be of a variety of shapes and change at different distances from the rotational center.

Figure 51:
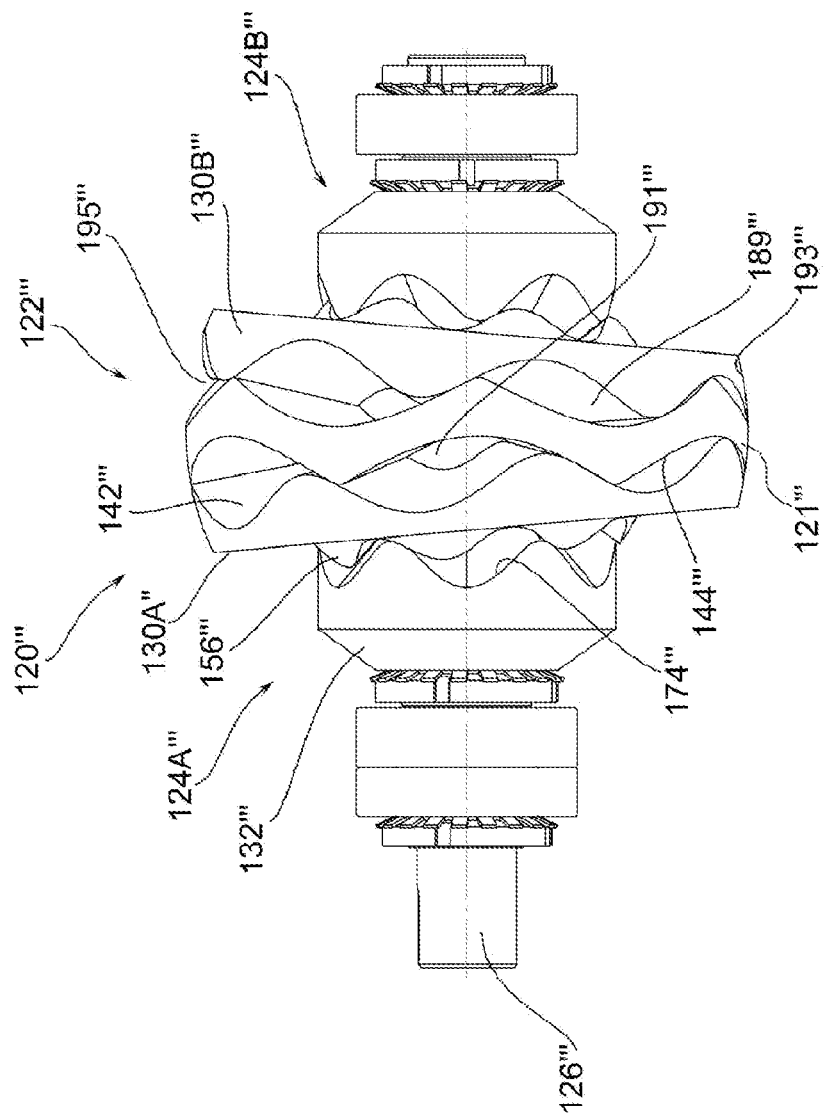
FIG. 51 shows another embodiment of a device to convert energy where an interposed rotor is positioned between two rotors which are in turn in one form attached to an indexing system.

As shown in FIG. 51, there is a device to convert energy 120''' which comprises the drivers 122'''. In general, the rotors 130A''' and 130B''' are each operatively attached to the indexing systems 124A''' and 124B'''. The indexing systems are substantially similar to that shown above with minor modifications. For ease of explanation, the index system 124A''' will be described in detail with the understanding that the disclosure relates to the opposing indexing system 124B'''. Of course, in the broader scope, different types of indexing systems could be used on each of the drive rotors, or various combinations of indexing systems described above can be combined, or even the indexing system as shown in FIG. 51 can be used on one portion where the other opposing rotor is rigidly locked to the through-shaft as described above with reference to FIG. 38. The indexers could be made from bearing material, low friction material, or could be steel coated with low friction or anti-wear coatings, hard coatings, ceramic coatings or various coatings that would be expected in gearing applications, or coatings typically seen used for reducing friction wear on machine parts that rub. Depending if the indexers are used in high or low torque applications, the material could be purely a plastic such as Delron in low torque low force applications as an example. The ball of the through-shaft can also be made of a low-friction or other material for desirable sealing quality or self-lubrication. The indexers or shaft ball could be made of self-lubricating, or impregnated materials.

Figure 53:
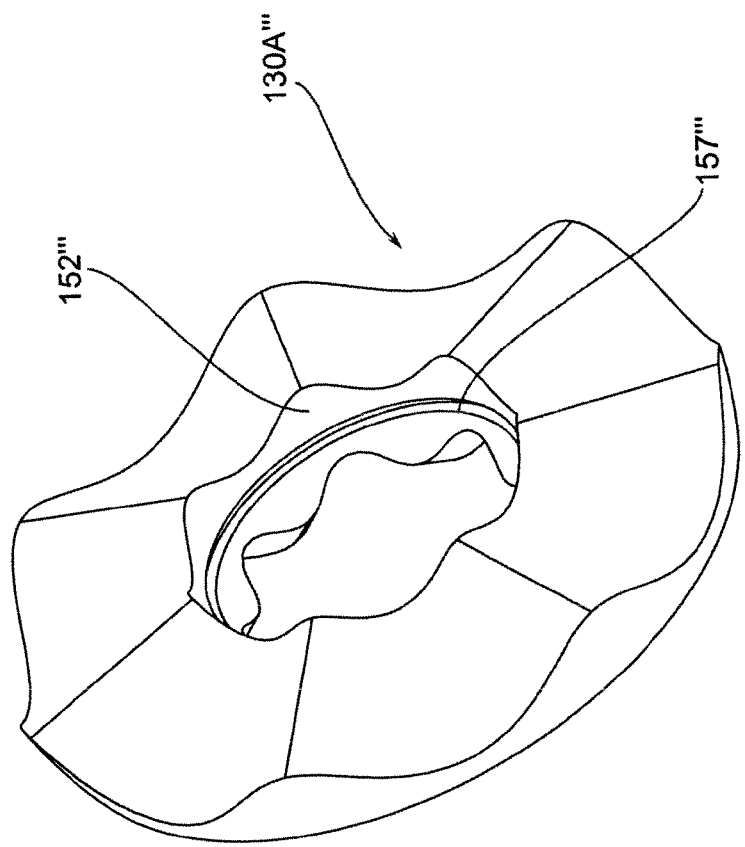
FIG. 53 shows an isometric view of a driver.
Figure 52:
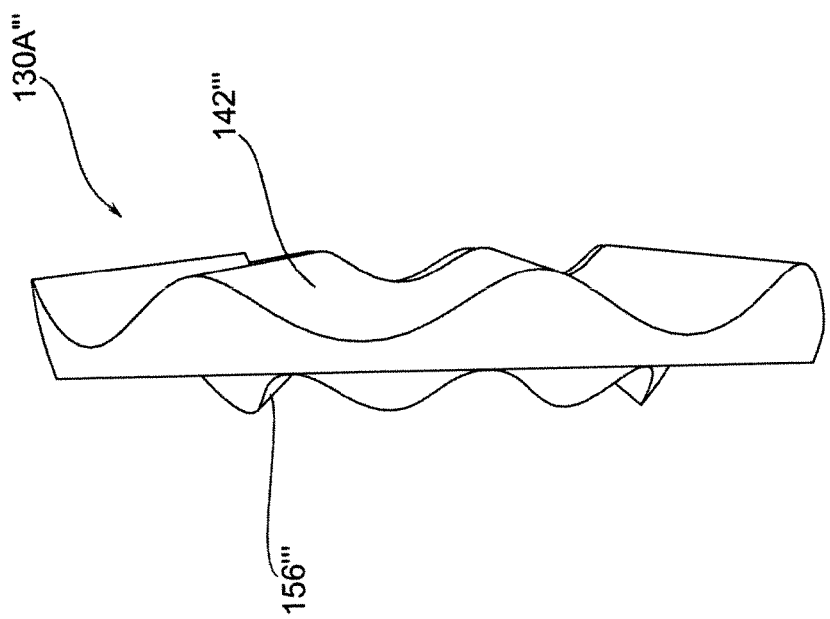
FIG. 52 shows a side profile view of a driver.
Figure 71:
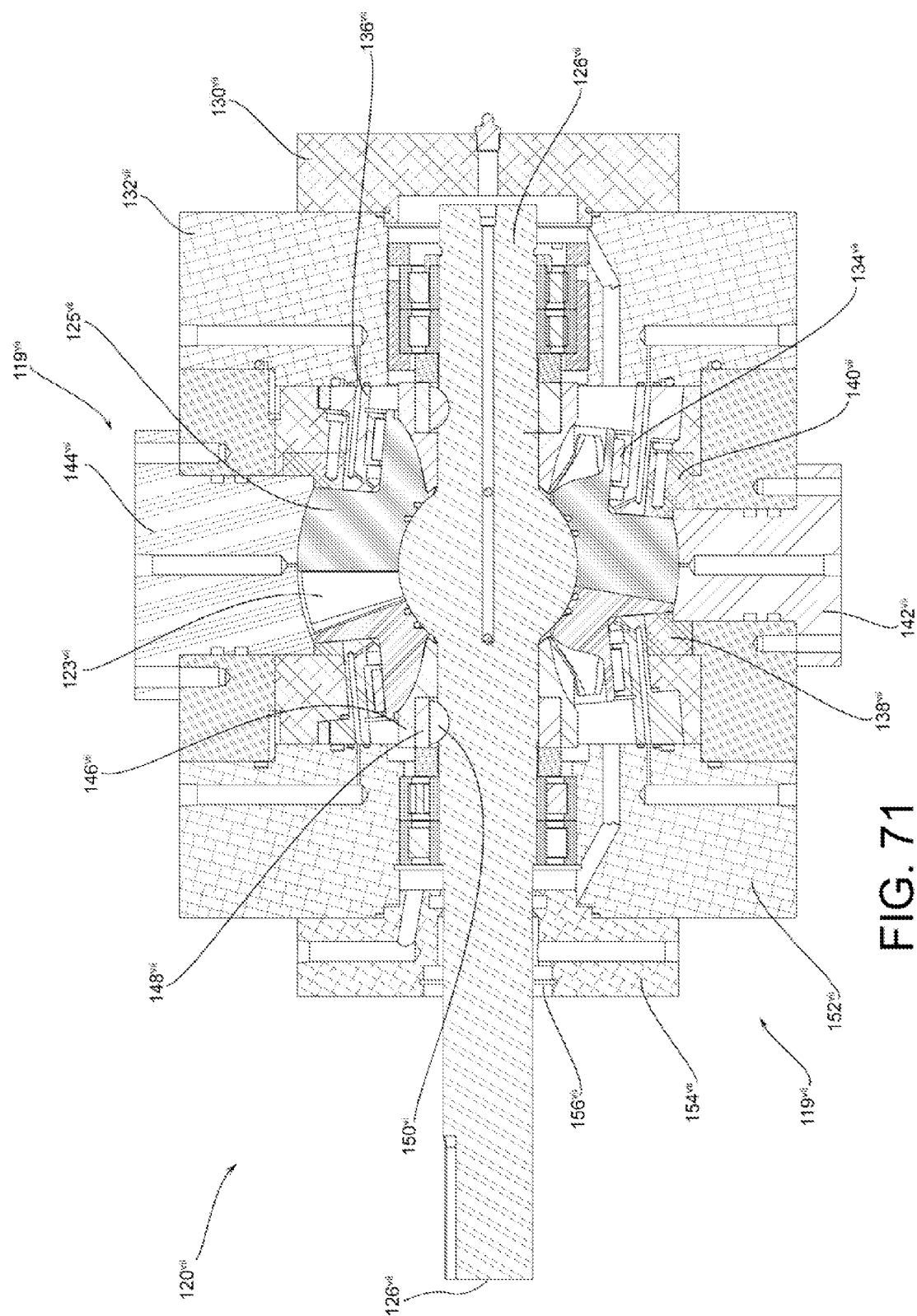
FIG. 71 shows a cross-sectional view of a device to convert energy showing an outer casing member.

FIG. 51 shows the rotor 130A''' engaged in the device to convert energy, with only an external casing not shown for clarity purposes (see FIG. 71 for an example of a casing). Before describing the interposed rotor 121''', there will be a detailed description of the indexing system. As shown in FIG. 52, there is a side profile view of one of the rotors, for example 130A''. In general, the drive rotor comprises an engagement surface 142''' which is operatively configured to engage the co-operating surface 144''' of the interposed rotor 121'' as shown in FIG. 51. In general, the surfaces 142''' and 144''' are similar in nature to the surfaces described above, such as in FIG. 27, corresponding to the surfaces 142'' in 143''. Further, the non-engaging portions of the surface 142'' can be constructed using the alignment derivative method described above in detail with reference to FIGS. 46-50. Referring back to FIG. 52, it can be appreciated that the index offset surface 156'' is provided and is operatively configured to engage the indexer surface 174'' as shown in FIG. 51. In general, the indexer surface 174'' is part of the index housing 132'' which is rigidly attached to the shaft 126''. As shown in FIG. 53, it can be seen that there is an inward surface 152'' which is configured to engage an interior spherical portion, such as the center portion of a shaft. Further, an annular groove 157'' is provided and may (for example) have a seal ring placed therein.

Figure 55:
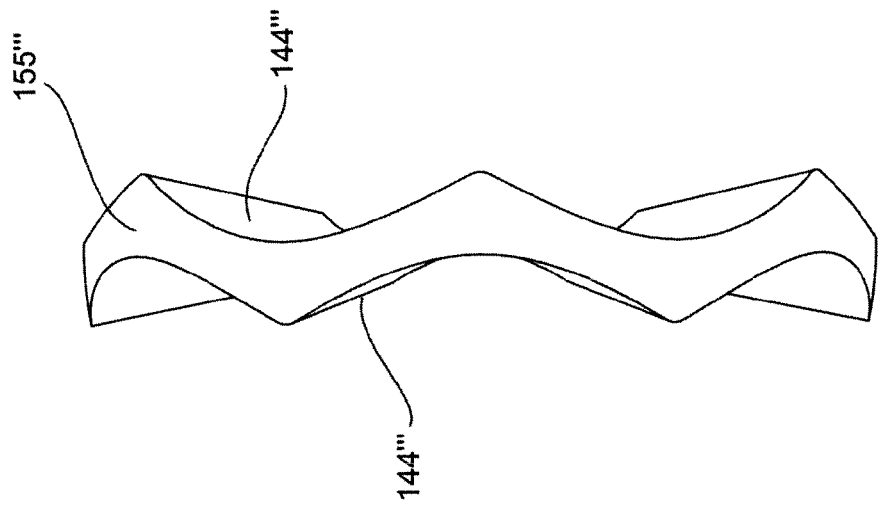
FIG. 55 shows a side profile view of an interposed rotor showing one form where the offset surfaces are out of phase by one-haft of a rotational cycle.
Figure 54:
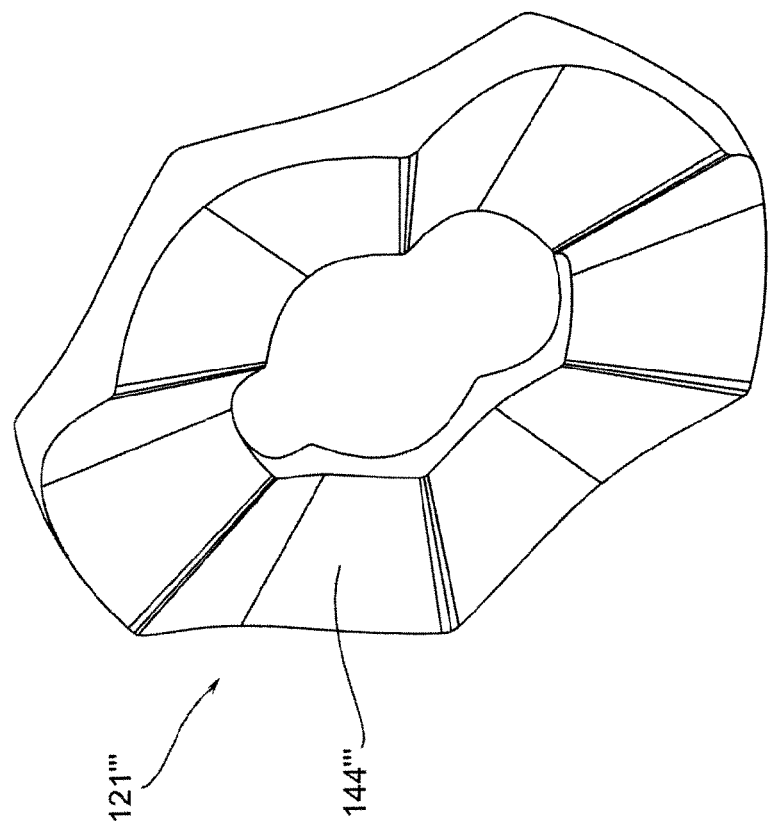
FIG. 54 shows an isometric view of an interposed rotor in one form.

Now referring to FIG. 54, there is shown the interposed rotor 121'' in an isometric view. In general, as described above, the co-operating surface 144''' in one form can be substantially similar on opposing sides, and even offset by one lobe width as shown in FIG. 54. Further, in FIG. 55, as with the other rotors, the outer surface 155'' is provided and generally forms a portion of a sphere to mate with an interior corresponding spherical surface of the housing.

Referring now back to FIG. 51, it can be appreciated that the interposed rotor 121'' is designed as such to create operating chambers 189'' and 191'' which change in volume from the minimum volume region 193''' to the maximum volume region 195''. The alpha angle and other parameters can be adjusted such that a bifurcating line which is, for example, perpendicular to the rotation of the shaft positioned at the very center of the rotors 122'', can allow separation between the opposing operating chambers 189'' and 191''. Therefore, a casing can have a divide line positioned circumferentially thereinaround with various porting arrangements to provide and derive work from various operating fluids (compressible and incompressible fluids). Such examples of porting arrangements are found in the various references owned by the assignee company noted above, which are incorporated by reference.

Figure 57:
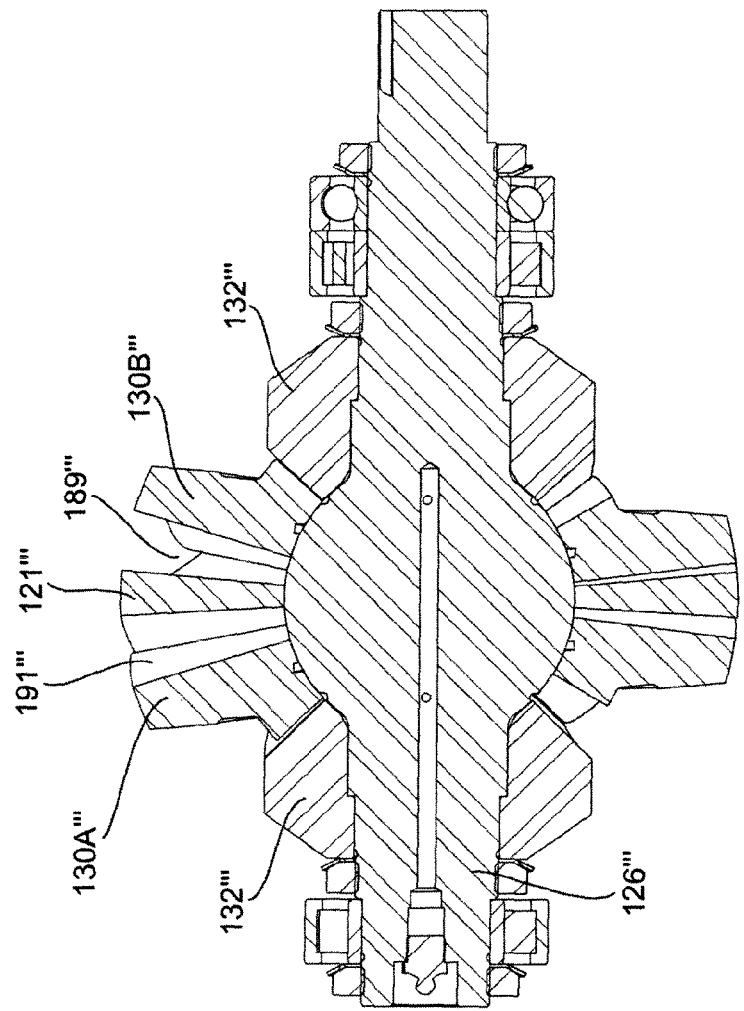
FIG. 57 shows a side profile cut view taken along line 57-57 of FIG. 56.
Figure 56:
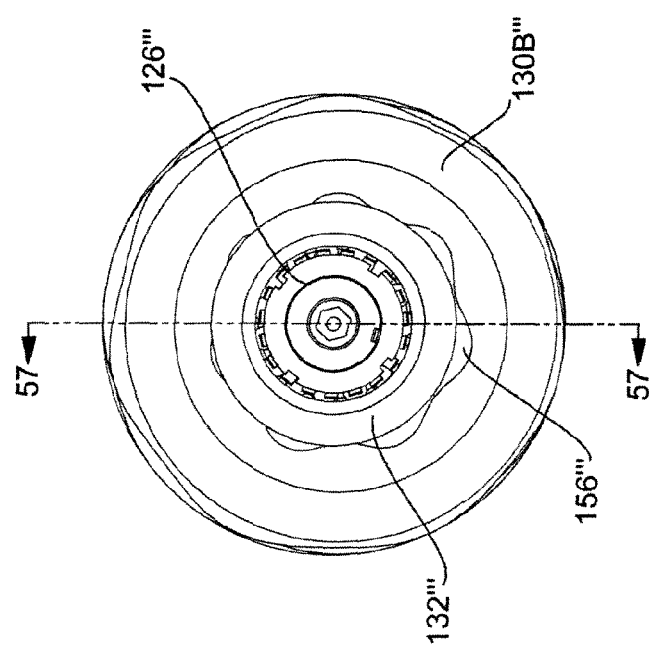
FIG. 56 shows an end view of the embodiment of FIG. 51.

FIG. 56 shows an end view taken along the shaft 126'''. In general, FIG. 56 shows how the index housing 132''' only partially obstructs the view of the index offset surface 156'''. Further, line 57-57 of FIG. 56 defines a cutaway view for FIG. 57 where it can generally be appreciated that the rotors 130A''' and 130B''' each define the operating chambers 189''' and 191''' in conjunction with the interposed rotor 121. In general, the index housings 132 in one form can be adjusted along the shaft 126 so as to provide proper engagement between the co-operating surfaces 174''' the index offset surfaces 156''' (see FIG. 51).

Figure 60:
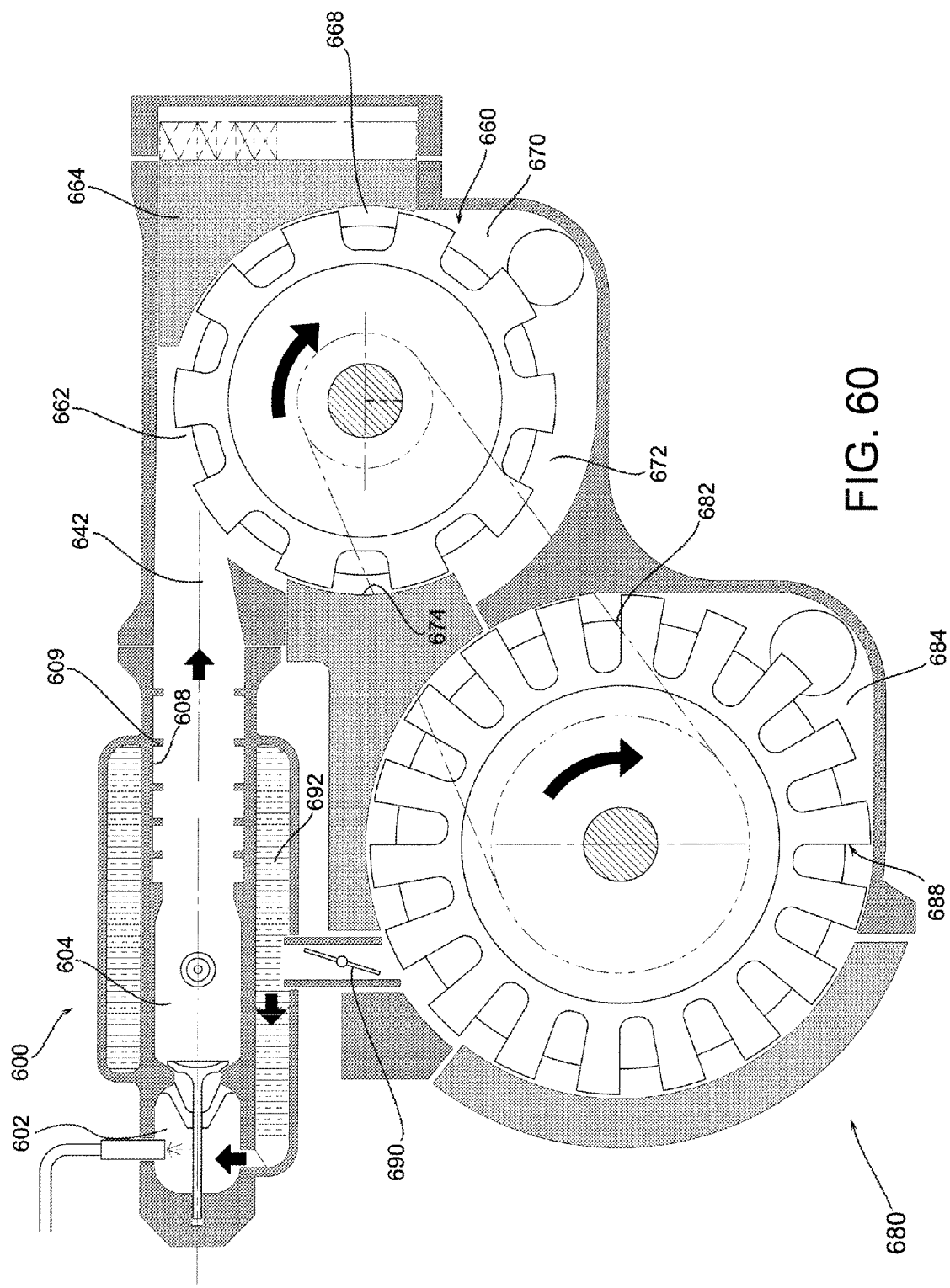
FIG. 60 shows a schematic view of a pulse detonation device in conjunction with a positive displacement rotary motion device to convert energy.

As shown in FIGS. 58-60, there is a schematic view of a pulse detonation system which can be utilized on its own or in conjunction with a positive displacement device, such as the device to convert energy described above. In general, the pulse detonation device 600 as shown in FIG. 58 is in a cross-sectional view, but in one form has a circular exterior type structure. In general, the device 600 comprises a fuel mixing region 602, an ignition region 604, a deflagration detonation transition zone (DDT zone) 606, and a detonation region 608.

Referring to FIG. 59 which is taken along line 59-59 of FIG. 58, it can be appreciated that the fuel mixing region 602 in one form generally comprises air intake ports 610 and 612. In one form, the center axis of each air intake port 610 and 612 is positioned a radial distance from the center of the mix chamber 614 to create a swirling action. The fuel injector port 616 is further provided to mix fuel in the mix chamber 614. Referring back to FIG. 58 there is shown a valve 620. In general, the valve in one form can be controlled by an inherent mechanical process where the valve is biased to a closed position around the valve seating 622. For example, the valve can be biased by a spring member such as a helical spring placed therein. Therefore, when a certain degree of pressure builds up within the mix chamber 614, the fuel air mixture slips around the valve into the combustion chamber 626 which is a portion of the ignition region 604. In this region an igniting member such as a spark plug 628 initiates the combustion. Combustion increases pressure and applied pressure force overcomes any spring biasing of the valve 620 to close the valve and momentarily stop the continuous intake of air from the air intake ports 610 and 612 to build up pressure therein. Thereafter, combustion flame front will pass through the left-hand portion of FIG. 58 into the DDT zone 606, and the flame will propagate and the fuel air mixture will burn further accelerating the flame speed. Eventually the flame velocity reaches the Chapman-Jouguet condition and the fuel air mixture detonates in a constant volume process. Thereafter, the combustion product gases travel through the interior chamber 640 and exits through the exit port 642. A device with a properly fitted casing such as the device shown above in FIG. 13 can be in communication with the exit port 642 to allow the high pressure gas to impart its energy upon the drive rotors 122. It should be noted that a properly fitted casing will be fitted around the drivers to provide sealed chambers. Further, the sealing regions can be strategically positioned to allow for a prescribed amount of expansion which can be modeled to optimize the amount of work from the expanding gas. Further, the number of lobes and position of the lobes could be synchronized with the first explosions within the pulse detonation device 600 to provide high pressure peaks when the broad open faces of the lobes of the rotors are in full view of the expanded pressure wave of gas.

In other words, referring back to FIG. 13, a smaller number of lobes could be employed and a steeper alpha angle such as 15°-35° can be utilized. The indexing system can greatly aid in maintaining relative spacing between the drivers. Therefore, in an optimized form, the full exposure of lobes in a port can be timed with the high-pressure waves exiting the exit port 642.

It should be noted that the embodiment of a pulse detonation device 600 as shown in FIG. 58 is schematic in nature, and this form provides a plurality of data-acquisition points of interest 644 to measure various data parameters, such as pressure and temperature.

Now referring to FIG. 60, there is a schematic view of the pulse detonation device 600, and located at the exit port 642 is a device to convert energy such as a rotary motion positive displacement device 660. In general, the device 660 can be similar to the devices to convert energy 120. The device 660 has an entrance port 662 which in one form comprises adjustable seals 664. In general, the adjustable seal 664 can generally move outwardly from the various rotors of the device 660 so as to allow the expanding gas from the pulse detonation device 600 to enter at a greater initial volume. In general, the max volume location 668 is provided where the engaging rotors are at a maximum volume, and thereafter, the gas is exited at the exhaust region 670. Thereafter, the rotors reduce the volume and further positively displace the exhaust out of the downstream exhaust region 672, and the seal 674 is provided and acts as a casing seal at the minimum volume region of the device 660.

Further, a second device to convert energy can operate as a compressor, and this device 680 in one form can be operatively connected to the device 660, for example by a belt 682. In general, there is an air intake region 684 where air (e.g. ambient air) enters into the various chambers and is compressed therein, for example at a ratio of 4 to 1 compression. The air intake of the device can be completed at the maximum volume location 688, and the compressed gas can exit near the throttle 690 and be mixed with fuel to create a compressed air fuel mixture. In general, a heat transfer plenum 692 can be provided to allow heat to be transferred from the pulse detonation region 608, and from the ignition region 604. It should further be noted that in one form, turbulence generators (flame accelerators) such as for example Shchelkin spirals 609 can be provided which aid the deflagration to detonation process in region 608.

Figure 60A:
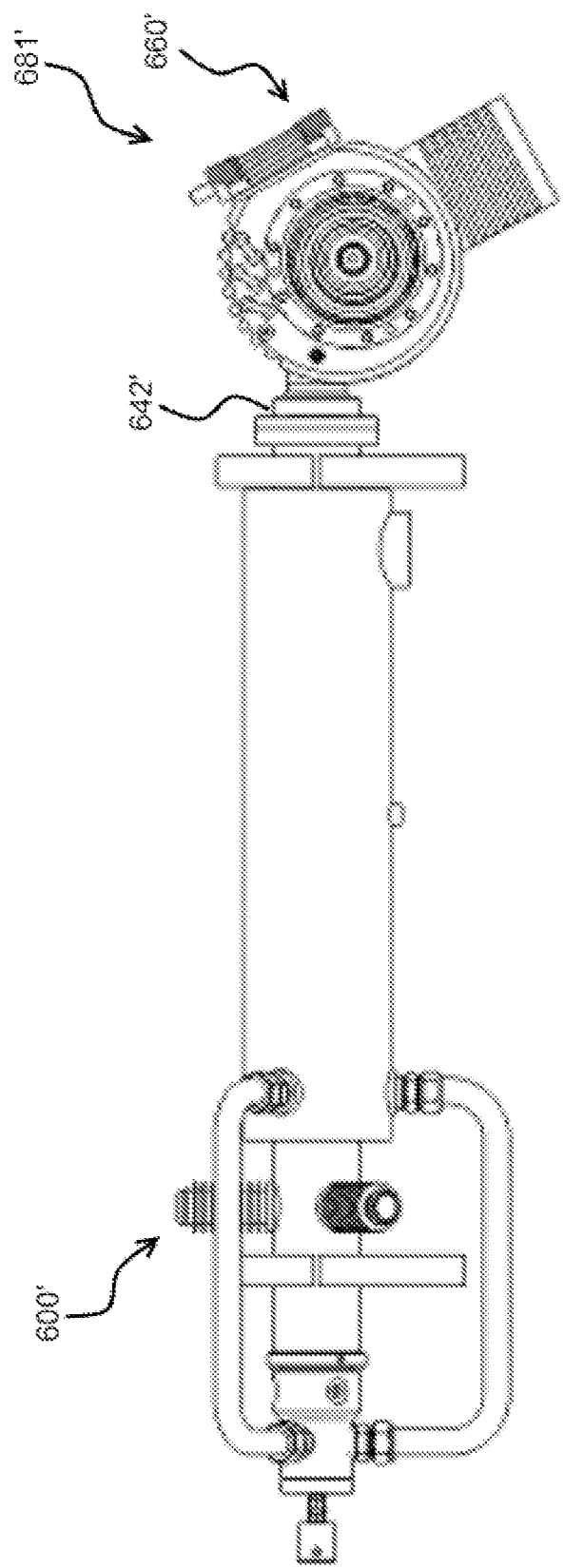
FIG. 60A shows a side view of another version of a pulse detonation engine attached to a device to convert energy.

Referring to FIG. 60A, there is shown a valveless pulse detonation device 600', located at the exit port 642'. There is a rotary motion positive displacement device 660' which comprises a powered output adjustment system 681'. In general, the device to convert energy 660' in one form is an embodiment within this application, as well as other potential devices covered by the claims of this or other patents, as well as other devices to convert energy, such as but not limited to U.S. Pat. No. 5,755,196, U.S. Pat. No. 6,036,463, U.S. Pat. No. 6,497,564, and U.S. Pat. No. 6,739,852, all of which are incorporated by reference. Further, the broader scope downstream gas or a portion thereof can be measured by way of a flowmeter, as recited in U.S. Pat. No. 6,705,161, which is also incorporated by reference.

Figure 60B:
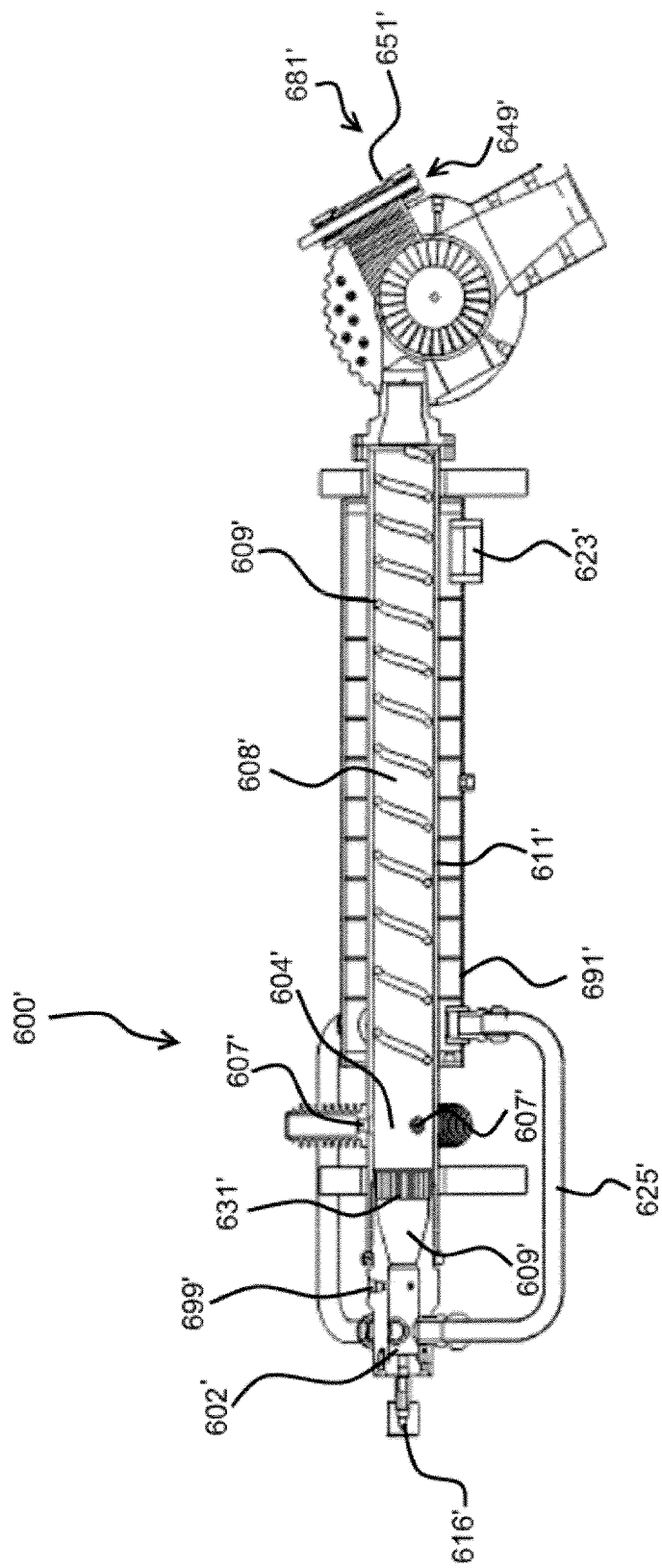
FIG. 60B shows a partial, cross-sectional view of the pulse detonation device.

Referring now to FIG. 60B, the valveless pulse detonation device 600' is shown in a cross-sectional view where the detonation region 608' can be seen, which in one form is comprised with Shchelkin spirals 609', which can be in a helical orientation and in one form be an insert, such as a helical member inserted and fixedly attached to the tube 611'. In one form, the distance between the rotations of the helical portion of the Shchelkin spiral 609' can increase in frequency, or otherwise the pitch between spirals can be reduced (or in some forms increase depending on the expansion of the gas), pursuant to the velocity of the gas therein.

The heat transfer system 691' is provided with an entrance port 623' that allows a gas, such as compressed air, enter therein and travel in a countercurrent fashion in one form where heat from within the detonation region 608' is transferred there to the gas for preheating thereof. The gas then travels through the gas transfer tubes 625' to the mixing chamber/fuel mixing chamber 602', where the preheated gas will mix with a fuel mixture and pass through a diffuser 631'. The diffuser is designed to stratify (reduce turbulence in) the gas mixture prior to the combustion chamber 604'. In general, the diffuser can be of a variety of designs, where in one form a plurality of holes defined by longitudinally extending surfaces reduce the spiral action of the gas for proper detonation. In one form, the open cross-sectional area of the diffuser is at least 50% compared to the surface area of the entire cross-section of the diffuser region. In the broader scope, the open cross-section area is at least 30% up to 98% of the total cross-sectional area of the diffuser region. In other forms, the diffuser can comprise longitudinally extending fins for properly shaping the gas stream for a desirable detonation.

Figure 60C:
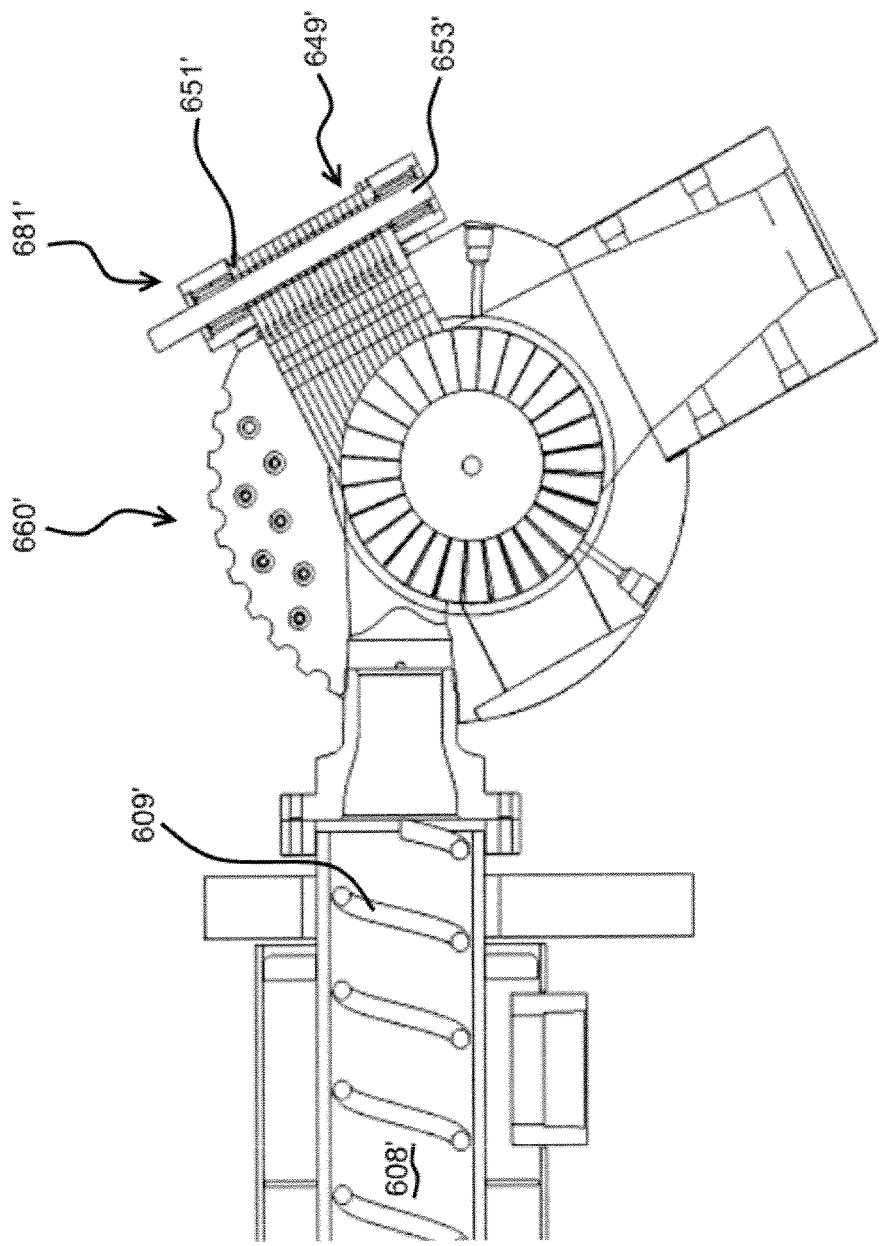
FIG. 60C. shows a sectional view of the device to convert energy attached to the end region of the pulse detonation device.
Figure 60D:
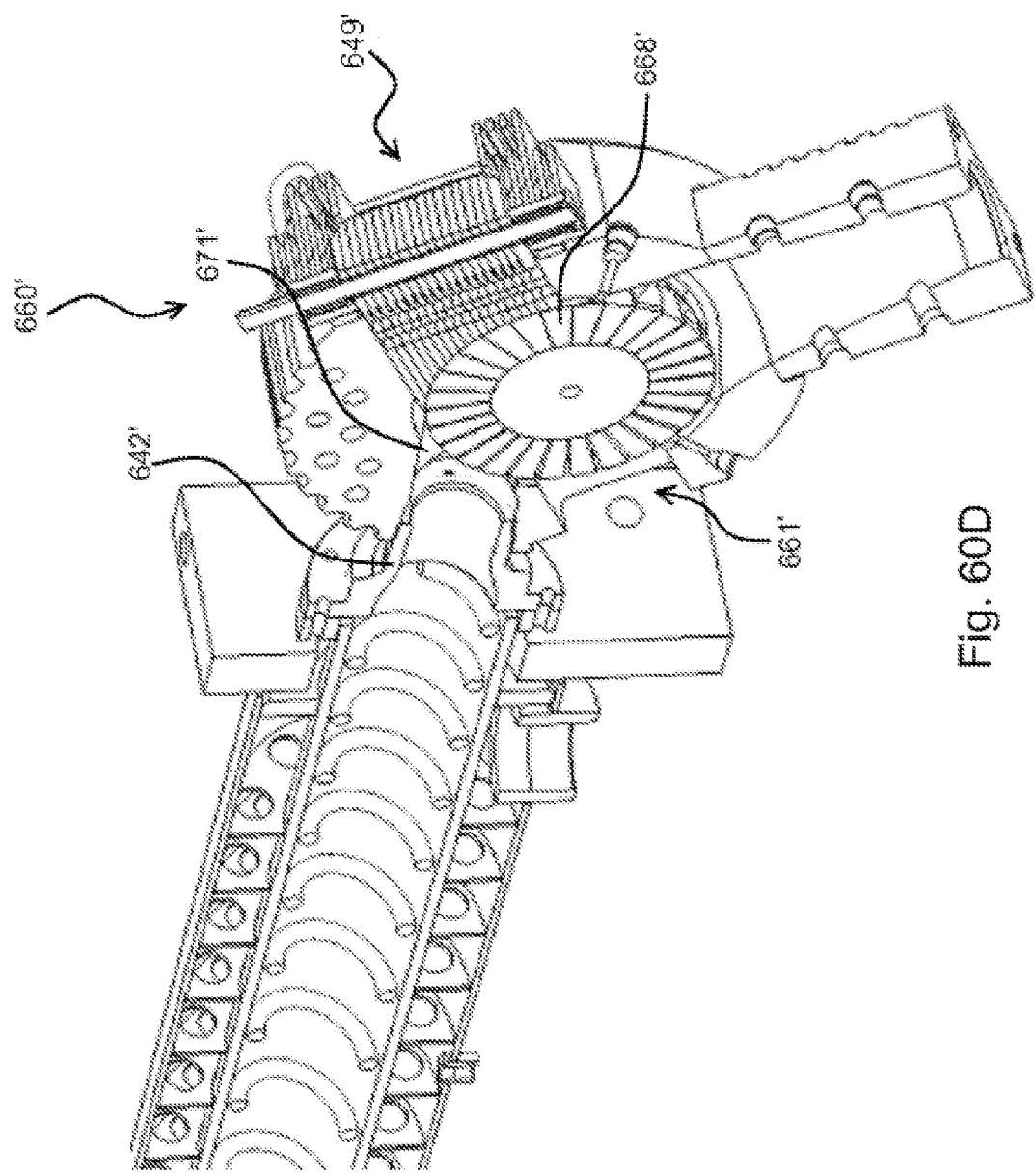
FIG. 60D features a cross-sectional view of the end portion of the pulse detonation device attached to device to convert energy, or in one form a port adjustment opening device as shown in the upper right-hand portion of this figure.
Figure 60E:
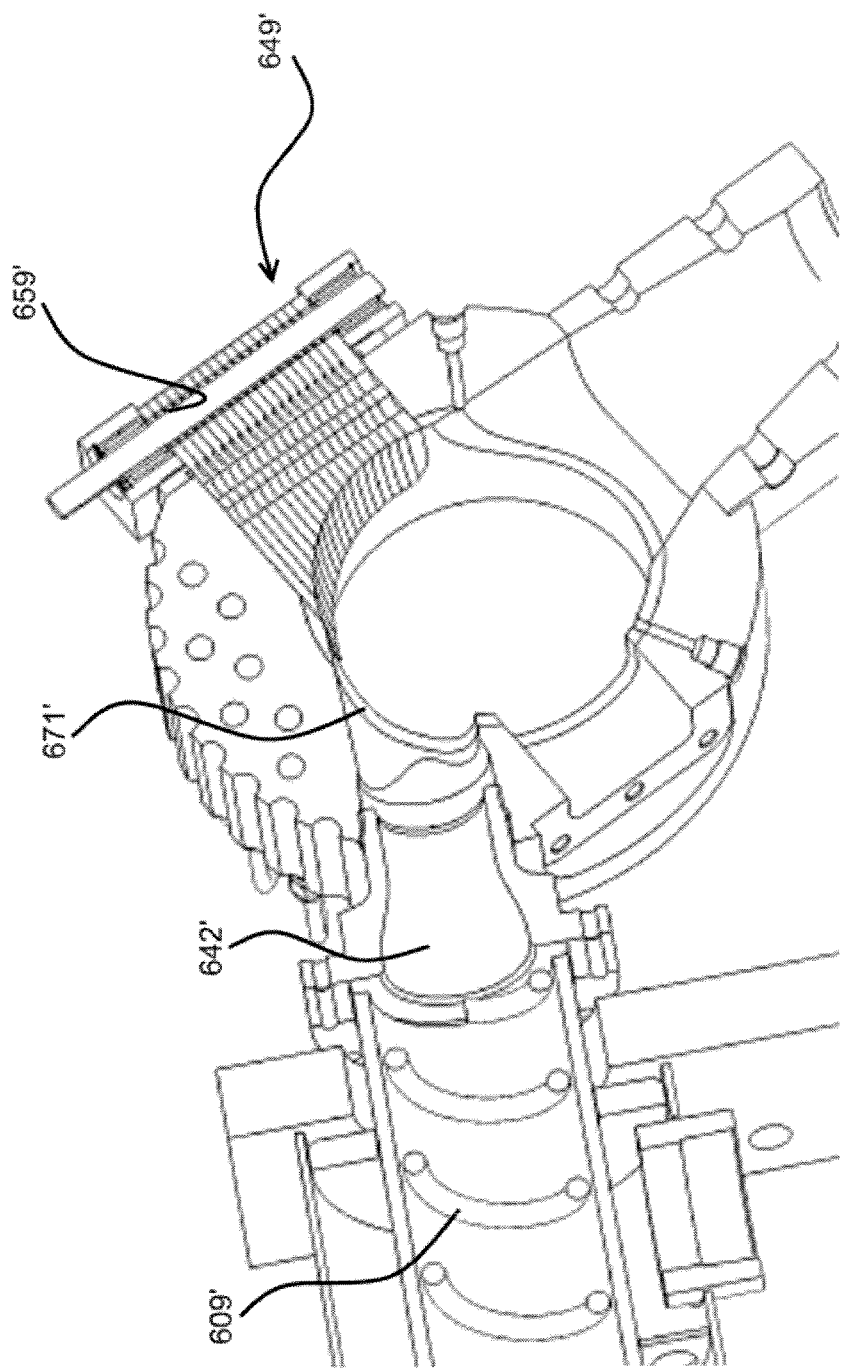
FIG. 60E. shows another cross-sectional, isometric view, with the central rotors removed from the system.
Figure 60F:
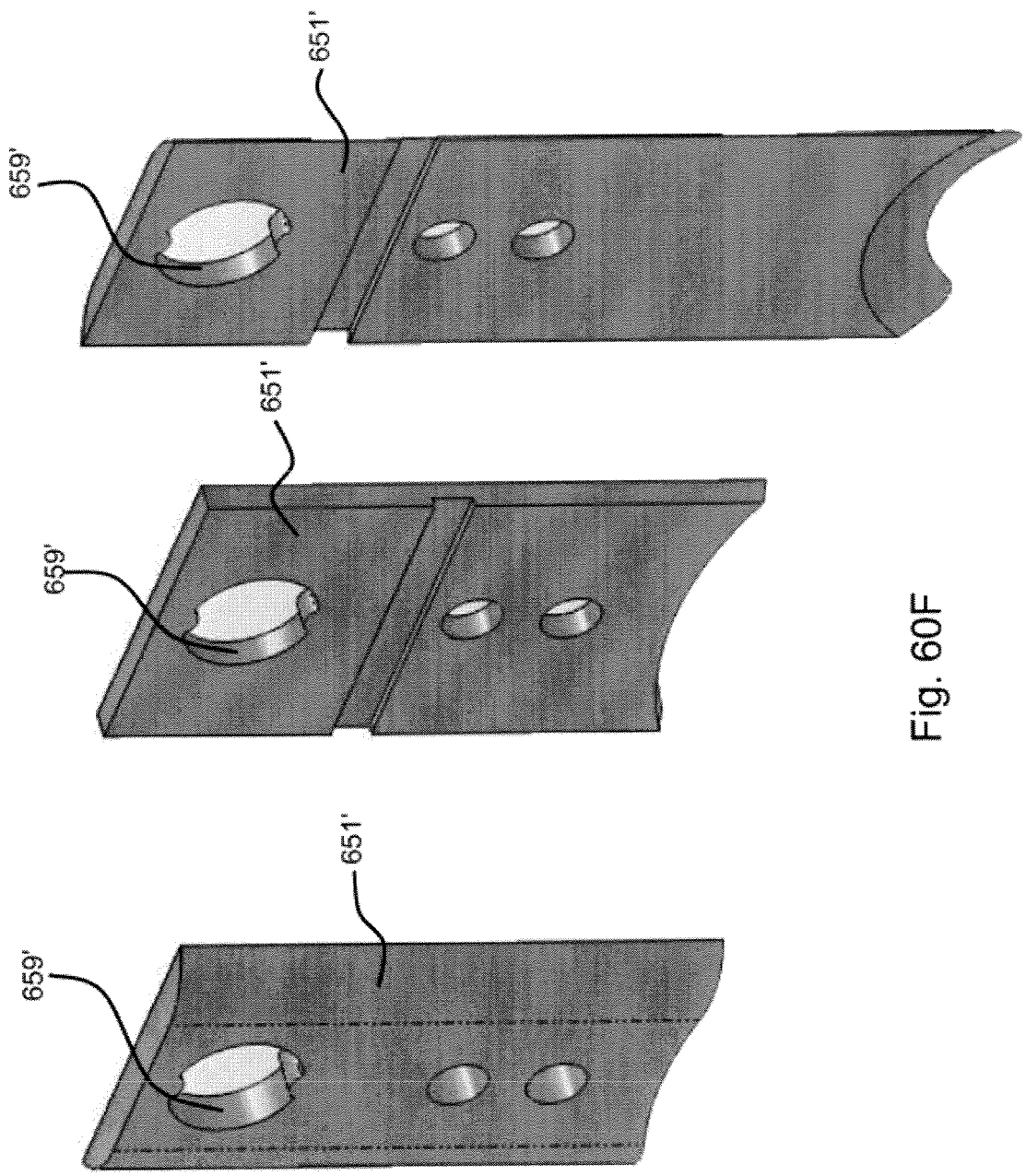
FIG. 60F. shows a sample of a view of the slides utilized for adjusting the port volume.
Figure 60I:
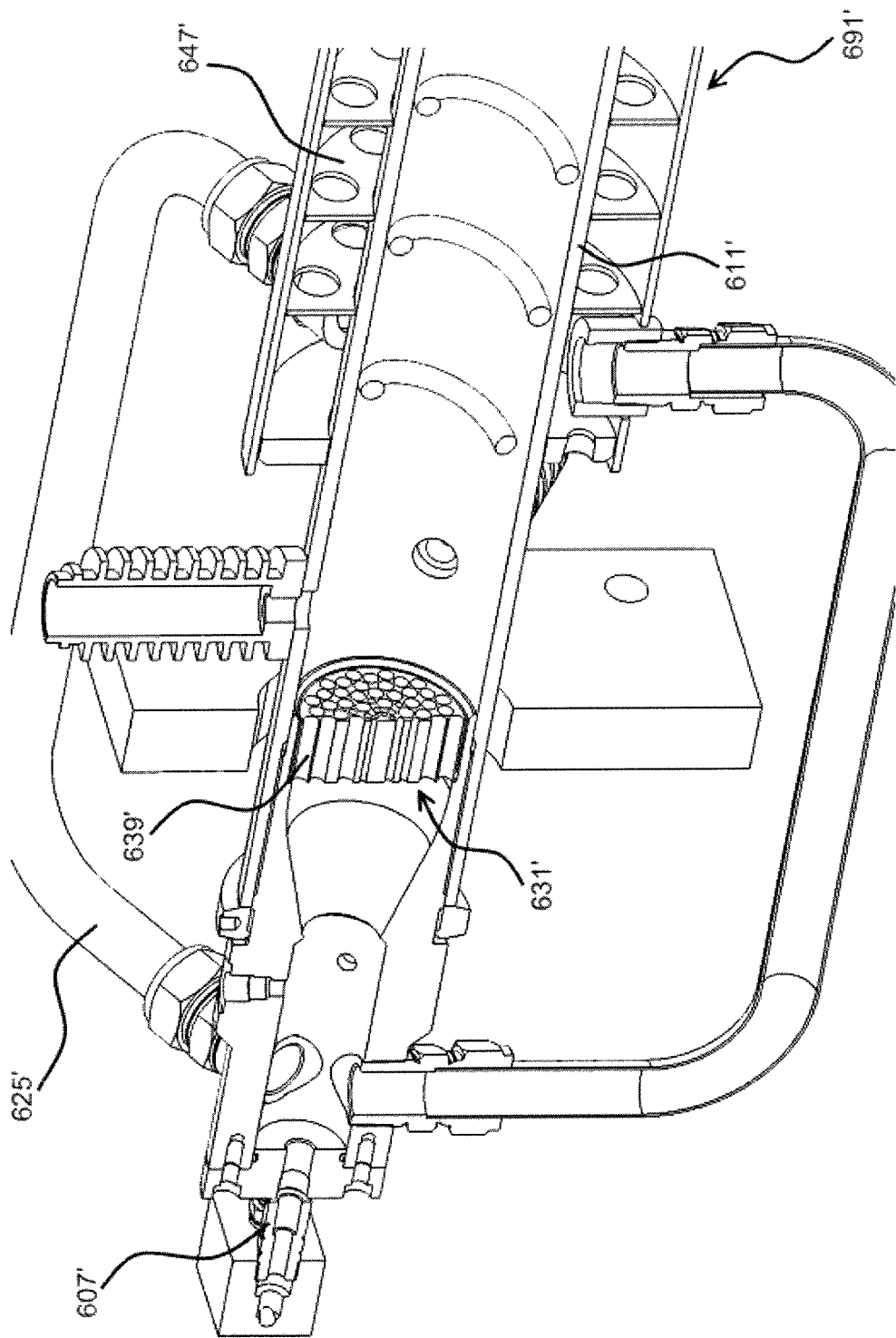
FIG. 60I shows a cross-sectional view near the longitudinally rearward region of the pulse detonation system, showing an ignition device, a mixing chamber in communication with a preheater, which is in turn in communication with a nozzle that provides communication to a diffuser, which are all upstream from the ignition location where an igniter is located.

As shown in FIG. 60I, there is a cross-sectional view showing the diffuser 631 where a plurality of surfaces defining the openings 639' are generally shown. Further, as shown in FIG. 60I, it can be seen that fins 647' are provided within the oxidant conduit of the heat transfer system 691' to further allow convection from the tube 611' to the air traveling therethrough the heat transfer system 691'.

The fuel injector 616' shown in FIG. 60B is comprised to inject a prescribed amount of fuel within the mixing chamber 602'. The fuel injected therein can be a dirty fuel, fuel conventional with pulse detonation devices or other fuels that provide energy when ignited. The expander region 609' in one form provides an increasing cross-sectional diameter from the rearward to forward longitudinal regions to slightly expand the fuel air mixture before entering the diffuser 631'.

The combustion region 604' comprises an ignition system that is capable of exerting sufficient activation energy for igniting the air fuel mixture. In one form, the ignition region comprises detonators (igniters) that are generally positioned at the ignition locations 607'. The detonators in one form can be conventional spark plugs, providing constant energy to this region. In the broader scope, the detonation region can be a laser ignition device or otherwise a device to apply sufficient energy, which in one form is thermal energy, to ignite the gas. The distance from the ignition location 607' to the longitudinal forward region of the diffuser 631' should be positioned in a manner to optimize ignition. In one form, the ignition location 607' is approximately one diameter length of the tube (the inner surface thereof) 611' plus or minus 50%. In the broader scope, this distance can be between one fourth of a tube diameter up to four times the tube diameter, of course depending on multiple factors, such as the fuel to be combusted, the cross-sectional open area of the diffuser, the flow rate of the fuel air mixture and potentially other factors.

Now referring to FIG. 60C, there is a close-up of the device to convert energy 660'. One form of an input port adjustment system 681' is shown whereby there is a plurality of seal block members 651', which collectively comprise a stack 649' of seal block members. In one form, a central camshaft 653' is provided that can be rotated to engage an internal cam surface as shown in FIG. 60E at 659'. As shown in FIG. 60D, the device to convert energy 660' is shown where there is a first and second rotor shown in a cross-sectional view, which is generally referred to as a rotor assembly 661'. It can generally be appreciated that the exit port 642' ejects gas at a fairly high velocity, in the mach three range in one form. This high pressure gas imparts its energy upon the rotor assembly 661'. It can be appreciated that the central thrust of the expanding gas is not at the center portion of the rotor assembly, but somewhat tangential thereto for imparting the kinetic energy from the expanded gas to an open broad face of each of the rotor members. In one form, the rotor members will generally have a max volume location in the general rotational vicinity at 668'. Therefore, if the stack of seal block members 649' are arranged in a manner where the gas can seep through the channel initially forming at 671' towards the max volume location whereby the high-pressure gas will directly impose its force upon the rotors at a maximum pressure, producing maximum torque upon the rotor assembly 661' (on at least one or both of the rotors or on multiple rotors if a "sandwich-like" design is utilized, such as that shown in FIG. 69A). Referring to FIG. 60E it can be seen that the channel 671' is generally shown and is in communication with the extended portions of the stack of seal blocks 649'.

Referring now to FIGS. 60E-60H, there are shown various drawings of seal block members, as well as the central camshaft. As shown in FIG. 60F, the seal block members 651' each comprise the internal cam surface 659', which in one form has extensions configured to engage the cam surface 655' of the central camshaft 653', as shown in FIG. 60H. Therefore, it can generally be appreciated that the various seal block members, as shown in the stack of seal block members 649 in FIG. 60G, can be individually controlled and sequentially opened by way of rotating the central camshaft 653'.

Figure 60J:
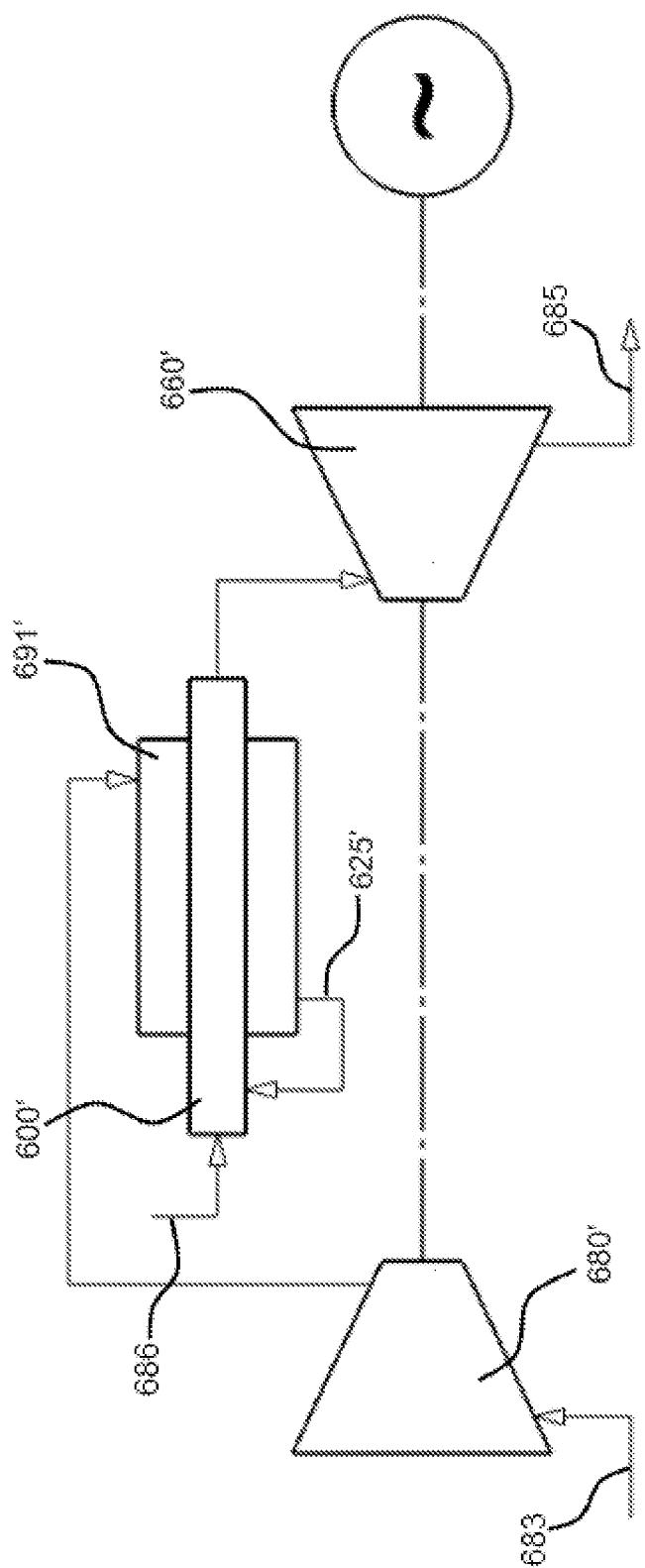
FIG. 60J. shows a schematic example of one form of a pulse detonation system with an expander and a compressor, where the torque from the expander drives the compressor.
Figure 60K:
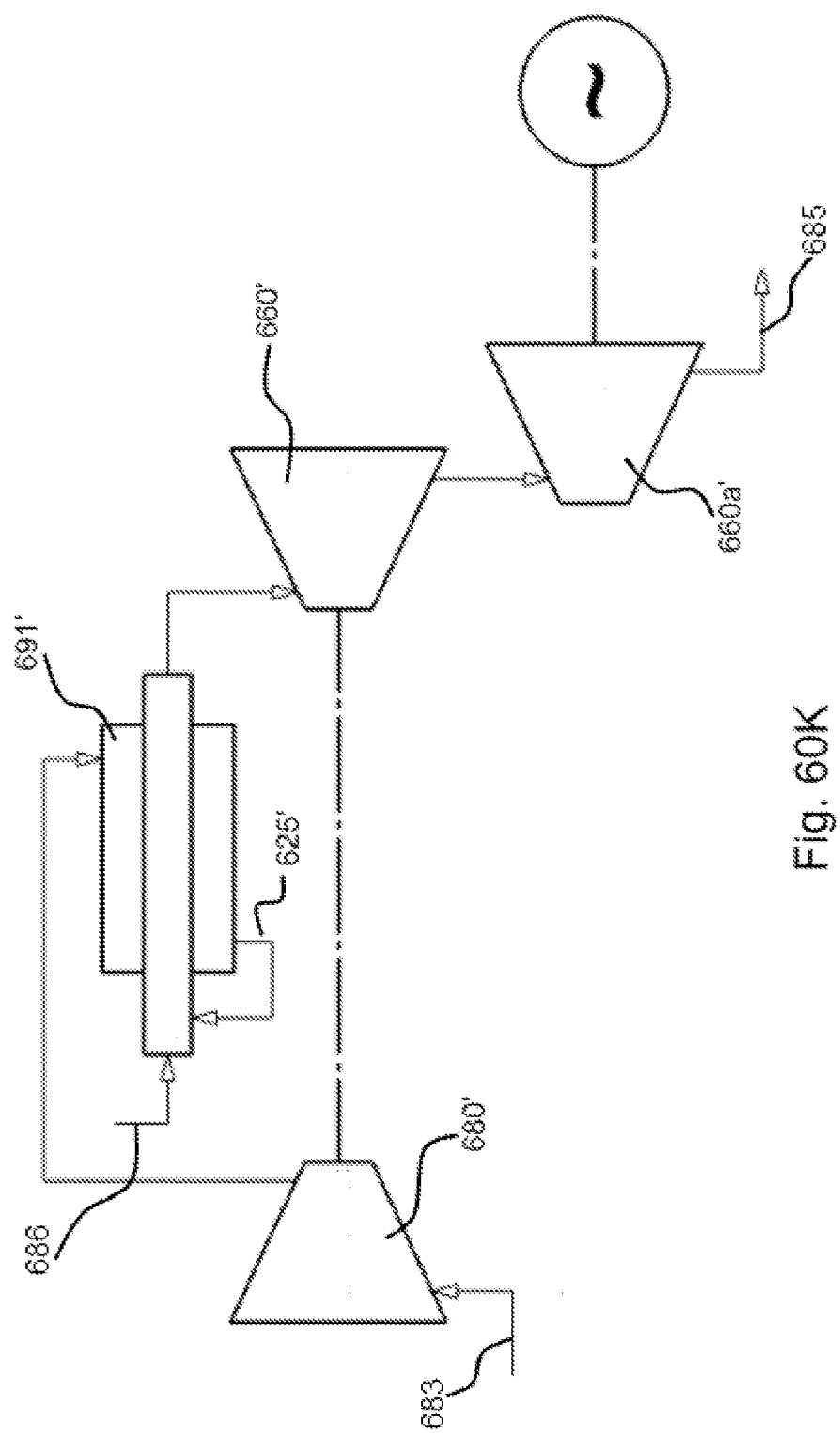
FIG. 60K. shows another embodiment, where a first expander drives a compressor and the exhausted gas from the first expander goes to a second expander.
Figure 60L:
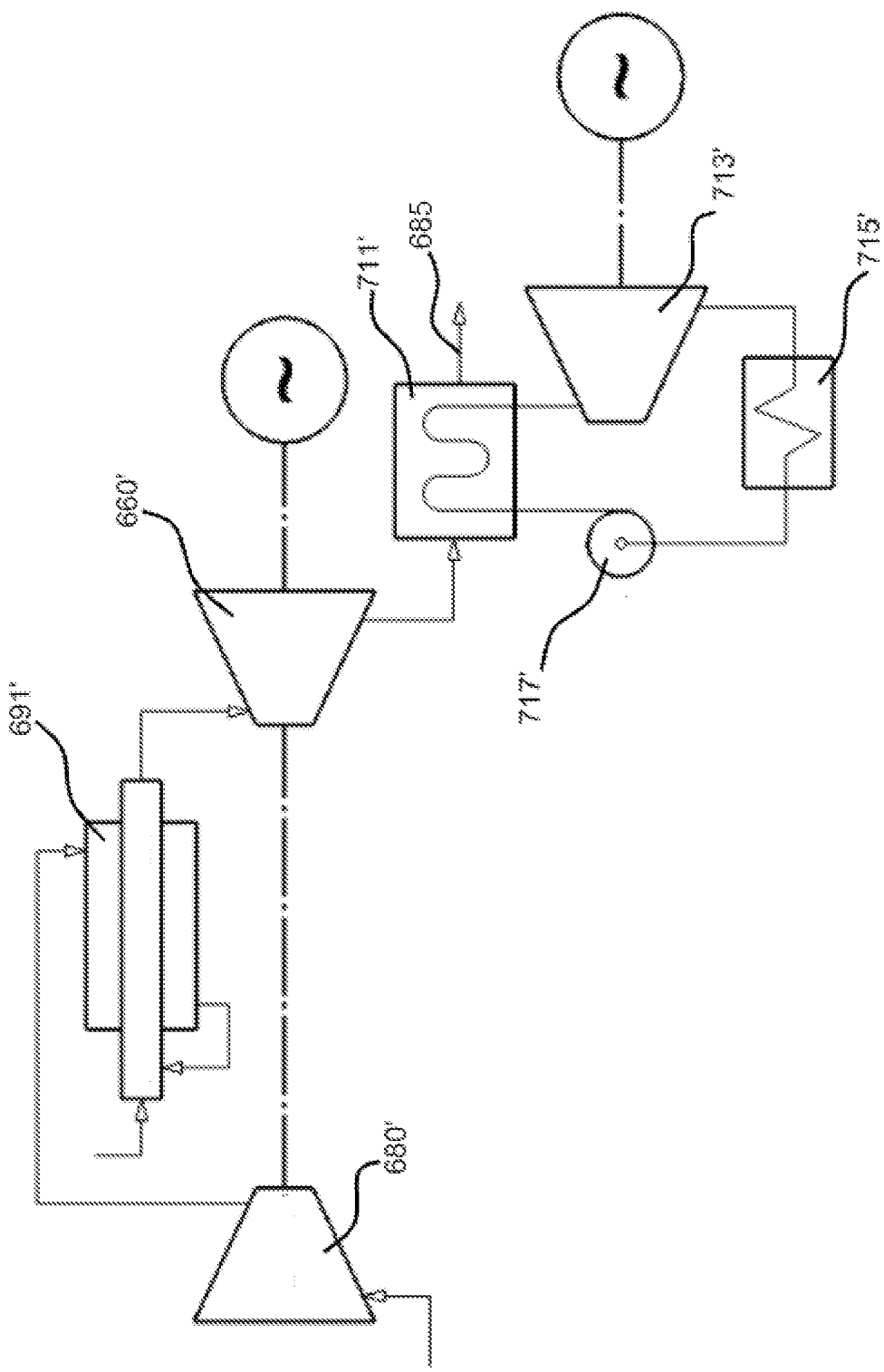
FIG. 60L. shows another system where there is a cycle to extract energy, which is in communication with the second expander.

Now referring to FIGS. 60J, 60K and 60L, there is shown schematic setups for a power generation system. As shown in FIG. 60J, the compressor 680' provides compressed air from the intake 683 to the pre-heater, otherwise referred to as the heat transfer system 691', where this air travels through the gas transfer tubes/or is otherwise transferred as indicated by 625' to the pulse detonation device 600' having a fuel input 686, and more specifically initially to a mixing chamber where the gas is eventually detonated and the pressurized hot products are expelled to an expander or in one form the device to convert energy 660' to an exhaust 685. Now referring to FIG. 60K, there is shown a similar system as described above whereby the gas exiting the device to convert energy 660' is then transferred to a second device to convert energy 660'. The turbine stages can be shifted and be rearranged in order. Now referring to FIG. 60L, there is shown a similar system as described above except downstream of the device to convert energy 660' the exhaust gas travels through a boiler 711', which in turn heats an operating fluid, such as water, which travels through the expander 713' and thereafter travels to the condenser 715', where the operating fluid can then be compressed through the pump 717', where it is transferred back to the boiler 711' for reheating.

Therefore, it can be appreciated that the extremely high energy gases exiting the pulse detonation device 600 can be utilized with a device to convert energy, which in one form is a device having first and second rotors rotating about axes that are offset from collinear and intersecting, forming operating chambers where the expanding gas strikes the operating chambers at a tangential angle to the rotors imparting the torque thereon. It should be noted that the rotors, which are shown in several forms throughout the application, are fairly strong, for example stronger than turbine blades, and are designed to handle the extremely high temperature and pressures of the pulse detonation device for extracting torque therefrom for usable energy. It should be further noted that the pulse detonation system has a fast burn rate in general and therefore is effectively a constant volume burn. Therefore, integrating the device to convert energy, which in one form is the rotary motion positive displacement device, allows for all of the gas to be caught within a chamber (unless a portion of the gases lead elsewhere) for extracting energy therefrom.

Present analysis indicates that there is a potential for greater efficiency of having a positive displacement rotary motion device downstream of the pulse detonation device. It should further be noted that the longitudinal spacing between these Shchelkin spirals (whether there are helical or in other forms) are such that the rebounding reflective shockwaves cause turbulence in the mixture and accelerates the flame propagation velocity.

With regard to the fuel, almost any fuel that can be atomized or pulverized can be potentially utilized with the pulse detonation engine, and as noted above, "dirty fuel," such as fuel having high contaminants of hydrogen sulfide particulate matter, can be utilized as well.

With regard to the embodiment shown in FIGS. 60A-60E, it should be noted that a throttle similar to that shown at 690 in FIG. 60 could be utilized for inputting air into the input port 623' and controlling the amount of air allowed therein. In other words, the air input would be a stoichiometric proper mix with the fuel, and depending upon the turn rate of the device to convert energy 680', this device could in turn rotate a compressor such as that shown in a similar manner in FIG. 60, where the amount of flow rate out of this compressor can be controlled by a throttle.

As the hot air enters the system, the plenum creates a vigorous mixing effect where the fuel is introduced in the axial direction. There is a tremendous amount of mixing (flow is highly turbulent), and the nozzle will slow down the velocity and thereafter the diffuser works in conjunction. The nozzle effectively slows down the flow velocity. The diffuser reduces the flow turbulence for proper detonation. The forward surface of the diffuser operates to deflect any shockwaves returning longitudinally rearwardly. Utilizing the diffuser and the nozzle in the mixing chamber, the detonation shock waves traveling rearward are weakened such that the fuel injector can be at the location near the mixing chamber near the end cap.

One feature of the length of the diffuser is having a quenching effect, where flames trying to act rearwardly could quench flames traveling longitudinally rearwardly, acting as a flame arrestor. At least longer than ½" total, the length of the diffuser can also be contingent upon the percentage of the open region versus the non-open region, as well as the net surface area of the interior surfaces defining the openings. Therefore, in the broader scope, the length of the diffuser could be between ⅛ of an inch to 2 inches depending on factors of the design. Whereas the longer the diffuser the greater the potential pressure losses, slowing down the fluid flow, which could have detrimental effects on the system.

In one form the constricted portion of the nozzle is less than the cross-sectional open area going to the diffuser 631'. In one form, the distance ratios in FIGS. 60A-60B are to scale, and of course can be deviated within readable ranges in one form, say for example plus or minus 20% with regard to the relationship of the components to one another.

Figure 61A:
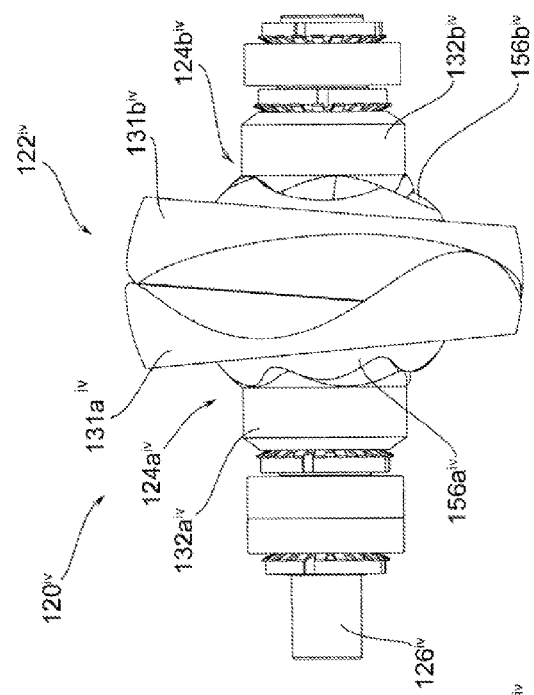
FIG. 61A shows a side view of a device to convert energy with drive rotors having a low ratio and the indexing system have a corresponding low ratio to provide proper rotary conversion between the shaft and the rotors.

As shown in FIG. 61A, there is a device to convert energy $120^{iv}$ where it can be seen that the rotors $122^{iv}$ are comprised of the rotor members $131a^{iv}$ and $131b^{iv}$. In general, the rotors (when not spiraled as described below) have a 3:2 ratio where the rotor $131a^{iv}$ has three lobes and the rotor $131b^{iv}$ has two lobes. Therefore, the rotational difference between these two rotors is a 2:3 ratio where the rotor $131a^{iv}$ would, for example, rotate 240° for every 360° of rotation of rotor $131^{iv}$.

Figure 61B:
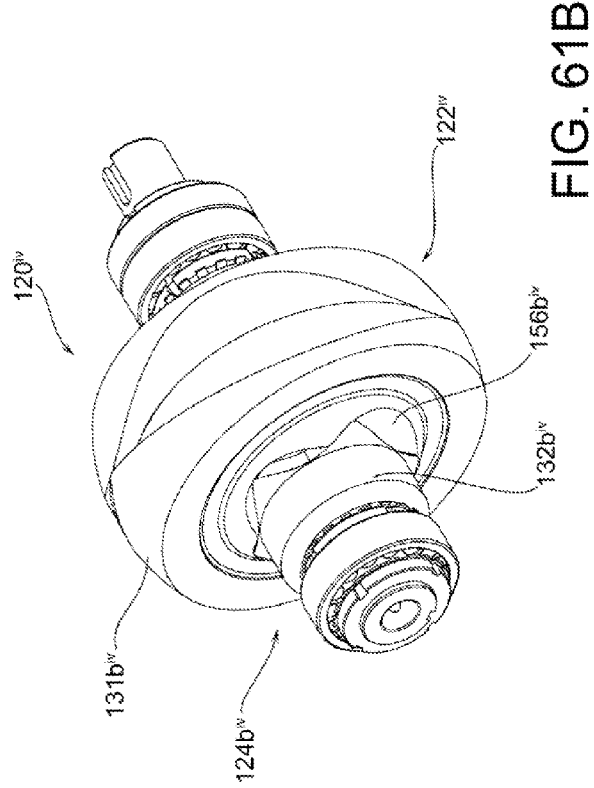
FIG. 61B shows an isometric view and side view of the device to convert energy.

There will now be a discussion of the indexing systems $124a^{iv}$ and $124b^{iv}$. As can be seen in FIG. 61B, there is an isometric view of the device to convert energy $120^{iv}$ which shows the indexing system $124b^{iv}$. In general, this indexing system is arranged in a manner whereby the fixed index rotor $132a^{iv}$ is arranged with five lobes. Further, the index offset surface $156a^{iv}$ is arranged to have six lobes. Therefore, the shaft which is fixedly attached to the fixed index rotor $132a^{iv}$ will rotate 6/5 times the potential speed of the rotor $131a^{iv}$.

Now referring to the indexing system $124b^{iv}$ shown in the right-hand portion of FIG. 61A, it can be appreciated that the index offset surface $156b^{iv}$ has four lobes and the fixed index rotor $132b^{iv}$ has five lobes. Therefore, in this particular example as mentioned above, when the rotor $131b^{iv}$ for example rotates one revolution of 360°, the corresponding opposed rotor $131a^{iv}$ will rotate 240°. Therefore, the shaft, and more particularly the fixed index rotor $132a^{iv}$, will rotate 6/5 of 240°, which in this case equals 188°. Now looking at the right-hand portion of the device $120^{iv}$, as noted above the rotor $131b^{iv}$ for reference purposes has rotated 360°, and hence the fixed index rotor $132b^{iv}$ will rotate 4/5 of 360° which also equals 188°. Of course, because in this embodiment the fixed index rotors $132a^{iv}$ and $132b^{iv}$ are both fixedly attached to the center shaft $126^{iv}$, both of these rotors must rotate the same degree with respect to the drive rotors to avoid any form of gridlock. For rotors composed of gear indexers and wave rotors, below are some possible combinations (not all) of numbers of lobes for gears and rotors listed from left to right. A table of various ratios is now shown below:

| L Gear | L Index | L Rotor | R Rotor | R Index | R Gear |
|---|---|---|---|---|---|
| 3 | 2 | 5 | 6 | 4 | 5 |
| 2 | 1 | 3 | 4 | 2 | 3 |
| 3 | 2 | 8 | 9 | 3 | 4 |
| 4 | 3 | 15 | 16 | 4 | 5 |
| 5 | 4 | 24 | 25 | 5 | 6 |
| 6 | 5 | 35 | 36 | 6 | 7 |
| 6 | 7 | 49 | 48 | 8 | 7 |
| 5 | 6 | 36 | 35 | 7 | 6 |
| 4 | 5 | 25 | 24 | 6 | 5 |
| 3 | 4 | 16 | 15 | 5 | 4 |
| 3 | 2 | 5 | 6 | 4 | 5 |
| 4 | 3 | 9 | 10 | 5 | 6 |
| 5 | 4 | 14 | 15 | 6 | 7 |
| 6 | 5 | 20 | 21 | 7 | 8 |
| 7 | 6 | 27 | 28 | 8 | 9 |
| 3 | 2 | 4 | 5 | 5 | 6 |
| 4 | 3 | 7 | 8 | 6 | 7 |
| 6 | 5 | 15 | 16 | 8 | 9 |
| 7 | 6 | 20 | 21 | 9 | 10 |
| 3 | 4 | 10 | 9 | 6 | 5 |
| 4 | 5 | 15 | 14 | 7 | 6 |
| 5 | 6 | 21 | 20 | 8 | 7 |
| 6 | 7 | 27 | 28 | 9 | 8 |
| 7 | 8 | 35 | 36 | 10 | 9 |
| 3 | 4 | 7 | 6 | 8 | 7 |
| 4 | 5 | 10 | 9 | 9 | 8 |
| 3 | 2 | 1 | 2 | 4 | 3 |
| 5 | 4 | 2 | 3 | 6 | 5 |
| 7 | 6 | 3 | 4 | 8 | 7 |
| 8 | 7 | 35 | 36 | 9 | 10 |
| 9 | 8 | 44 | 45 | 10 | 11 |

The above table is not exhaustive and shows various examples of possible ratios between the mounds of each surface.

Now referring to FIG. 62A, there is an end view of the device to convert energy $120^{iv}$ taken along a view of the shaft $126^{iv}$, thereby showing in detail the indexing system $124a^{iv}$. FIG. 62B shows a sectional view taken from line 62B-62B of FIG. 62A where it can be appreciated that in one form the rotors $122^{iv}$ can simply be regular rotors. The lobes extend radially outwardly from the center, and further can be rotated in a spiral-like manner. The spiral twist is conducted at a ratio similar to the N:N−1 ratio between the two drivers as described further herein. As shown in FIG. 62B, the shaft $126^{iv}$ is provided with an interior passage $212^{iv}$ which in one form can provide a flow path for lubrication. Further, the passage $213^{iv}$ can, for example, provide an interior passageway to enter or exit an operating fluid therethrough. In one form, the fluid is a compressible fluid where the unit to convert energy can operate as an expander or a compressor. A more detailed description of the nature of the compression and expansion of the fluid as it progresses in a spiral-like manner through the labyrinth of opening passages between the drivers is described further herein. There will now be a more detailed discussion of the drivers wherein the rotor $131a^{iv}$ is described in FIGS. 63A-63E and the second rotor $131b^{iv}$ is described in FIGS. 64A-64E.

Referring now to FIGS. 63A-63E, it can be seen that the three-lobe wave rotor is provided with an engagement surface $143^{iv}$. In one form, this engagement surface can be somewhat similar to the engagement surface 143" of FIG. 27 (whereby that particular engagement surface has more lobes). However, instead of having the mountains and valleys extend simply radially to the center of the rotor, the entire rotor surface is rotated in a tangential direction. It can be appreciated that because the two drivers rotate about a common center, every value radius rho, otherwise referred to as "ρ" (the distance from the center of the rotors) which is a value from the center that operates independently from other rho values. Therefore, imagining the pair of drivers as having an infinite number of spherical layers (such as orange peels), any type of modification can be made to different rho values along the engagement surfaces. In this case, the engagement surfaces are rotated in a spiral manner as shown in the isometric view of FIG. 63A.

Now referring to FIG. 63B, the front view of the engagement surface $143^{iv}$ is shown. In general, in this form the amount of rotation of the radially inward portion $219^{iv}$ is rotated two times counterclockwise with respect to the radially outward portion $221^{iv}$. Therefore, the various spiral lines, for example, can indicate the crest or the longitudinal forward portion of the engagement surfaces.

As shown in FIG. 63C, it can be appreciated that because there are essentially three crests corresponding to the three lobes with three valleys interposed therebetween, and further because the rotation of the lobes is twice counterclockwise from the radial outward portion $221^{iv}$ to the radial inward portion $219^{iv}$, there are shown six crests in the upper and lower region of the rotor $131a^{iv}$ as shown in FIG. 63C. FIGS. 63D and 63E show rearward and isometric views respectively, wherein the index offset surface $156a^{iv}$ is shown having six lobes.

Now referring to the other power rotor $131b^{iv}$ which is shown in FIGS. 64A-64E, it can be appreciated that this mating rotor is provided with two lobes in the engagement surface $142^{iv}$. However, referring now to FIG. 64B it can be appreciated that the two lobes which are diametrically opposed regions are shown by way of having the crest portions shown in a spiral-like design. In order for the drive rotors $122^{iv}$ (shown mating in FIGS. 61A and 61B) to operate in a spiral-like design, the rotor with one fewer lobes must rotate one additional rotation from the radially outward portion $225^{iv}$ to the radially inward portion $223^{iv}$. In other words, if you trace one of the lobe's crests at the very top or bottom in a spiral clockwise manner, you can see it makes approximately three rotations. Because of the rotational variances between the rotors $131a^{iv}$ and $131b^{iv}$, the rotor with the fewer number of lobes must rotate one additional complete rotation. Further, as shown in FIG. 64C, it can be seen that on each of the upper and lower portions of the rotor there are six crests having the same number of crests as shown in FIG. 63C. Finally, as shown in FIGS. 64D and 64E, there is an index offset surface $156b^{iv}$ having four lobes (also see FIG. 61A). The offset surface $156d^{iv}$, for example, is operatively configured to engage the fixed index rotor $132b^{iv}$ as shown in FIGS. 65 and 66. In general, the fixed rotor $132^{iv}$ as shown in these figures has five lobes positioned on the surface $198^{iv}$. As further shown in these figures, the interior surface $237^{iv}$ can be stepped down in the longitudinally forward direction and further keyed with the notches $239^{iv}$ to fixedly attach the fixed index rotor $132^{iv}$ to the shaft to move integrally therewith.

Now referring to FIGS. 64F-64J, there is shown another embodiment of a device to convert energy. This embodiment in some regards operates in a manner as a progressive cavity pump. In one form, the inner or outer rotors $131c^{IV}$ and $133d^{IV}$ can be made out of a variety of materials, where in one form the inner member could be a metal and the outer material could be a rubber-based material. One way of utilizing the interior rotor is as a spiral-shaped cutter, which can create the opposite surface of the outer rotor.

In one form there is a 6 degree offset angle which is the A angle with a 2° alpha angle. Further, the rotation is a function of the number of lobes where in one form there is a 2 to 3 rotation ratio. The two rotors can be indexing surfaces in one form, or the cavities can be a progressive cavity-type pump where the chamber volume reduces in volume. For example, in a similar manner as FIGS. 68A-D, the embodiment as shown in FIGS. 64F-J can be employed for an indexing surface, as well as a device to convert energy, such as a compressor, pump or expander.

As shown in FIG. 64F, the inner rotor $131c^{IV}$ is positioned within the outer rotor $133d^{IV}$. As shown in FIG. 64G, the outer rotor is comprised of a plurality of mounds $159^{IV}$ and valleys $157^{IV}$. In a like manner, the inner rotor $131c^{IV}$, as shown in FIG. 64H, can rotate within the outer rotor $133d^{IV}$, where as further shown in FIG. 64J, the inner rotor rotates about the axis $178^{IV}$ and the outer rotor rotates about the axis $180^{IV}$, where the angle between these two axes is the off angle, which is shown at 2° in FIG. 64J.

Figure 69A:
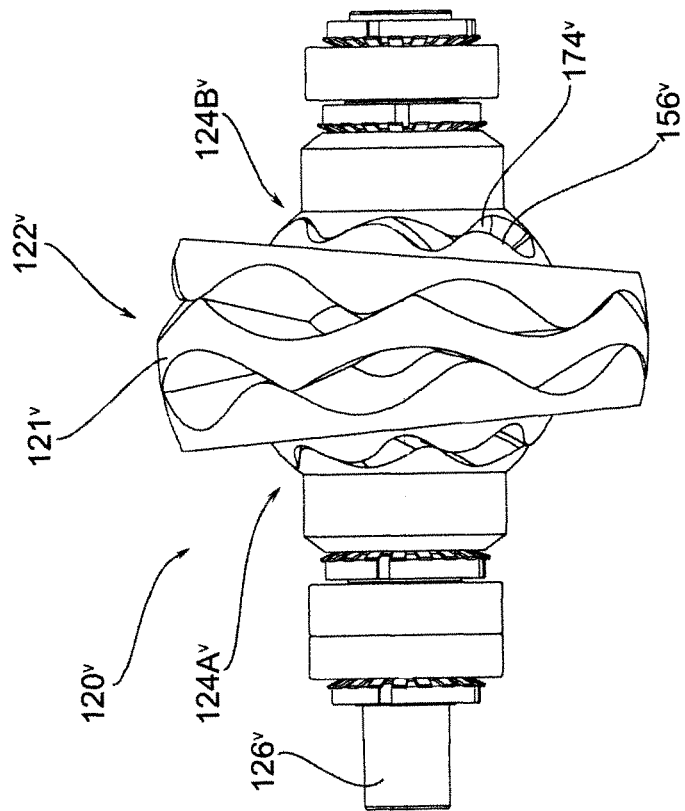
FIG. 69A shows a side view of a rotor assembly having the spiral indexing system as well as an interposed rotor between the main drive rotors.
Figure 69B:
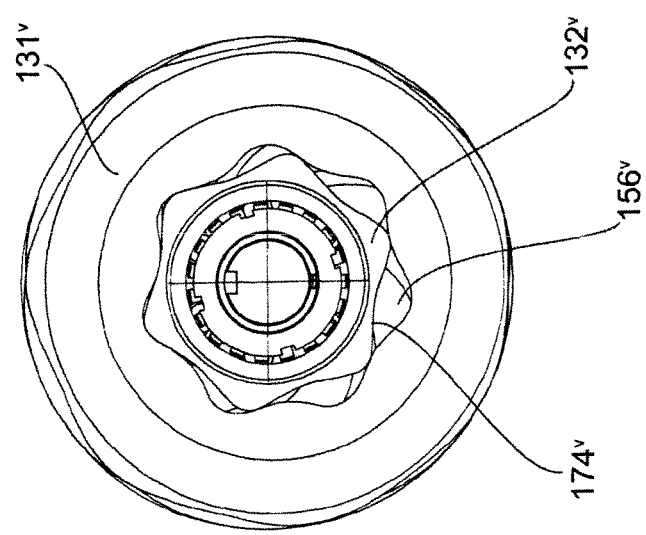
FIG. 69B is a rearward view of the spiral indexing system showing the spiral radial index offset surface of the main drive rotor.

Referring now to FIGS. 67A-67D, there is shown a rotor member $131^v$ having an engagement surface $141^v$ that can, for example, be any type of operational surface to displace fluid which in one form is a positive displacement engagement surface or could, in the broader scope, be a statistical type of surface or combination thereof. An interesting element of the drive rotor $131^v$ is positioned in the longitudinally rearward portion. As shown in FIG. 67B, there is an index offset surface $156^v$ which is a wave-type design, but as shown in FIG. 67C, the index offset surface $156^v$ is further a spiral-type design. FIG. 67D shows an isometric view generally illustrating the principles of the longitudinally rearward portions $159^v$, otherwise referred to as the mounds, and the longitudinally forward portions $157^v$, otherwise referred to as the valleys. Now referring to FIGS. 68A-68D, there is shown the fixed indexing rotor $132^v$ where it can be appreciated that the indexer surface $174^v$ has a corresponding spiral-like engagement to the index offset surface $156^v$ as shown in FIGS. 67A-67D. As shown in FIGS. 69A-69B, there is an overall assembly of a device to convert energy $120^v$ where it can be appreciated that the drivers $122^v$ are provided, and in one form there is (for example) an interposed rotor $121^v$. It can also be appreciated that the indexing systems $124a^v$ and $124b^v$ are each provided wherein the components as shown in FIGS. 67A-68D are utilized. Referring back to FIG. 68D, it can be appreciated in the cross-sectional view that the interior surface $237^v$ can be provided with the slots $239^v$ which can be keyed to the central shaft $126^v$ as shown in FIG. 69A. FIG. 69B shows an end view showing the drive rotor $131^v$ operating in conjunction with the fixed indexing rotor $132^v$ where it can be appreciated that there is a rotational ratio between these two elements.

There are various potential benefits of having the spirals designed for the main rotors. A partial spiral could improve the fluid dynamics near the outside diameter, on both the inlet and outlet ports (for example, by creating a tangential flow element to reduce cavitation). A further benefit could be that the centrifugal force on the fluid could create a tangential force on the rotors, helping the efficiency. Each side could pump a separate fluid with proper porting and further, the indexers could be ported to pump fluid or otherwise have a fluid (compressible or incompressible) could pass therethrough.

Present analysis indicates that straight-cut wave lobes have a potential to "slap" the fluid, or create long strips of trapped volume that could result in a knocking effect in certain circumstances. Adding a partial spiral could potentially eliminate this potential knocking or slapping of the fluid contained in the lobes, because the spiral sealing inherently squeezes trapped fluid radially outward (or inward in other embodiments) instead of slapping a long strip of the fluid instantaneously. Main rotors may not be indexed with a through shaft, and when rotors must contact (such as with a power and slave rotor), the spiral can aid to dampen the contact between rotors much like a helical bevel gear, where the location of contact progressively moves from the inside of the lobes to the outside (or visa versa), so as to eliminate the "slapping" effect and lead to a quieter and smoother-running operation. With regard to the spiral type indexers as shown in FIGS. 67A-69B, there are similar benefits as recited above, namely that the partial spiral added to the indexers creates less noise, and a smoother-running operation, and potentially improves wear life due to the more gradual "impacts" between the "gear teeth" instead of abrupt impacts of contact. This dampening effect can be potentially much more noticeable when the indexers spin at higher rotational speeds. Further, the spiral creates longer contact lines compared to straight-cut lobes. These longer contact lines improve thrust load capacity of the indexer. The spiral indexer may run smoother also because of the fact it does not "trap air" along a thin line (such as in the straight cut lobes); instead, with the spiral, air is squeezed gradually from the entrapped double-sealed locations (double-sealed implies a location where a tip seal and a gearing seal come together, squeezing a line of fluid). Now in a spiral design embodiment, present analysis indicates that the above-mentioned trapping does not occur, but rather, a gradual squeezing radially occurs. The partial spiral gears should operate more smoothly and more efficiently as well because of fewer mechanical losses due to "compression" of gas in trapped locations. With regard to oil-lubricated indexer gear teeth, the spiral can actually have a radial pumping effect. For example, if there is oil or lubricant inside near the shaft, the oil may become trapped in small pockets (resulting from the spiral gearing geometry, "double sealing") and then be squeezed to the outside of the indexer. The opposite effect may also occur depending on how the indexer is designed (or oriented relative to the alpha angle) and the direction of rotation, so that if the indexer is sitting in an oil pan, it could potentially "suck" oil into the indexer radially inward from the oil pan by this squeezing effect of the spiral and double-sealing behavior of the tip and gearing seals between indexer lobes. The above mentioned pumping behavior is also beneficial for cooling, as not only does it pump oil for lubrication, but it could be useful for self cooling, if the indexers heat up from friction. Further, the dynamics of the spiral with a lubricant could potentially help prevent cavitation of the lubricant (e.g. oil). As shown in the FIGS. 67A-69B, the spiral as it stands now is a simple linear spiral or Archimedean spiral, inscribed on a conical surface that corresponds to the offset angle "a". Different spirals could also be used. For analysis purposes assume that a straight-cut indexer gear may be better at transmitting torque as compared to a spiral indexer, simply because the contact loads are transmitted more in the "normal" direction. If this is the case, it may be desirable to have a spiral that changes such that it has more of a spiral near the ball, and less of a spiral tilt towards the outside of the indexer, where there is more material to resist stresses.

Another reason why a different style of spiral might be more desirable would relate to the pumping of oil. For example, the centrifugal load on the oil fluid will be greater near the exterior of the indexer lobes than near the interior. Therefore it might be desirable to have a more aggressive spiral near the exterior of the indexer, if the indexer was sitting in an oil pan, for example, to better pump the oil from the exterior to the interior of the indexer gear pair, but have a less aggressive (lower radial angle) spiral near the interior, as the centrifugal forces on the oil are less, and also for potentially better torque transfer in that area. It should be further noted that the less aggressive spiral results in a higher radial trapped flow speed. Therefore, having an aggressive spiral near the outside diameter and a less aggressive spiral near the inside of the indexer in an oil pan, for example, could accelerate the fluid from outside to inside, and this might create a better squirting effect of the oil, which would be useful if squirting of the oil inward were desirable (for example, if the design required the squirt of oil at seals near the shaft). The same could be said for cooling, as perhaps squirting the oil at seals near the shaft could be beneficial for cooling those seals (this could be another argument for a regular linear spiral as well).

As shown in FIGS. 70A-70D, there is another embodiment of an indexer housing $132^{vi}$. In general, as can be seen in FIGS. 70A and 70C, there is an indexer surface $174^{vi}$ that is operatively configured to correlate with an index offset surface of a drive rotor in a similar manner as described above (where in this form the index surface is of a spiral-type design). As shown in FIGS. 70A-70 D. there is an index surface adjustment system $241^{vi}$ which in one form comprises a base ring $243^{vi}$ which in one form is operatively configured to be rigidly attached to the through shaft. Notches operating as key locations $239^{vi}$ can be employed to rotationally lock the base ring $243^{vi}$ to the central shaft. As shown in the exploded view in FIG. 70B, there is a plurality of adjustment members $245^{vi}$ and in one form receiving bases $247^{vi}$. As shown in FIG. 70D, it can be appreciated that in one form the adjustment members $245^{vi}$ are configured to oppose one another, as shown in the upper portion of FIG. 70D, where in one form three pairs of such members can be utilized to reposition the outer ring $249^{vi}$ with respect to the base ring $243^{vi}$. In one form the receiving bases $247^{vi}$ are nested therein at receiving locations along the base ring $243^{vi}$ and the adjustment members which, for example, could be cap screws are threadedly engaged to the outer ring $249^{vi}$ and otherwise accessible from the exterior for minute adjustments of the outer ring $249^{vi}$ with respect to the center shaft. Therefore, the indexer surface adjustment system $241^{vi}$ provides minute adjustment of the indexer surface $174^{vi}$, which in turn will rotate the associated rotor member so the two rotor members are rotationally adjusted with respect to one another for a prescribed clearance gap therebetween, or otherwise to prescribe rotational distance therebetween (in the event of an interference fit: for example, the two rotors would be equally spaced between leading and trailing surfaces).

Now referring to FIG. 71, a device to convert energy $120^{vii}$ is shown. The rotor members $123^{vii}$ and $125^{vii}$ are shown and are operatively configured to rotate about the shaft $126^{vii}$ in a manner as described above. The housing $119^{vii}$ is generally shown in a cross-sectional view. FIG. 71 shows a fairly complete housing assembly with numerous components which, in some forms, could be combined to form unitary monolithic structures. However, the embodiment as shown in FIG. 71 is only one form of constructing a housing, which will be generally described below. The numeral designations describing the housing (not including the "$^{vii}$" designation) will not necessarily correlate with similar numeral designations in the above disclosure. Starting in the right-hand portion of FIG. 71, there is a small end cap $130^{vii}$ which is attached to the large end cap $132^{vii}$. A bearing member $134^{vii}$ is provided which in one form is a needle bearing which is housed in the bearing housing $136^{vii}$, which is otherwise referred to as the needle-bearing housing. There is further provided a seal plate $138^{vii}$ which is operatively configured to engage the longitudinally rearward surface of rotor $123^{vii}$, and further a seal plate $140^{vii}$ in a like manner configured to engage the longitudinally rearward surface of the rotor $125^{vii}$. A minimum volume seal block $142^{vii}$ is provided in the lower region of the rotors, which one form is positioned near the minimum volume of the chambers formed between the rotors $123^{vii}$ and $125^{vii}$. Positioned at an opposing region of the rotor assembly is a maximum volume seal block $144^{vii}$. The indexer spiral gear $146^{vii}$ is provided where a clocker core $148^{vii}$ is positioned radially inwardly therefrom. The key $150^{vii}$ is configured to rotatably mount the clocker core $148^{vii}$ to the shaft $126^{vii}$. A large end power cap $152^{vii}$ is provided and is configured to mount to the small end power cap $154^{vii}$. A shaft seal $156^{vii}$ is provided to engage the shaft $126^{vii}$. It should be noted that the clock core $148^{vii}$ in one form is similar to the base ring $243^{vi}$ as shown in FIGS. 70A and 70B. In one form the blocks $142^{vii}$ and $144^{vii}$ would provide ports for allowing a fluid to enter and exit the various chambers from between the rotors $123^{vii}$ and $125^{vii}$.

As shown in FIG. 72, there is an isometric view of a device to convert energy $120^{viii}$. In general, this device has an inlet $170^{viii}$ and an outlet $172^{viii}$. The device $120^{viii}$ is provided with a housing $119^{viii}$, and as shown in FIG. 73 it can be seen that the rotor assembly $122^{viii}$ is provided and the input ports $174^{viii}$ are in communication with the inlets $170^{viii}$. In a like manner, the exit port $176^{viii}$ is further in communication with the outlet $172^{viii}$. In one form, the inlet and outlet ports are defined by the minimum volume seal block $180^{viii}$ and maximum volume seal block $182^{viii}$, whereby the radial widths of the seal blocks can be arranged so as to provide a sealing connection of the outer surface of the rotor assembly $122^{viii}$ between the exit and entrance ports $176^{viii}$ and $174^{viii}$. Further, in other forms these seal blocks can be adjustable in, for example, an arrangement with a compressible fluid to adjust the sealed volume timing for either an expanding or compressing gas dependent upon the arrangement of the device to convert energy.

Further shown in FIG. 73 is a proximity probe $186^{viii}$ which is usually provided for testing purposes or can be utilized in certain applications requiring monitoring of the internal portion of the housing $119^{viii}$.

As shown in FIGS. 74A-74E, there is another embodiment of an indexing system $124^{ix}$. In general, as shown in FIG. 74A, there is a rotor assembly $122^{ix}$ which consists of a pair of drivers. The indexing housing $132^{ix}$ is provided which is configured to be fixedly attached to the shaft $126^{ix}$. As shown in FIG. 74B, there is shown the indexer housing $132^{ix}$ where a plurality of indexer extensions $174^{ix}$ are provided. Now referring to FIG. 74C, the indexer extensions $174^{ix}$ are shown in an exploded view thereby separated from the indexer housing $132^{ix}$ where they are operatively configured to be fit within the indexer mount locations $133^{ix}$. In one form, the indexer extensions $174^{ix}$ can simply be fitted to be within the indexer mount locations $133^{ix}$ and merely placed therein, and as shown in FIG. 74A are fixedly placed by way of having a slight retaining surface $135^{ix}$.

FIG. 74D shows a rear view of the indexer housing $132^{ix}$, where as further shown in FIG. 74D, the cross-sectional view provides a view of upper and lower indexer mount locations $133^{ix}$. As shown in these figures, the individual indexer extensions can be held therewithin by way of the retaining surfaces $135^{ix}$. The openings $137^{ix}$ can be provided for allowing a lubricant to pass therethrough.

Now referring to FIG. 75, there is shown yet another example of a device to convert energy $120^x$. The device to convert energy $120^x$ is comprised of drivers $130A^x$ and $130B^x$ that are designed in a manner so as to provide inserts for the engagement surfaces of the lobes as described further herein. A second notable element in the device to convert energy $120^x$ is the indexing system $124^x$ which is comprised in a matter with utilizing ball bearing members that are housed within a prescribed indexing surface described further herein. Therefore, there will first be a discussion of the pair of rotors $122^x$ and more particularly the nature of having rotor inserts comprise the pair of rotors and secondly there will be a discussion of the indexing system $124^x$ related to utilizing a movable indexer $175^x$ which in one form is a spherical member such as a ball bearing.

Referring now to FIG. 76 there is a drive rotor $130A^x$ which in this form is an assembly comprising a rotor-base member $147^x$ and a plurality of rotor inserts $149^x$.

As shown in FIG. 77 there is the rotor-based member $147^x$ provided with an insert attachment location $151^x$. In one form, the insert attachment location $151^x$ comprise an overhang extension $153^x$ that is configured to engage the retention slot $155^x$ as shown in FIG. 78. This figure shows an example of a rotor insert $149^x$ which provides an attachment base $157^x$. The lobes $161^x$ are designed to provide the surfaces $142^x$ in a similar manner as described above (for example, by way of the method as initially taught referring to FIGS. 1 through 4, as well as the example shown in FIGS. 5 through 12 and further discussed by the mathematics above).

FIG. 76 shows the rotor $130A^x$ in an assembled state. The plurality of rotor inserts $149^x$ are attached to the insert attachment locations $151^x$ of the rotor-base member $147^x$. Of course, the rotor can be an assembly in a variety of forms other than what is shown in FIG. 76. One advantage of having an assembly comprising a rotor versus a unitary structure is the rotor inserts can be comprised of different materials than the rotor-based member. For example, the rotor inserts may be cast from a harder material or even in some cases a softer material. At any rate, the properties of the rotor-base member $147^x$ may be different than the required properties of the rotor inserts $149^x$.

Figure 80:
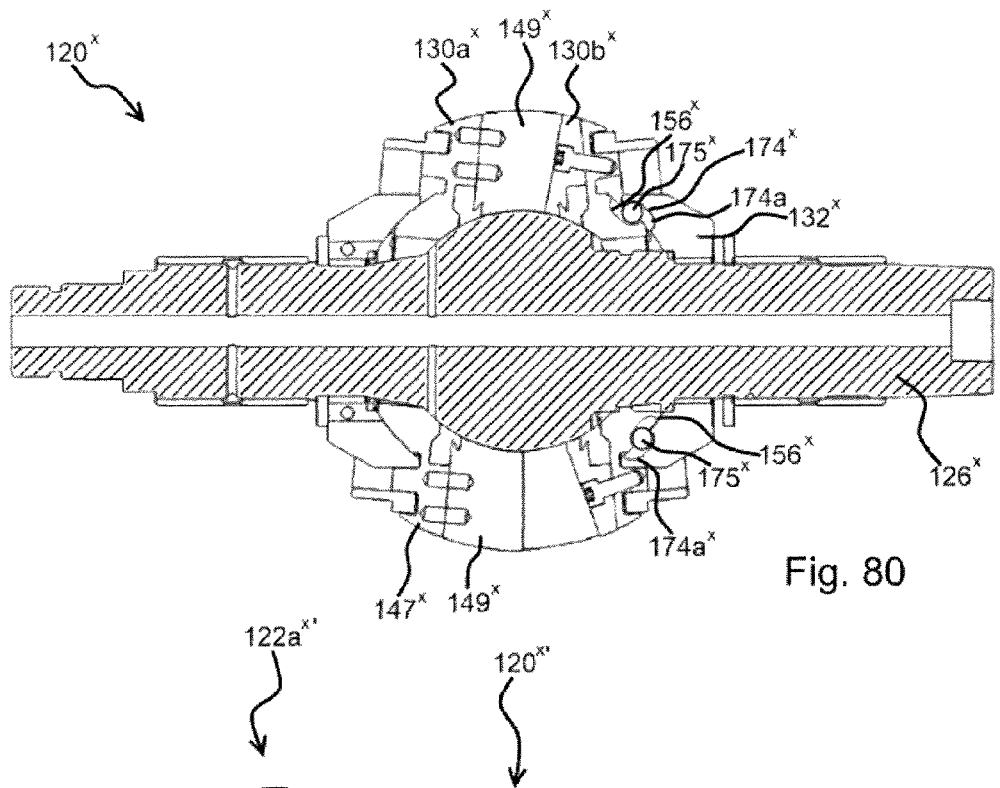
FIG. 80 shows a side sectional view of the device in FIGS. 76-79.

Still referring to FIG. 76 there will now be a discussion of the indexing system $124^x$. As shown in the longitudinally rearward view of the drive rotor $130a^x$ in FIG. 76, there is a plurality of index offset surfaces $156^x$. These offset surfaces are operatively configured to engage a corresponding housing indexer surface $174A^x$ as shown in FIG. 79. Referring back up to FIGS. 18 and 19, it can be seen that there is an indexer housing 132 having a plurality of indexing surfaces 174 attached thereto. Now referring to FIG. 79, there can be seen an indexer $132^x$ where the indexer surfaces $174A^x$ cooperates with a ball bearing that is interposed between the surfaces $174A^x$ and the indexer offset surface $156^x$ to provide an indexing system. Referring now to FIG. 80, there is shown a device to convert energy $120^x$ where it can be seen that the drive rotors $130A^x$ and $130B^x$ are in engagement with one another where it can further be seen that there are rotor inserts $149^x$ that are attached to a rotor-base member $147^x$. Looking now at the right-hand portion of FIG. 80 there can be seen on the drive rotor $130B^x$ an index offset surface $156^x$ and a spherical member $175^x$ which provides an external indexing surface $174^x$ which cooperates with the housing indexer surface $174A^x$ of the indexer housing $132^x$. It can be appreciated that the lower spherical member $175^x$ in the lower right-hand portion cooperates with the surfaces $156^x$ and $174^x$ in the lower right-hand portion in a similar manner as above so as to properly index the rotors and maintain them in a prescribed rotational location with respect to the shaft $126^x$.

Figure 81:
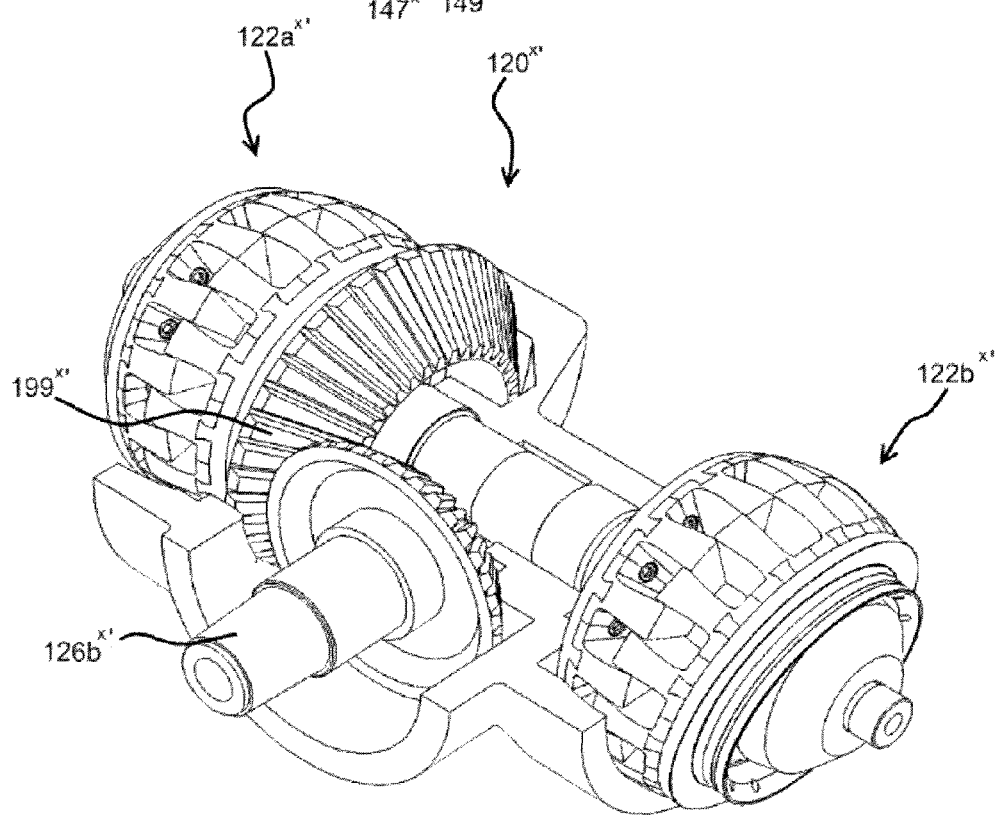
FIG. 81 shows another device to convert energy.
Figure 82:
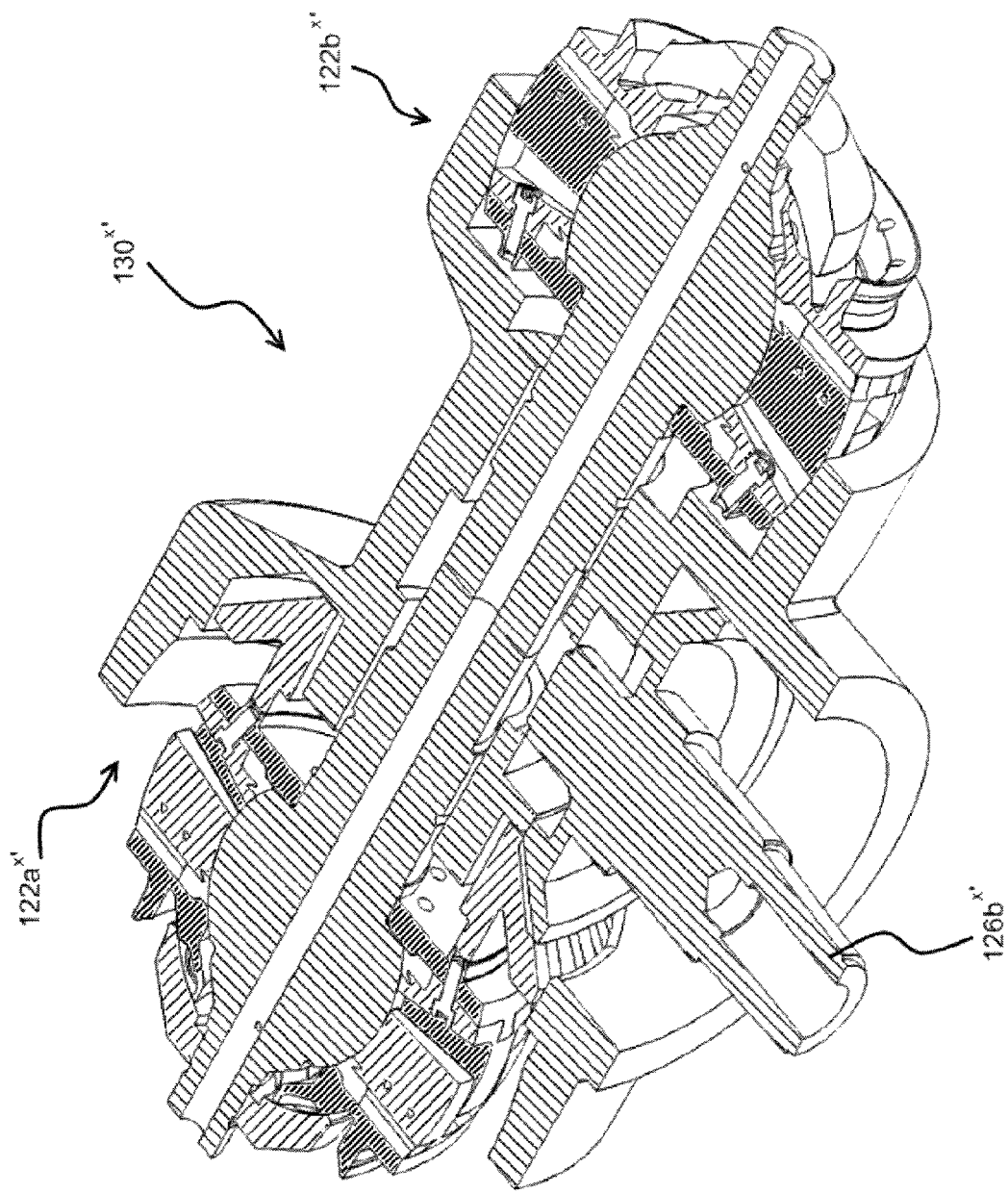
FIG. 82 shows another embodiment of this device to convert energy, as shown in FIG. 81.

Referring now to FIG. 81, there is shown another embodiment where the device to convert energy $120^{xi}$ is shown. In general, this device utilizes first and second rotor assemblies' $122A^{xi}$ and $122B^{xi}$ where the energy from these rotor assemblies can be converted to a central shaft $126B^{xi}$ by way of the bevel gear surfaces $199^{xi}$.

As discussed in FIG. 1 and FIG. 39 there is discussed a foundation for formulating the base curves for both oval and wave-shape geometries respectively. These equations are used to derive the base curves for both the oval-ball bearing and the wave-ball bearing indexer surface geometries, as well as for the base curves for the teardrop base curve and one of the two rotors of a gear rotor pair of indexing gears, or wave rotors. Parameter t represents the rotational angle of one of the rotors about its axis of rotation, in radians. Parameter p represents the alpha angle between the rotational axis of one component with respect to another component (note that a group of ball bearings could be considered one component for mathematical formulation of surfaces). Angle a is the angle of offset of the cutter center vector with respect to the rotational axis of that cutter and is shown in FIGS. 1 and 39. Parameter B is a speed ratio multiplier, for the relative speed ratio between one moving object and the other meshing together. Note that a set of ball bearings could be considered a moving object with a speed ratio for the net rotation of the group of ball bearings about the axis of net rotation of the group. For oval indexing surfaces the speed ratio B=1, and B≠1 for wave geometries, typically wave geometries are generated when B=1+1/N or B=1−1/N where N is the number of equally spaced lobes, equally spaced indexing pins, or number of equally spaced ball bearings for example. Parameter R is the radius of the imaginary sphere at which the base curve lies on. The Cartesian coordinate system is centered at the center of the sphere of the CvR assembly.

Let vector V represent the vector in X Y Z coordinates that extends from the origin point, to point 330 shown in FIG. 39.

$$V = \begin{bmatrix} R\sin(a-p) \\ 0 \\ R\cos(a-p) \end{bmatrix}$$

a series of 4 vector rotations are applied: First, perform a vector rotation of V by +alpha about axis Y. Rotate the resulting vector by +B*t about the Z axis. Then rotate the resulting vector by −p about the Y axis. Rotate the resulting vector by −t about the Z axis, the result is the base curve C, otherwise known as the center of cutter path. Below is the matrix multiplication with the four rotation matrices written out in full:

$$C = \begin{bmatrix} \cos(-t) & -\sin(-t) & 0 \\ \sin(-t) & \cos(-t) & 0 \\ 0 & 0 & 1 \end{bmatrix} \begin{bmatrix} \cos(-p) & 0 & \sin(-p) \\ 0 & 1 & 0 \\ -\sin(-p) & 0 & \cos(-p) \end{bmatrix}$$

$$\begin{bmatrix} \cos(Bt) & -\sin(Bt) & 0 \\ \sin(Bt) & \cos(Bt) & 0 \\ 0 & 0 & 1 \end{bmatrix} \begin{bmatrix} \cos(p) & 0 & \sin(p) \\ 0 & 1 & 0 \\ -\sin(p) & 0 & \cos(p) \end{bmatrix} \begin{bmatrix} R\sin(a-p) \\ 0 \\ R\cos(a-p) \end{bmatrix}$$

After multiplication and simplification, the parametric equation in Cartesian coordinates for the base curve is therefore:

$$C = \begin{bmatrix} X(t) \\ Y(t) \\ Z(t) \end{bmatrix} = \begin{bmatrix} R(\cos(t)(\cos(p)\cos(Bt)\sin(a) - \cos(a)\sin(p)) + \\ \sin(t)\sin(Bt)\sin(a)) \\ R(-\sin(t)(\cos(p)\cos(Bt)\sin(a) - \cos(a)\sin(p)) + \\ \cos(t)\sin(Bt)\sin(a)) \\ R(\sin(p)\cos(Bt)\sin(a) + \cos(a)\cos(p)) \end{bmatrix}$$

Examples of base curves can be seen in FIGS. 83 and 84, items a2 and b2 for a wave and an oval indexing design respectively, shown with alpha angle of p=2.5 degrees and a=45 degrees.

The ball bearing indexer with oval races is similar to the regular oval indexers, except that instead of having a pin-in-oval, where the pins are attached to one part (such as attached to a part on the through shaft) and the ovals on the rotor, the ball bearing version now has a series of ovals on the rotor, and ovals on the part fixed to the through-shaft. Between the two series of ovals are ball bearings, and the oval surfaces act similarly as races on a ball bearing, as primarily rolling contact occurs between the balls and the oval shaped grooves.

The disclosure to this point has been deriving machined surfaces created by either radially conical, or constant radius rabbit ears as "cutters" that travel along a "base curve" C described in the mathematics above. For the ball bearing oval indexers, the same base curve C can be used as cutter paths using parameter B=1, an example of an oval indexing base curve is item b2 in FIG. 84, but instead of using cones or cylinders or arbitrary radial, spiral or arbitrary shapes as cutters, we instead use a sphere as the cutter such as item b3 in FIG. 84, where the sphere is centered on the base curve b2 and mathematically swept along b2, producing a toroidal volume b4 illustrated in FIG. 84 as an example, with arbitrarily chosen 6 indexing balls in this figure. The exterior of this volume is the surface of interest for producing the bearing races of the ball bearing indexing surfaces to be machined. This single toroidal surface describes the geometry that will be used for the race surfaces for two different machine components. This toroidal surface can be thought of as being split into two surfaces to create the two races. However, using 100% of the resulting surface is not required for devices to function, as the ball will still roll inside a pair of partial surfaces depending on how the surfaces are trimmed—that is, the user has some control over how to trim the toroidal surfaces.

The derivation of the base curves C of the oval are described above. There is an "alpha angle" formed between a rotor and the through-shaft's central axis of rotation. There are twice as many oval races as there are ball bearings. The expander engine in FIGS. 60A-60E is shown with the oval indexers, it has an alpha angle of 10°. This particular device is symmetric with two indexing assemblies identical on each side, and a through shaft. In this example a set of oval races for one side of the device could be created with the following parameters in the base curve equations C: a=45°, p=2.5°, B=1. There is an alpha angle of 2.5° made between a central rotational axis of a rotor and the axis of rotation of the assembly of balls (that lie on a constant plane in a circle). The group of balls rotate about an axis that is an alpha angle of 2.5° from the axis of rotation of the through shaft. The total angle is thus 5° for this indexing assembly with the balls. Notice that the ball bearings all lie in a circle, spaced at the same spacing as the ovals, and lie in a plane mid-way between the two sets of oval surfaces.

To create a race on the back of a rotor, the base curve is placed onto a spherical radius R that would usually be in the preferred embodiment be at the center radius of the clearance gap between the spherical ball and spherical socket surfaces of the back of the rotor and the indexer attached to the shaft respectively (note" that surfaces on sphere of ball and socket of indexer may not necessarily be spheres). Then there is a "cut" into (more toward the center of the rotor pair) the spherical surface of the back of the rotor to create a groove, using a spherical cutter equal to the size of the ball bearing ideally. An example of the material removed to create this grove is illustrated in FIG. 84, item b4 as the volume being removed by cutter ball b3 moving along base curve path b2. The cutter need not be exactly the same diameter of the ball, to create either some preload or some clearance gap for the ball bearings. To form the toroidal protruded cut on the inner socket of the indexer fixed to the through shaft we remove material also using a spherical cutter that follows the base curve path, again the coordinate system of the base curve path centered at the center of the rotor pair device sphere center and such that the Z axis is aligned with the rotational axis of the part.

The ball bearing indexer with wave races is similar to the gear pair indexers, except that instead of two gear-like pairs meshing together, there is a series of ball bearings between two wave surfaces that are trochoidally toroidal in shape.

For the ball bearing indexer base curves, we only require the equation C derived above both races, this time the two races will have a difference in number of lobes of 2 instead of 1 as though in a gear pair. FIG. 83 illustrates the formulation of the volume that is to be removed, to form a race. The Cartesian coordinate system a1 in FIG. 83 represents the origin of the base curve equation C, and also represents the location of the origin of the center of the CvR device. The Z axis represents the axis of rotation of the component that will have the ball bearing race machined into it. In FIG. 83 we have chosen parameters p=2.5 deg, a=−45 deg, N=9, with ⅜" diameter ball bearings, one ball bearing could be imagined as the cutter a3, and the base curve a2 is to lie at a radius of R=1.01" in this case. In this case we have chosen B=1+1/9 as the speed ratio, that results in 10 lobes. If we had chosen a speed ratio of B=1−1/9, we would result in a trochoidal toroid with 8 lobes, and we could use that surface for the other race on the other assembly indexing component.

Figure 85:
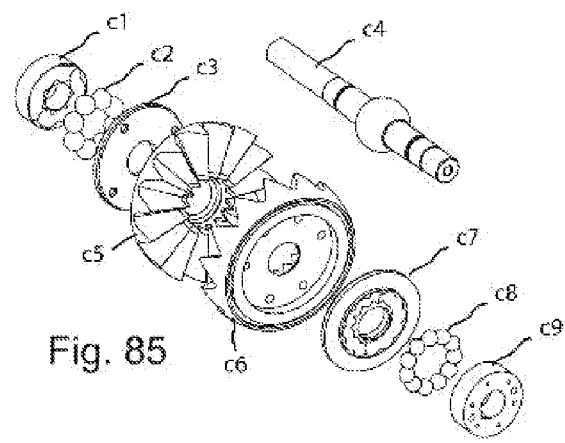
Figure 86:
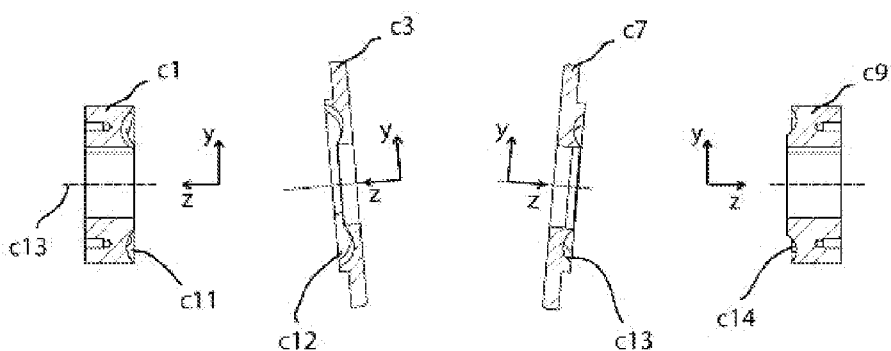
Figure 87:
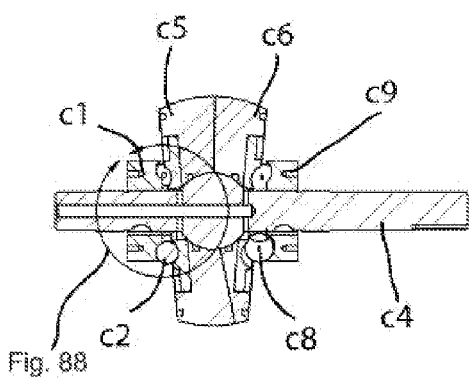

As an example, refer to the 11 ball bearings c8 shown in FIG. 85, this particular assembly has a total alpha angle of 10° between the main central rotors c5 and c6 (see also FIGS. 86-89). For the indexing trochoidal toroid wave race surfaces c13 and c14 in FIG. 86, the parameters a=45°, p=2.5°, N=11 are selected to show one example. For the wave ball bearing indexers however, we do not utilize the same toroidal volume as we did with the oval ball bearing indexers, instead we have two different surfaces for the two races. For the race c13 fixed to the main rotor c6, we have chosen parameter B=1+1/11 resulting in a 12-bump trochoidal toroid cutout race surface c13, ensuring we line up the center of the Cartesian coordinate system of the base curve C with the center of the coordinate system of item c7 in FIG. 86, and also that the central coordinate system of item c7 is lined up with the center coordinate system c10 of the Rotor pair assembly. To ensure proper position of the base curve on c7, we ensure the Z axis of the base curve C is lined up with the Z axis of the part c7, the Z axis being the axis of rotation of the part. For the race c14 on part c9 in FIG. 86, we have chosen parameter B=1−1/11, resulting in a 10-bump wave trochoidal toroid race c14, also using equation C and ensuring Z axis lines up this time with the axis of rotation of the through-shaft c13 in FIG. 88, and origin of curve C lies at the center of the sphere of the Rotor pair assembly again with Z axis's aligned. The result of this combination is that there is a net rolling happening with minimal friction between the ball bearings and races, that is, there is generally no sliding contact of the ball bearings in operation, and a high efficiency of this torque transfer device. If the machined parts are sufficiently toleranced or preloaded, one can obtain a zero backlash, and we have created a zero backlash torque transmission device much like the gear indexer pairs, the difference being that the ball bearing version is very low or negligible friction in comparison to the gear pairs. Also the speed ratio between the main rotor and the through shaft, is different because of the difference of 2 lobes, instead of the difference of 1 lobe previously for gear pairs. This results in a restriction in the number of lobes of the main rotors based on integer gearing ratios with differences of 2 for the indexers. An example of an assembly with a functional combination of speed ratios is shown in FIG. 85. On the left of the assembly we have gear lobe numbers as follows: item c1 has 7 lobes, item grouping c2 is 8 balls, and item c3 has 9 lobes, fixed to rotor c5 which has 16 lobes, meshes with rotor c6 with 15 lobes, which has item c7 fixed to the backside of it with 12 lobes, 11 ball bearings c8, and finally the balls roll on a race in c9. Both c1 and c9 are fixed to the through shaft and therefore rotate at the same speed. The result is if properly toleranced, main rotors c5 and c6 need not rub one another and can have a clearance gap maintained between them, thus reducing or eliminating wear. Also wear and friction is minimized on items c1, c2, c3 c7, c8 and c9.

Figure 88:
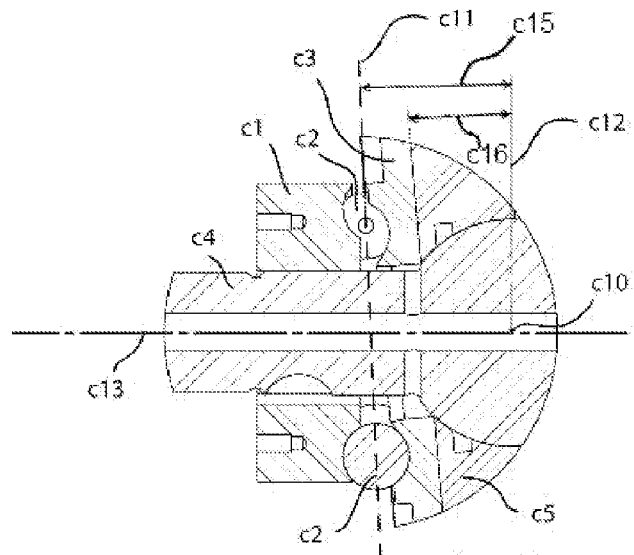
Figure 90:
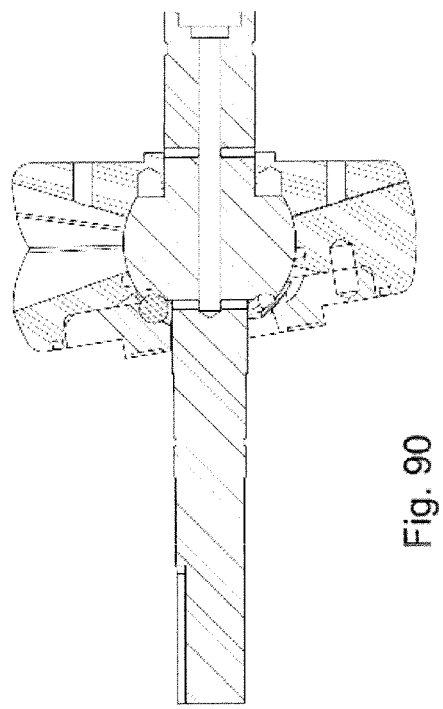

To help describe the nature of the rotation of the ball bearings, in FIG. 88, it is shown that the centers of the ball bearings lie in a plane c11, at an angle c15 that is half of the alpha angle c16 of that indexer assembly, in this case 2.5 degrees. It also turns out that with the formulation described above with base curves C, that the centers of the ball bearings always travel in a circle that lies in plane c11, and the rotational axis of that circle crosses the origin of the Rotor pair assembly c10. Also notice in FIG. 88 and FIG. 86 how the races c11 and c12 are much less than half of the original trochoidal toroids, compared to half of the volume a4 illustrated in FIG. 83.

It should also be stated, that the ball bearings can either be full compliment style (that is, touching or nearly touching) or else we could place a "cage" between the ball bearings, to help keep the balls equally spaced during operation. This helps further reduce friction and may increase the smoothness of operation.

Figure 92:
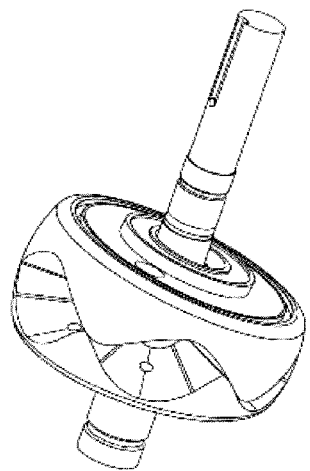
Figure 89:
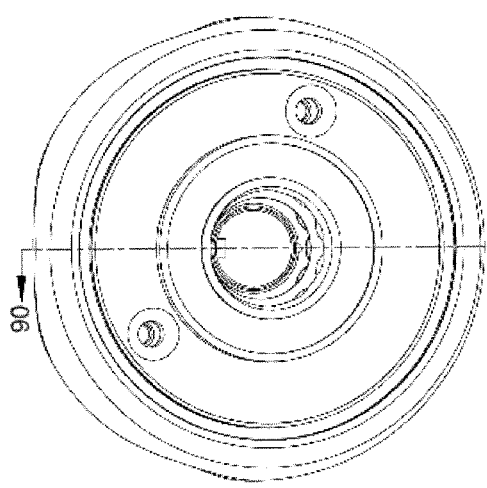
Figure 91:
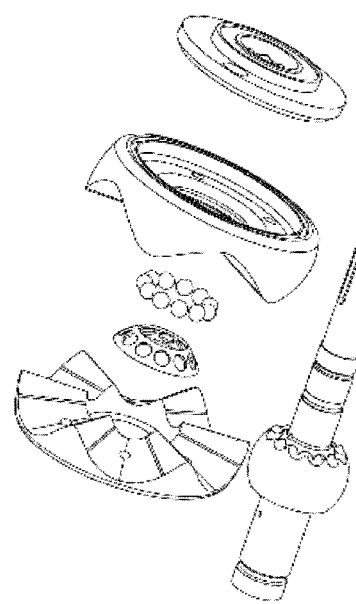

As shown in FIGS. 89-92 there is another indexing system where a plurality of bearing members are interposed between the center ball member of the shaft and one of the rotors. As shown in FIG. 92 there is an exploded view where there is shown a bearing cage that positions the bearings in relative locations with one another. A rear back plate can be provided where, as shown in the cross sectional view FIG. 90, the back plate is fixedly attached to the rotor housing the indexing system. In this embodiment, the indexing offset surface is on the ball bearing shaft member and the indexing surface is via the bearings to the rotor.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

We claim:

1. A rotor assembly comprising first and second opposing drive rotors having first and second center axes that are offset from co-linear, the rotor assembly comprising:
   a. each rotor comprising one or more lobes, the lobes having offset engagement surfaces configured to engage lobe tips of the opposing rotor(s) the offset engagement surfaces being defined by a reference axis fixed to a center axis of the opposing rotor and rotating the reference axis with respect to the center axis of the offset engagement surface of the opposing drive rotor whereas a distance from the reference axis to the lobe tip of the opposing rotor plus a distance of a prescribed gap distance or interference fit determines the location of the offset engagement surface,
   b. a through shaft passing through the drive rotors, the through shaft having a center portion in part defining a portion of a sphere, the drive rotors each having an interior portion forming a portion of a concave spherical surface operatively configured to engage the center portion of the through shaft,
   c. an indexing system comprising an index offset surface on the first rotor, an indexer surface mounted to the through shaft where the indexer surface is positioned so as to engage the index offset surface of first drive rotor as the first drive rotor rotates with the through shaft having a center of rotation which is not co-linear as to a center of rotation of the first drive rotor or second drive rotor.

2. The rotor assembly as recited in claim 1 where the first and second rotors comprise the index offset surface and each rotor engages a unique indexer surface, rigidly mounted to the through shaft.

3. The rotor assembly as recited in claim 1 where each indexer surface is attached to an indexer housing which in turn is rigidly attached to the through shaft and configured to move in conjunction therewith.

4. The rotor assembly as recited in claim 3 where the index offset surfaces are positioned upon a longitudinally rearward portion of at least one rotor and a corresponding number of the indexer surfaces are configured to engage each index offset surface throughout the course of a full rotation of the drive rotors.

5. The rotor assembly as recited in claim 4 comprising a plurality of indexers, each indexer comprising a roller member configured to rotate about a pin region of the indexer surface.

6. The rotor assembly as recited in claim 5 where each of the indexer surfaces repositions radially with respect to the indexer housing so as to form a pre-defined engagement with the corresponding indexer offset surface.

7. The rotor assembly as recited in claim 6 where the roller member has a frustoconical texture surface whereby repositioning the indexer surface radially inwardly effectively creates a greater diameter of an engagement portion of the roller member with the corresponding offset surface the indexer surface engages.

8. The rotor assembly as recited in claim 4 wherein the indexing system comprises spherical balls.

9. The device to convert energy as recited in claim 4 wherein each drive rotors comprises an elongate spiral.

10. The device to convert energy as recited in claim 4 wherein the offset engagement surface further comprises a spiral whereby a radially inward portion to a radially outward portion of each mound shifts in a tangential direction.

11. The rotor assembly as recited in claim 3 where the offset engagement surface is a continuous sinusoidal-like surface positioned in a longitudinally rearward portion of at least one rotor.

12. The rotor assembly as recited in claim 11 where the indexer surface is not attached directly to the indexer housing but is placed within a surface defining an indexer mount location where a retaining surface positions the indexer surfaces, and the indexer surface is operatively configured to engage the index offset surface.

13. The rotor assembly as recited in claim 11 where the indexer surface comprises a sinusoidal-like pattern having longitudinal forward portions and longitudinal rearward portions where the longitudinal rearward portions form mounds having a value of N number of mounds.

14. The rotor assembly as recited in claim 13 where the rotor with the indexer surface is configured to rotate around the center shaft to which is fixedly attached the indexer surface at a rate with respect to the center shaft of either (1+1/N) or (1−1/N) rotations per rotation of the rotor.

15. The rotor assembly as recited in claim 1 where the indexer surface is continuous in nature whereby the indexer surface completes a complete rotation within the indexer offset surface.

16. The rotor assembly as recited in claim 15 where the indexer surface comprises a greater dimension in a longitudinal direction than in a tangential direction.

17. The rotor assembly as recited in claim 16 where a center axis of the indexer surface defines a base curve as the indexer surface rotating with the through shaft forms an opposing base curve with respect to the first rotor.

18. The rotor assembly as recited in claim 17 wherein an offset from the central axis of the indexer surface forms an outer engagement surface located in the radially outward portion of the indexer surface and the indexer surface is spaced from the base curve of the indexer surface a distance equal to the distance to the outer engagement surface of the indexer surface plus any desired gap or interference fit there between.

19. The rotor assembly as recited in claim 18 where the indexer surface is coupled to the shaft so as to be repositioned radially inwardly and where the outer engagement surface of the indexer surface is frustoconical.

20. The rotor assembly as recited in claim 1 where the center portion that in part defines a portion of a sphere is integral and monolithic with surrounding shaft portions to comprise a unitary structure with the through shaft.

21. The rotor assembly as recited in claim 1 wherein the concave spherical surface of the drive rotor engages the center portion of the through shaft through direct contact.

22. The rotor assembly as recited in claim 1 where the thrust load from a rear portion of a rotor whose axis of rotation is not parallel to the axis of rotation of the shaft, is transferred to the shaft through a thrust plate.

23. The rotor assembly as recited in claim 1 where the indexer surface is adjustable with respect to the through shaft by way of an indexer surface adjustment system.

24. The rotor assembly as recited in claim 23 where the indexer surface is a mound of a continuous sinusoidal-like surface defining an indexer surface.

25. The rotor assembly as recited in claim 24 where the sinusoidal-like surface is a spiral design whereby a radial inward portion to a radial outward portion of a mound shifts in a tangential direction.

26. The rotor assembly as recited in claim 1 where the center portion of the through shaft defines a portion of the sphere which is a separate component attached to a central shaft member.

27. The rotor assembly as recited in claim 26 where the central shaft member has a central region with an outer surface that is operatively configured to engage the center portion, which in part defines a portion of the sphere.

28. A device to convert energy comprising:
  a. a plurality of opposed drive rotors comprising first and second drive rotors operatively configured to have extended lobes engaging a bucket region defined by two adjacent lobes of the opposing drive rotor, each of the drive rotors comprising a forward location and a rearward location wherein rearward locations of the drive rotors are spaced further in the axial direction away from the common center of rotation of the rotors than the spacing of the forward locations of the drive rotors, the drive rotor comprising an index offset surface;
  b. an indexing system comprising an indexer housing comprising a plurality of indexer surfaces, the indexer surfaces operatively configured to engage the index offset surface of the second drive rotor;
  c. a drive shaft whereby the indexer housing is attached to the drive shaft and configured to house the index surfaces therein.

29. The device as recited in claim 28 where the index offset surfaces are defined by a reference surface and a prescribed distance between the indexer surface and the index offset surface; wherein the reference surface is fixed to the rotation of an opposing axis of rotation of the opposing rotor.

30. The device as recited in claim 28 where the index offset surfaces are each continuous in nature having an elliptical like pattern.

31. The device as recited in claim 28 where the indexer surfaces comprise a sinusoidal-like pattern extending circumferentially around the rearward portions of the drive rotors.

32. The rotor assembly as recited in claim 28 where each of the indexer surfaces are configured to be repositioned radially inward with respect to the indexer housing so as to form a pre-defined engagement with the index offset surface of opposing rotor.

33. The rotor assembly as recited in claim 28 where the indexer surfaces are operatively configured to be housed in index mount locations at least partially within the indexer housing.

34. The rotor assembly as recited in claim 33 where the indexer surfaces are not attached directly to the indexer housing but are placed within a surface defining the indexer mount locations where a retaining surface positions the indexer surfaces to be held radially inwardly, and the indexer surfaces are operatively configured to engage the index offset surface of the adjacent drive rotor.

35. A rotor assembly comprising:
- a. a first rotor member fixedly attached to a center shaft, the first rotor member having a first engagement surface having a number of mounds, N;
- b. a second rotor offset from co-linear having a common rotational center as the first rotor where the second rotor has a second engagement surface so the engagement between the first and second engagement surface is such that the number of mounds N of the first engagement surface is one integer value different from the number of mounds of the second engagement surface, the second rotor further having an engagement surface having a number of mounds N+1 or N−1;
- c. a fixed index rotor fixedly attached to the center shaft where the fixed index rotor is provided with an engagement surface configured to engage the index surface of the second rotor where the engagement surface of the fixed index rotor is provided with a number of mounds that is one integer value off from the number of mounds of the engagement surface of the second rotor;
- d. whereas the second rotor rotates with respect to the fixed index rotor and the first rotor at a value of either (N+1)/N or (N−1)/N.

36. The rotor assembly as recited in claim 35 where the mounds of the first engagement surface are defined by a central axis that is fixed to the rotation of an opposing axis of rotation of the second rotor.

37. The rotor assembly as recited in claim 36 where each of the mounds engage a roller member which is configured to rotate about a pin region of indexer extensions.

* * * * *